US012583273B2

(12) United States Patent
Gentner

(10) Patent No.: US 12,583,273 B2
(45) Date of Patent: Mar. 24, 2026

(54) TRAILER COUPLING

(71) Applicant: ACPS Automotive GmbH, Ingersheim (DE)

(72) Inventor: Wolfgang Gentner, Steinheim (DE)

(73) Assignee: ACPS Automotive GmbH (DE)

( * ) Notice: Subject to any disclaimer, the term of this patent is extended or adjusted under 35 U.S.C. 154(b) by 810 days.

(21) Appl. No.: 17/885,689

(22) Filed: Aug. 11, 2022

(65) Prior Publication Data

US 2023/0047694 A1     Feb. 16, 2023

(30) Foreign Application Priority Data

Aug. 13, 2021     (DE) .......................... 102021121092.5

(51) Int. Cl.
| | | |
|---|---|---|
| B60D 1/54 | (2006.01) | |
| B60D 1/06 | (2006.01) | |
| B60D 1/62 | (2006.01) | |

(52) U.S. Cl.
CPC ................. B60D 1/54 (2013.01); B60D 1/06 (2013.01); *B60D 1/62* (2013.01)

(58) Field of Classification Search
CPC ..................................... B60D 1/06; B60D 1/54
See application file for complete search history.

(56) References Cited

U.S. PATENT DOCUMENTS

| | | | | |
|---|---|---|---|---|
| 10,780,753 B2 * | 9/2020 | Recker | ..................... | B60D 1/06 |
| 11,577,557 B2 * | 2/2023 | Kadnikov | ................ | B60D 1/42 |
| 11,813,907 B2 * | 11/2023 | Gentner | ................... | B60D 1/54 |
| 11,813,908 B2 * | 11/2023 | Gentner | ................... | B60D 1/62 |
| 2008/0073874 A1 | 3/2008 | Riehle et al. | | |
| 2021/0129609 A1 | 5/2021 | Gentner et al. | | |
| 2021/0354520 A1 | 11/2021 | Angermann et al. | | |

FOREIGN PATENT DOCUMENTS

| | | |
|---|---|---|
| DE | 102006035261 A1 | 1/2008 |
| DE | 102008034846 A1 | 12/2009 |
| DE | 102012005791 A1 | 9/2012 |
| DE | 202011105552 U1 | 10/2012 |
| DE | 102014111426 A1 | 2/2016 |
| DE | 102015204900 A1 | 9/2016 |
| DE | 102017129455 A1 | 8/2018 |
| DE | 102017009574 A1 | 4/2019 |

(Continued)

*Primary Examiner* — Kevin Hurley
(74) *Attorney, Agent, or Firm* — Reinhart Boerner Van Deuren P.C.

(57)     ABSTRACT

In order to improve a trailer coupling, comprising a ball neck, which is movable between a working position and a rest position and has a pivot bearing body arranged at a first end and a coupling ball arranged at a second end, a pivot unit, which is arranged fixed to a vehicle and by means of which the pivot bearing body is pivotal for the purpose of performing a pivotal movement about a pivot axis between a working position and a rest position, wherein the pivot unit comprises a pivot bearing unit fixed to the vehicle and a rotation-blocking device for blocking a pivotal movement of the pivot bearing body about the pivot axis, at least in the working position, the improvement being such that this susceptibility to faults in a trailer coupling of the kind mentioned in the introduction is avoided, it is proposed that a pivot control unit should be integrated within the pivot unit.

52 Claims, 34 Drawing Sheets

(56)        References Cited

FOREIGN PATENT DOCUMENTS

| DE | 102018124549 | A1 |   | 4/2020 | | |
|----|--------------|----|---|--------|---|---|
| DE | 102019129346 | A1 |   | 5/2021 | | |
| DE | 102020128980 | A1 | * | 5/2022 | ............... | B60D 1/54 |
| EP | 1634729 | A1 |   | 3/2006 | | |
| EP | 2316668 | A1 | * | 5/2011 | ............... | B60D 1/54 |
| EP | 2316669 | A1 |   | 5/2011 | | |
| EP | 2913208 | A1 |   | 9/2015 | | |
| EP | 3459766 | A1 |   | 3/2019 | | |
| EP | 3594027 | A1 |   | 1/2020 | | |
| WO | WO 2020/069977 | A1 |   | 4/2020 | | |

\* cited by examiner

TRAILER COUPLING

The present disclosure relates to the subject matter disclosed in German application number 10 2021 121 092.5 of 13 Aug. 2021, which is incorporated herein by reference in its entirety and for all purposes.

BACKGROUND OF THE INVENTION

The invention relates to a trailer coupling, comprising a ball neck, which is movable between a working position and a rest position and has a pivot bearing body arranged at a first end and a coupling ball arranged at a second end, a pivot unit, which is arranged fixed to a vehicle and by means of which the pivot bearing body is pivotal for the purpose of performing a pivotal movement about a pivot axis, in particular a pivot axis fixed to the vehicle, between a working position and a rest position, wherein the pivot unit comprises a pivot bearing unit fixed to the vehicle and a rotation-blocking device for blocking a pivotal movement of the pivot bearing body about the pivot axis, at least in the working position.

Trailer couplings of this kind are known from the prior art.

In these, the pivot unit is conventionally controlled by a pivot control unit that is arranged outside the pivot unit, for example on the vehicle, and is in particular supplied by a supplier.

In trailer couplings and pivot units of this kind, there always arises the problem of adapting these to one another, and of a resulting susceptibility to faults.

In accordance with an embodiment of the invention, provision is made to avoid this susceptibility to faults in a trailer coupling of the kind mentioned in the introduction.

SUMMARY OF THE INVENTION

In accordance with an embodiment of the invention, provision is made in a trailer coupling of the kind mentioned in the introduction that a pivot control unit is integrated within the pivot unit.

With the aid of such integration of the pivot control unit within the pivot unit, problems of adaptation can be solved, and mounting of the trailer coupling on a motor vehicle can also be simplified.

A preferred solution provides for the pivot unit to have an overall housing in which the pivot bearing unit, the rotation-blocking device and a drive motor are arranged, and for the pivot control unit to be arranged in the overall housing such that the pivot unit itself is able to perform all the control functions independently and thus all that need be transmitted by the vehicle is a starting signal for starting the pivotal movement.

The most diverse possibilities are conceivable as regards the form taken by the pivot control unit.

An advantageous solution provides for the pivot control unit to detect the pivotal movements of the ball neck about the pivot axis by means of a pivotal movement sensor.

A pivotal movement sensor takes absolute measurements and thus provides the possibility of detecting the position of the ball neck at any time, independently of a previous operating condition.

Thus, the pivot control unit is able to exactly identify the position of the ball neck relative to the motor vehicle and relative to the working position and rest position.

Particularly advantageously, this can be achieved in that the pivotal movement sensor detects pivotal movements of the pivot bearing body about the pivot axis.

Here, either the pivotal movement sensor may be arranged on the pivot unit such that it directly detects the pivotal position of the pivot bearing body relative to the pivot unit, for example relative to the overall housing thereof.

Another advantageous possibility provides for the pivot bearing body to cooperate with the pivotal movement sensor by way of a coupling element.

The most diverse possibilities are conceivable as regards the arrangement of the pivotal movement sensor.

Thus, an advantageous solution provides for the pivotal movement sensor to be arranged on a sensor carrier that can be arranged and mounted in the overall housing simply and suitably.

A further advantageous embodiment of the pivot unit provides for the pivot control unit to detect functions of the rotation-blocking device by means of a function sensor.

These functions of the rotation-blocking device in particular relate to the rotation-blocking position or a release position of the rotation-blocking device.

For example, in this context the function sensor is able to detect one or more of these function positions of the rotation-blocking device.

A particularly simple solution provides for the pivot control unit to detect, by means of the function sensor, at least one position of the rotation-blocking device—that is to say for example the rotation-blocking position or the release position.

This detection of the position of the rotation-blocking device may be performed for example in that the pivot control unit detects the position of the rotation-blocking device by scanning an element thereof—that is to say an element of the rotation-blocking device—by means of the function sensor, wherein this scanning of the element of the rotation-blocking device is performed either directly by the function sensor or indirectly by way of a device that is associated with the element of the rotation-blocking device.

As regards the arrangement of the function sensor, it is likewise advantageous if the function sensor is arranged on a sensor carrier and can thus be mounted in the overall housing in a simple manner.

A further favourable solution provides for the pivot control unit to detect a speed of the drive motor by means of a speed sensor.

With a speed sensor, it is thus possible to detect directly at the drive motor itself whether the drive motor is switched on or off, without any dependence on the extent to which operation of the drive motor has an effect on functions of the pivot unit.

In this context, it is particularly favourable if the speed sensor is associated with an output shaft of the drive motor, with the result that an item of information on the functions of the drive motor, in particular the speed and direction of rotation thereof, is directly available.

As regards the speed sensor as well, it has proved particularly advantageous if the speed sensor is arranged on a sensor carrier and is thus mountable in the pivot unit in a simple manner.

A further advantageous solution provides for the pivot control unit to detect a temperature in the pivot unit, in particular in the overall housing, by means of a temperature sensor.

This enables, for example for the pivot control unit, an adjustment of detected parameters such as limit values and/or current values and/or current thresholds, depending on the temperature.

In particular, the temperature sensor is also arranged on a sensor carrier.

For the purpose of making contact with the sensor carriers in a simple manner, these are advantageously provided with push-in contact elements.

A particularly compact solution, which from the point of view of detecting the required parameters is particularly favourable, provides for the overall housing to have a pivotal-operation housing portion that receives the pivot bearing unit, the rotation-blocking unit and at least one gear unit, and for the sensor carriers to be associated with the pivotal-operation housing portion.

This solution has the great advantage that as a result the variables to be detected by the sensors can be detected in a simple manner and as close as possible to the respective function units.

A particularly favourable solution provides for the sensor carriers to be arranged in the pivotal-operation housing portion itself.

A solution that is structurally particularly advantageous provides for the gear unit to have a distribution gear that, on the output side, drives on the one hand the pivot bearing body and on the other the rotation-blocking device.

This provides the possibility, in a simple way, using a single drive motor of both driving the pivot bearing body and performing the pivotal movement and also of actuating the rotation-blocking device such that it moves either into the rotation-blocking position or the release position.

In particular in this case, it is provided for the gear unit to have a distribution gear that, on the output side, drives on the one hand the pivot bearing body and on the other the rotation-blocking device, and for at least one of the sensor carriers to be arranged on the drive side of the distribution gear.

In this case, the sensor carrier may be arranged directly on the drive side of the distribution gear.

However, it is even more advantageous if the distribution gear is driven by a step-down gear and if at least one of the sensor carriers is associated with the step-down gear such that, in the region of the step-down gear, at least one of the sensors may be arranged in the direct vicinity of the moving elements.

It is even more favourable if the step-down gear has a drive-side gear element and an output-side gear element, and if at least one of the sensor carriers is arranged between the drive-side gear element and the output-side gear element.

A solution that is particularly favourable as regards its compactness provides for several of the multiplicity of sensors comprising the pivotal movement sensor, the function sensor, the speed sensor and the temperature sensor to be arranged on a common sensor carrier such that the information determined by the sensors can be detected in the pivot system in a locally concentrated manner.

Further, it is preferably provided for the sensor carrier to comprise push-in contact elements for the purpose of making contact with the components arranged on it, such as sensors.

A particularly favourable solution provides for the overall housing to have a pivotal-operation housing portion that receives the pivot bearing unit, the rotation-blocking unit and at least one gear unit, and for the pivot control unit to be associated with the pivotal-operation housing portion—that is to say for the whole pivot control unit to be associated in this manner.

In particular, this may advantageously be achieved in that the pivot control unit is arranged in the pivotal-operation housing portion.

Further, it is preferably provided for the gear unit to have a distribution gear that, on the output side, drives on the one hand the pivot bearing body and on the other the rotation-blocking device, and for the pivot control unit to be arranged on the drive side of the distribution gear, such that in particular the information required for the functions of the pivot control unit can be detected in the immediate spatial surroundings thereof.

It is particularly favourable if the distribution gear is driven by a step-down gear, and if the pivot control unit is associated with the step-down gear.

In particular, it is provided for the step-down gear to have a drive-side gear element and an output-side gear element, and for the pivot control unit to be arranged between the drive-side gear element and the output-side gear element.

An alternative solution for this provides for the overall housing to have a motor casing portion that has the drive motor, and for the pivot control unit to be associated with the motor casing portion.

However, in the context of the solution according to the invention, it is also possible to divide the pivot control unit into sub-units and to arrange one part of the pivot control unit in the pivotal-operation housing portion and another part of the pivot control unit in the motor casing portion.

Another advantageous solution provides for the pivot control unit to be arranged in the motor casing portion.

A further advantageous embodiment provides for the pivot unit to have an overall housing in which there are arranged the pivot bearing unit and a drive motor, and for a control circuit of the pivot control unit, arranged on a circuit board, to be arranged in the overall housing.

Favourably, the overall housing takes a form such that it has pivotal-operation housing portion that receives a pivot bearing unit and at least one gear unit, and such that the control circuit of the pivot control unit, arranged on a circuit board, is associated with the pivotal-operation housing portion.

Preferably, it is further provided for the control circuit of the pivot control unit, arranged on a circuit board, to be arranged in the pivotal-operation housing portion.

A particularly advantageous embodiment provides for the gear unit to have a distribution gear that, on the output side, drives on the one hand the pivot bearing body and on the other the rotation-blocking device, and for the control circuit of the pivot control unit, arranged on a circuit board, to be arranged on the drive side of the distribution gear.

This gives a particularly compact solution.

This solution may in particular be further improved in that the distribution gear is driven by a step-down gear, and in that the control circuit of the pivot control unit, arranged on a circuit board, is associated with the step-down gear.

The step-down gear provides the possibility of arranging the pivot control unit as close as possible to the elements that are suitable for the respective sensors, and in particular it is provided here for the step-down gear to have a drive-side gear element and an output-side gear element and for the control circuit of the pivot control unit, arranged on a circuit board, to be arranged between the drive-side gear element and the output-side gear element.

In addition or as an alternative, it is likewise possible for the overall housing to have a motor casing portion that has the drive motor, and for the control circuit of the pivot control unit, arranged on a circuit board, to be associated with the motor casing portion.

For the purpose of making contact in an advantageous manner, the circuit board is also provided with push-in contact elements.

The solution is particularly compact if the control circuit of the pivot control unit, arranged on a circuit board, is arranged in the motor casing portion.

In this case, the pivot control unit may also be arranged partly in the pivotal-operation housing portion and partly in the motor casing portion.

A further advantageous solution provides for the pivot control unit to have a control circuit which, with the aid of a data processing unit, on the one hand communicates with a bus system on the vehicle and on the other controls the pivot unit in accordance with a predetermined program code.

Here, in the simplest case the data processing unit takes the form of a processor that executes the functions.

Further, it is preferably provided for the pivot control unit to have a control circuit which, with the aid of a data processing unit and a motor drive circuit for the drive motor, controls the drive motor for the purpose of pivoting the ball neck between the working position and the rest position.

Control of the drive motor in this way, with the aid of the motor drive circuit, preferably also comprises monitoring the motor current for the drive motor, with the result that, for example in the event of the pivotal movement of the ball neck being blocked, this can be identified by the data processing unit as a result of an increase in the current for the drive motor.

Further, it is preferably provided for the data processing unit to detect, with the aid of the pivotal movement sensor, whether the ball neck is in the working position or the rest position, something which, because the pivotal movement sensor has the property of taking absolute measurements, is possible at any time, independently of previous operating conditions.

In addition to this, the data processing unit may also additionally take a form such that, with the aid of the pivotal movement sensor, it detects intermediate positions of the ball neck, between the working position and the rest position of the ball neck, something which, because the pivotal movement sensor has the property of taking absolute measurements, is possible at any time, independently of previous operating conditions.

In all cases in which positions of the ball neck are detected, preferably there are predetermined reference values of the pivotal movement sensor for the individual positions provided for the data processing unit, and the data processing unit then compares these reference values with the values measured by the pivotal movement sensor.

A further advantageous solution provides for the data processing unit to detect, with the aid of the function sensor, whether the rotation-blocking device is in a rotation-blocking position or a release position.

This may either be performed directly by the function sensor that is associated with the rotation-blocking device, or indeed indirectly by a unit that cooperates with the rotation-blocking device, for example a securing device.

So that the individual function phases to be performed by the pivot unit can be detected while the ball neck is pivoting, it is preferably provided for the data processing unit, after the drive motor has started, to compare a value of the speed sensor and a value of the pivotal movement sensor with one another.

With a comparison of this kind, it is possible for the data processing unit to be able to detect how long the drive motor needs to actuate the rotation-blocking device, and when a pivotal movement of the pivot bearing body and in particular of the ball neck begins.

A further advantageous solution provides for the data processing unit, as a result of a starting signal transmitted to it by way of a bus connector, to start the drive motor in order to perform a pivotal movement of the ball neck.

Moreover, it has proved advantageous if the data processing unit only starts the drive motor as a result of the starting signal if the ball neck is in the rest position or the working position.

This may be detected for example by the data processing unit by interrogating the pivotal movement sensor.

However, it is also possible to detect this in that, with the ball neck having moved from the working position to the rest position or from the rest position to the working position, the increase in current of the drive motor at the moment of abutment against the limit position is detected and stored, such that it is thus identifiable that one of the limit positions of the pivotal movement of the ball neck has been reached.

Moreover, it is also possible for the function sensor to establish, for example by scanning the rotation-blocking device, whether for example the working position has been reached.

A further advantageous solution provides for the data processing unit to monitor the pivotal movement of the ball neck with the aid of the pivotal movement sensor while the drive motor is operating—that is to say, as stated above, by comparisons with reference values that are stored in the data processing unit.

In particular in this case, it is also possible for the data processing unit to identify reaching of the working position and the rest position with the aid of the pivotal movement sensor.

This—as mentioned above—may be done by comparisons with stored reference values.

A further advantageous solution provides for the data processing unit to monitor current consumption by the drive motor with the aid of the motor drive circuit, and to stop the drive motor if a predetermined current threshold is exceeded.

Such exceeding of a predetermined current threshold may occur for example if, as the ball neck moves between the working position and the rest position, it meets an obstacle and its continued movement is thus blocked.

However, such exceeding of the current threshold also occurs as the ball neck comes into abutment on reaching the working position or the rest position.

In order to be able to distinguish these two situations from one another, it is preferably provided in these cases for the data processing unit to additionally interrogate the pivotal movement sensor and to compare its values with the reference values, in order to identify in which phase of movement between the working position and the rest position the current threshold was exceeded.

In particular, an advantageous solution for identifying the working position or the rest position provides, when with the aid of the pivotal movement sensor the data processing unit detects that the working position or the rest position of the ball neck has been reached and/or the current consumption of the drive motor exceeds the predetermined current threshold, for the data processing unit to generate an "OK" signal and to output it at the bus connector.

Further, it is preferably provided, if the current consumption of the drive motor exceeds the predetermined current threshold away from the working position or the rest position of the ball neck, for the data processing unit to generate a "not OK" signal and to output it at the bus connector.

Further, it is preferably provided for the data processing unit to compare the value of the speed sensor and the value of the pivotal movement sensor, at least during a phase needed for release of securing devices, and, if the value of the pivotal movement sensor does not increase after this phase, which lasts for a predetermined period, to output a "not OK" signal at the bus connector.

A further advantageous solution provides for the data processing unit to detect, with the function sensor, a condition of the rotation-blocking device and, if the rotation-blocking position applies, in the working position to output an "OK" signal at the bus connector and, if the rotation-blocking position does not apply, in the working position to output a "not OK" signal at the bus connector.

Moreover, it is known from the prior art to provide a plug socket control unit for the purpose of supplying current through the contacts of the plug socket, for the purpose of supplying current to light units of a trailer that is coupled to the ball neck or a carrier unit in the vehicle body that is mounted on this.

In this respect too, when the plug socket is arranged on the ball neck of the trailer coupling, adapting a plug socket control unit supplied by a further supplier and the trailer coupling to one another at the time of installation in the motor vehicle entails problems.

This object is achieved according to the invention, in a trailer coupling according to the precharacterising clause of Claim 1 or according to one of the preceding embodiments, in that the trailer coupling has a plug socket on the ball neck and is provided with a plug socket control unit that has contact connectors for supplying current to contacts of the plug socket, and in that the plug socket control unit has two supply connectors for the purpose of power supply and a bus connector for the purpose of actuation.

Because the trailer coupling is provided with the plug socket control unit, it is possible to install this as part of the trailer coupling and thus also to eliminate sources of faults when the plug socket is supplied with current.

It is particularly favourable if the plug socket control unit has a plug socket control circuit with a processor and a contact control circuit by way of which the processor can actuate the contact connectors for the contacts of the plug socket.

However, in the case of the plug socket control circuit according to the invention, the point is not only to supply the contact connectors with current but also to ensure that the unit connected to the trailer coupling—whether a trailer or a load carrier—is functional.

For this reason, it is provided for the processor, together with the contact control circuit, to monitor the contact connectors, in particular continuously.

Such monitoring of the contact connectors may be performed in the most diverse ways.

An advantageous solution provides for the processor, with the aid of the contact control circuit, to monitor the resistance to earth of the contact connectors when there is no supply of current—that is to say that, with the aid of the contact control circuit, the processor checks whether the resistance between the contact connector and earth may correspond to a load connected to the contact of the plug socket, whether this is a light unit or another load.

In particular here, the plug socket control circuit takes a form such that, if the contact connectors deviate from a predetermined resistance to earth, the processor outputs a fault signal to the bus connector.

Moreover, it is preferably provided for the processor, with the contact control circuit, to monitor the current flowing through the contact connectors when they are supplied with current—that is to say that, with the aid of the contact control circuit, the processor continuously checks whether the current that is supplied corresponds to predetermined current values.

Further, for safety reasons it is favourable if the processor, with the contact control circuit, switches off the supply of current to the contact connector if a predetermined maximum current through the contact connector is exceeded, so that damage can be avoided both to the plug socket control unit and to the attached loads.

Further, it is preferably provided for the processor to output a fault signal at the bus connector in the event that a contact connector that is supplied with current is switched off.

A further advantageous solution provides for the processor of the plug socket control unit to forward a bus signal for a pivot control unit that arrives there to a bus connector for the pivot control unit that is provided at the plug socket control unit.

This provides the possibility of connecting the plug socket control unit directly to the vehicle bus, for example a CAN bus, but of directing communication with the pivot control unit via the plug socket control unit, with the result that the vehicle CAN bus of the vehicle need only communicate with the plug socket control unit.

Preferably in this case, it is provided for the bus connector for the pivot control unit to be a connector of a LIN bus, which enables simplified communication between the plug socket control unit and the pivot control unit.

A further advantageous solution provides for the processor of the plug socket control unit to forward a bus signal of the pivot control unit that arrives at its bus connector for the pivot control unit to the bus connector for the bus system of the vehicle.

No further statements have yet been made as regards the arrangement of the plug socket control unit in conjunction with the trailer coupling.

For example, an advantageous solution provides for the plug socket control unit to be arranged in the overall housing of the pivot unit—that is to say that the plug socket control unit is not only part of the trailer coupling but is integrated in the overall housing of the pivot unit.

In this context, the plug socket control unit may be integrated in different regions.

An advantageous solution provides for the plug socket control unit to be arranged in the pivotal-operation housing portion.

Another advantageous solution provides for the plug socket control unit to be arranged in the motor casing portion of the pivot unit.

However, it is also possible for parts of the plug socket control unit to be arranged in the pivotal-operation housing portion and parts of the plug socket control unit to be arranged in the motor casing portion, in order to achieve optimal utilisation of the space.

A further advantageous solution provides for the ball neck to have a receptacle in which there is arranged the plug socket control unit for the plug socket held on the ball neck.

This means that with this solution at least part of the plug socket control unit or all of the plug socket control unit is held on the ball neck.

More detailed statements have not yet been made as regards the form taken by the receptacle for the plug socket control unit on the ball neck.

For example, an advantageous solution provides for the receptacle to take the form of a recess in the ball neck.

In this case, the recess is for example arranged such that it is arranged between an upper and a lower longitudinal strut of a bearing structure of the ball neck.

Further, it is favourably provided for the recess to be arranged between a first end, fixable to the vehicle, and the plug socket arranged on the ball neck, such that this enables the plug socket control unit to be suitably positioned close to the plug socket.

In principle, the plug socket could be placed on the ball neck.

However, a particularly favourable solution provides for the plug socket to be arranged in a plug socket receptacle that is formed by the bearing structure of the ball neck.

Moreover, for the purpose of protecting the plug socket control circuit, it is favourably also provided for the plug socket control circuit to be covered by a cover of the ball neck.

Thus, the description above of solutions according to the invention comprises in particular the different combinations of features that are defined by the sequentially numbered features below:

1. A trailer coupling, comprising a ball neck (10), which is movable between a working position (A) and a rest position (R) and has a pivot bearing body (14) arranged at a first end (12) and a coupling ball (18) arranged at a second end (16), a pivot unit (S), which is arranged fixed to a vehicle and by means of which the pivot bearing body (14) is pivotal for the purpose of performing a pivotal movement about a pivot axis (22) between a working position (A) and a rest position (R), wherein the pivot unit (S) comprises a pivot bearing unit (20) fixed to the vehicle and a rotation-blocking device (50) for blocking a pivotal movement of the pivot bearing body (14) about the pivot axis (22), at least in the working position (A), wherein a pivot control unit (380) is integrated within the pivot unit (S).

2. A trailer coupling according to the above feature 1, wherein the pivot unit (S) has an overall housing (400) in which the pivot bearing unit (20), the rotation-blocking device (50) and a drive motor (180) are arranged, and wherein the pivot control unit (380) is arranged in the overall housing (400).

3. A trailer coupling according to one of the preceding features, wherein the pivot control unit (380) detects the pivotal movements of the ball neck (10) about the pivot axis (22) by means of a pivotal movement sensor (372).

4. A trailer coupling according to feature 3, wherein the pivotal movement sensor (372) detects pivotal movements of the pivot bearing body (14) about the pivot axis (22).

5. A trailer coupling according to feature 4, wherein the pivot bearing body (14) cooperates with the pivotal movement sensor (372) by way of a coupling element (100).

6. A trailer coupling according to one of features 3 to 5, wherein the pivotal movement sensor (372) is arranged on a sensor carrier (360).

7. A trailer coupling according to one of the preceding features, wherein the pivot control unit (380) detects functions of the rotation-blocking device (50) by means of a function sensor (362).

8. A trailer coupling according to feature 7, wherein the pivot control unit (380) detects, by means of the function sensor (362), at least one position of the rotation-blocking device (50).

9. A trailer coupling according to feature 8, wherein the pivot control unit (380) detects the position of the rotation-blocking device (50) by scanning an element (52) thereof by means of the function sensor (362).

10. A trailer coupling according to one of features 7 to 9, wherein the function sensor (362) is arranged on a sensor carrier (360).

11. A trailer coupling according to one of the preceding features, wherein the pivot control unit (380) detects a speed of the drive motor (380) by means of a speed sensor (364).

12. A trailer coupling according to feature 11, wherein the speed sensor (364) is associated with an output shaft (182) of the drive motor (180).

13. A trailer coupling according to features 11 or 12, wherein the speed sensor (364) is arranged on a sensor carrier (360).

14. A trailer coupling according to one of the preceding features, wherein the pivot control unit (380) detects a temperature in the pivot unit (S) by means of a temperature sensor (368).

15. A trailer coupling according to feature 14, wherein the temperature sensor (368) is arranged on a sensor carrier (360).

16. A trailer coupling according to one of the preceding features, wherein the sensor carriers (360) are provided with push-in contact elements (396).

17. A trailer coupling according to one of the preceding features, wherein the overall housing (400) has a pivotal-operation housing portion (402) that receives the pivot bearing unit (20), the rotation-blocking unit (50) and at least one gear unit (130, 170), and wherein the sensor carriers (360) are associated with the pivotal-operation housing portion (402).

18. A trailer coupling according to feature 17, wherein the sensor carriers (360) are arranged in the pivotal-operation housing portion (402).

19. A trailer coupling according to feature 17 or 18, wherein the gear unit has a distribution gear (130) that, on the output side, drives on the one hand the pivot bearing body (14) and on the other the rotation-blocking device (50), and wherein in particular at least one of the sensor carriers (360) is arranged on the drive side of the distribution gear (130).

20. A trailer coupling according to feature 19, wherein the distribution gear (130) is driven by a step-down gear (170), and wherein at least one of the sensor carriers (360) is associated with the step-down gear (170).

21. A trailer coupling according to feature 20, wherein the step-down gear (170) has a drive-side gear element (184) and an output-side gear element (172), and wherein at least one of the sensor carriers (360) is arranged between the drive-side gear element (184) and the output-side gear element (172).

22. A trailer coupling according to one of the preceding features, wherein the pivotal movement sensor (372), the function sensor (362) and the speed sensor (364) are arranged on a common sensor carrier (360).

23. A trailer coupling according to one of the preceding features, wherein the overall housing (400) has a pivotal-operation housing portion (402) that receives the pivot bearing unit (20) and at least one gear unit (130, 170), and wherein the pivot control unit (380) is associated with the pivotal-operation housing portion (402).

24. A trailer coupling according to feature 23, wherein the pivot control unit (380) is arranged in the pivotal-operation housing portion (402).

25. A trailer coupling according to feature 23 or 24, wherein the gear unit has a distribution gear (130) that, on the output side, drives on the one hand the pivot bearing body (14) and on the other the rotation-blocking device (50), and wherein the pivot control unit (380) is arranged on the drive side of the distribution gear (130).

26. A trailer coupling according to feature 25, wherein the distribution gear (130) is driven by a step-down gear (170), and wherein the pivot control unit (380) is associated with the step-down gear (170).

27. A trailer coupling according to feature 26, wherein the step-down gear (170) has a drive-side gear element (184) and an output-side gear element (172), and wherein the pivot control unit (380) is arranged between the drive-side gear element (184) and the output-side gear element (172).

28. A trailer coupling according to one of the preceding features, wherein the overall housing (400) has a motor casing portion (408) that has the drive motor (180), and wherein the pivot control unit (380) is associated with the motor casing portion (408).

29. A trailer coupling according to feature 28, wherein the pivot control unit (380) is arranged in the motor casing portion (408).

30. A trailer coupling according to one of the preceding features, wherein the pivot unit (S) has an overall housing (400) in which there are arranged the pivot bearing unit (20) and a drive motor (180), and wherein a control circuit (384) of the pivot control unit (380), arranged on a circuit board (382), is arranged in the overall housing (400).

31. A trailer coupling according to one of the preceding features, wherein the overall housing (400) has a pivotal-operation housing portion (402) that receives the pivot bearing unit (20) and at least one gear unit (130, 170), and wherein the control circuit (384) of the pivot control unit (380), arranged on a circuit board (382), is associated with the pivotal-operation housing portion (402).

32. A trailer coupling according to feature 31, wherein the control circuit (384) of the pivot control unit (380), arranged on a circuit board (382), is arranged in the pivotal-operation housing portion (402).

33. A trailer coupling according to one of features 30 to 32, wherein the gear unit has a distribution gear (130) that, on the output side, drives on the one hand the pivot bearing body (14) and on the other the rotation-blocking device (50), and wherein the control circuit (384) of the pivot control unit (380), arranged on a circuit board (382), is arranged on the drive side of the distribution gear (130).

34. A trailer coupling according to feature 33, wherein the distribution gear (130) is driven by a step-down gear (170), and wherein the control circuit (384) of the pivot control unit (380), arranged on a circuit board (382), is associated with the step-down gear (170).

35. A trailer coupling according to feature 34, wherein the step-down gear (170) has a drive-side gear element (184) and an output-side gear element (172), and wherein the control circuit (384) of the pivot control unit (380), arranged on a circuit board (382), is arranged between the drive-side gear element (184) and the output-side gear element (172).

36. A trailer coupling according to one of the preceding features, wherein the overall housing has a motor casing portion (408) that has the drive motor (180), and wherein the control circuit (384) of the pivot control unit (380), arranged on a circuit board (382), is associated with the motor casing portion (408).

37. A trailer coupling according to feature 36, wherein the control circuit (384) of the pivot control unit (380), arranged on a circuit board (382), is arranged in the motor casing portion (408).

38. A trailer coupling according to one of the preceding features, wherein the pivot control unit (380) has a control circuit (384) which, with the aid of a data processing unit (386), on the one hand communicates with a bus system on the vehicle and on the other controls the pivot unit (S) in accordance with a predetermined program code.

39. A trailer coupling according to one of the preceding features, wherein the pivot control unit (380) has a control circuit (384) which, with the aid of a data processing unit (386) and a motor drive circuit (388) for the drive motor (180), controls the drive motor (180) for the purpose of pivoting the ball neck between the working position (A) and the rest position (R).

40. A trailer coupling according to one of the preceding features, wherein the data processing unit (386) detects, with the aid of the pivotal movement sensor (372), whether the ball neck (10) is in the working position (A) or the rest position (R).

41. A trailer coupling according to feature 40, wherein the data processing unit (386) detects, with the aid of the pivotal movement sensor (372), intermediate positions of the ball neck (10), between the working position (A) and the rest position (R) of the ball neck (10).

42. A trailer coupling according to one of the preceding features, wherein the data processing unit (386) detects, with the aid of the function sensor (362), whether the rotation-blocking device (50) is in a rotation-blocking position or a release position.

43. A trailer coupling according to one of the preceding features, wherein the data processing unit (386), after the drive motor (180) has started, compares a value of the speed sensor (364) and a value of the pivotal movement sensor (372) with one another.

44. A trailer coupling according to one of the preceding features, wherein the data processing unit (386), as a result of a starting signal transmitted to it by way of a bus connector (B), starts the drive motor (180).

45. A trailer coupling according to feature 44, wherein the data processing unit (386) only starts the drive motor (180) as a result of the starting signal if the ball neck (10) is in the rest position (R) or the working position (A).

46. A trailer coupling according to one of the preceding features, wherein the data processing unit (386) monitors the pivotal movement of the ball neck (10) with the aid of the pivotal movement sensor (372) while the drive motor (180) is operating.

47. A trailer coupling according to feature 46, wherein the data processing unit (386) identifies reaching of the working position (A) or the rest position (R) with the aid of the pivotal movement sensor (372).

48. A trailer coupling according to one of the preceding features, wherein the data processing unit (386) monitors current consumption by the drive motor (180) with the aid of the motor drive circuit (388), and stops the drive motor (180) if a predetermined current threshold is exceeded.

49. A trailer coupling according to one of the preceding features, wherein, when with the aid of the pivotal movement sensor (372) the data processing unit (386) detects that the working position (A) or the rest position (R) of the ball neck (10) has been reached and/or the current consumption of the drive motor (180) exceeds the predetermined current threshold, the data processing unit (386) generates an "OK" signal and outputs it at the bus connector (B).

50. A trailer coupling according to one of the preceding features, wherein if the current consumption of the drive motor (180) exceeds the predetermined current threshold away from the working position (A) or the rest position (R) of the ball neck, the data processing unit (386) generates a "not OK" signal and outputs it at the bus connector (B).

51. A trailer coupling according to one of the preceding features, wherein the data processing unit (386) compares the value of the speed sensor (364) and the value of the pivotal movement sensor (372), at least during a phase needed for release of securing devices, and, if the value of the pivotal movement sensor (372) does not increase after this phase, which lasts for a predetermined period, outputs a "not OK" signal at the bus connector (B).

52. A trailer coupling according to one of the preceding features, wherein the data processing unit (386) detects, with the function sensor (362), a condition of the rotation-blocking device (50) and, if the rotation-blocking position applies, in the working position (A) outputs an "OK" signal at the bus connector (B) and, if the rotation-blocking position does not apply, in the working position (A) outputs a "not OK" signal at the bus connector (B).

53. A trailer coupling according to the precharacterising clause of feature 1 or one of the preceding features, wherein the trailer coupling has a plug socket (34) on the ball neck (10) and is provided with a plug socket control unit (420) that has contact connectors (422) for supplying current to contacts (424, 426) of the plug socket (34), and wherein the plug socket control unit (420) has two supply connectors (+, −) for the purpose of power supply and a bus connector (B) for the purpose of actuation.

54. A trailer coupling according to feature 53, wherein the plug socket control unit (420) has a plug socket control circuit (432) with a processor (436) and a contact control circuit (438).

55. A trailer coupling according to feature 54, wherein the processor (436), together with the contact control circuit (438), monitors the contact connectors (422).

56. A trailer coupling according to feature 55, wherein the processor (436), with the aid of the contact control circuit (438), monitors the resistance to earth of the contact connectors (422) when there is no supply of current.

57. A trailer coupling according to feature 56, wherein, if the contact connectors (422) deviate from a predetermined resistance to earth, the processor (436) outputs a fault signal to the bus connector.

58. A trailer coupling according to one of features 54 to 57, wherein the processor (436), with the contact control circuit (438), monitors the current flowing through the contact connectors (422) when they are supplied with current.

59. A trailer coupling according to feature 58, wherein the processor (436), with the contact control circuit (438), switches off the supply of current to the contact connector (422) if a predetermined maximum current through the contact connector (422) is exceeded.

60. A trailer coupling according to feature 59, wherein the processor (436) outputs a fault signal at the bus connector in the event that a contact connector (422) that is supplied with current is switched off.

61. A trailer coupling according to one of the preceding features, wherein a processor (446) of the plug socket control unit (420) forwards a bus signal for a pivot control unit (380) that arrives there to a bus connector (444) for the pivot control unit (380) that is provided at the plug socket control unit (420).

62. A trailer coupling according to feature 61, wherein the bus connector for the pivot control unit (380) is a connector of a LIN bus.

63. A trailer coupling according to feature 61 or 62, wherein the processor (446) of the plug socket control unit (420) forwards a bus signal of the pivot control unit (380) that arrives at its bus connector (444) for the pivot control unit (380) to the bus connector for the bus system of the vehicle.

64. A trailer coupling according to one of features 53 to 63, wherein the plug socket control unit (420) is arranged in the overall housing (400) of the pivot unit S.

65. A trailer coupling according to feature 64, wherein the plug socket control unit (420) is arranged in the pivotal-operation housing portion (402) of the pivot unit (S).

66. A trailer coupling according to feature 64 or 65, wherein the plug socket control unit (420) is arranged in the motor casing portion (408) of the pivot unit (S).

67. A trailer coupling according to one of features 53 to 66, wherein the ball neck (10) has a receptacle (452) in which there is arranged the plug socket control unit (420) for the plug socket (34) held on the ball neck (10).

68. A trailer coupling according to feature 67, wherein the receptacle (452) takes the form of a recess in the ball neck (10).

69. A trailer coupling according to feature 68, wherein the recess (452) is arranged between an upper (462) and a lower (464) longitudinal strut of a bearing structure (466) of the ball neck (10).

70. A trailer coupling according to one of features 67 to 69, wherein the recess (452) is arranged between a first end (12), fixable to the vehicle, and the plug socket (34) arranged on the ball neck (10).

71. A trailer coupling according to one of features 53 to 70, wherein the plug socket (34) is arranged in a plug socket receptacle (468) that is formed by the bearing structure (466) of the ball neck (10).

72. A trailer coupling according to one of features 53 to 71, wherein the plug socket control circuit (420) is covered by a cover (454) of the ball neck (10).

Further features and advantages of the solution according to the invention form the subject matter of the description below and the representation in the drawing of an exemplary embodiment.

DETAILED DESCRIPTION OF THE INVENTION

Figure 1:
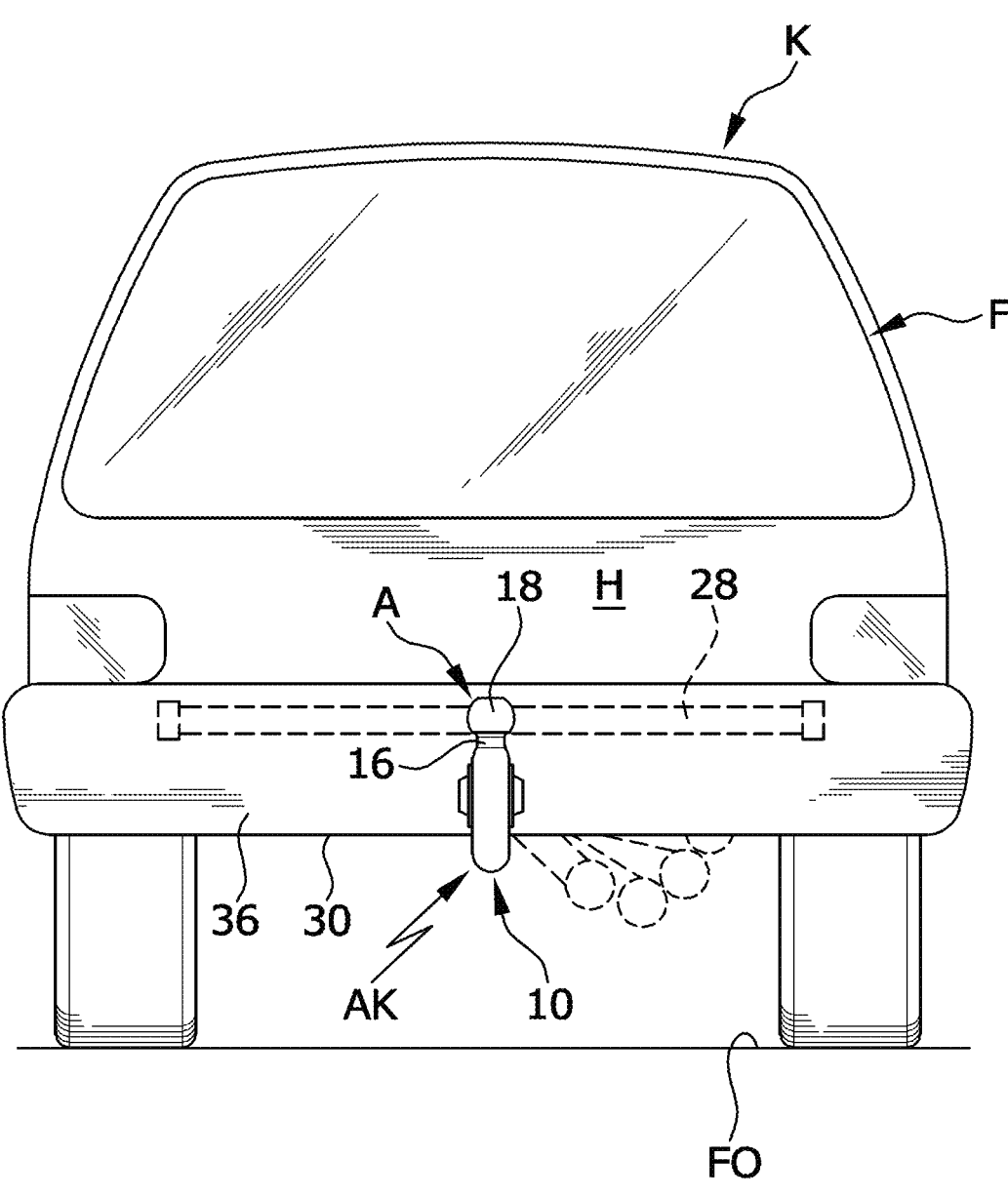
FIG. 1 shows a rear view of a motor vehicle with a trailer coupling according to the invention.
Figure 2:
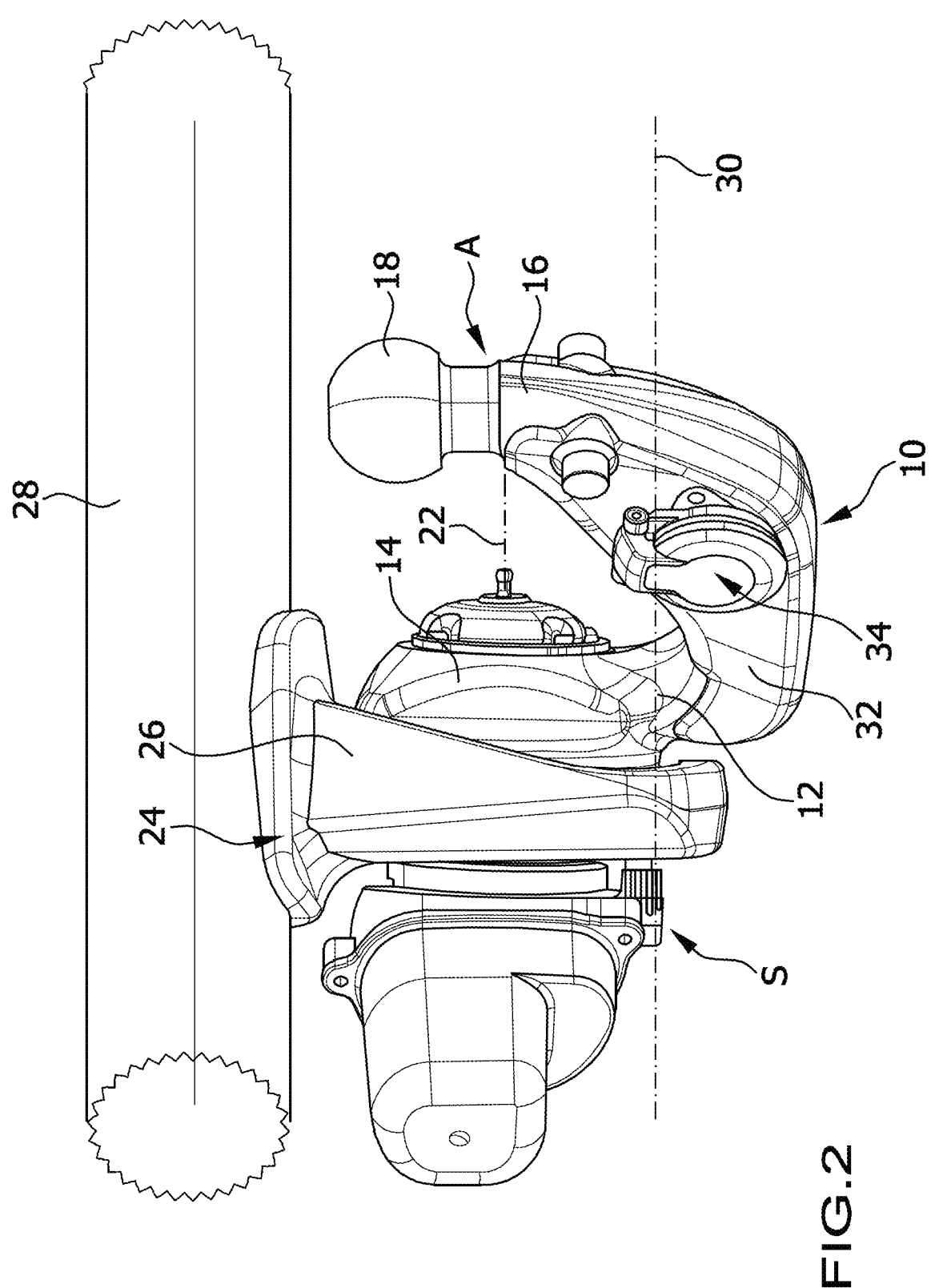
FIG. 2 shows a perspective view of a first exemplary embodiment of a trailer coupling according to the invention, with a view approximately in the direction of travel of the trailer coupling as it is to be mounted on the rear of the vehicle, wherein the trailer coupling is in its working position.
Figure 3:
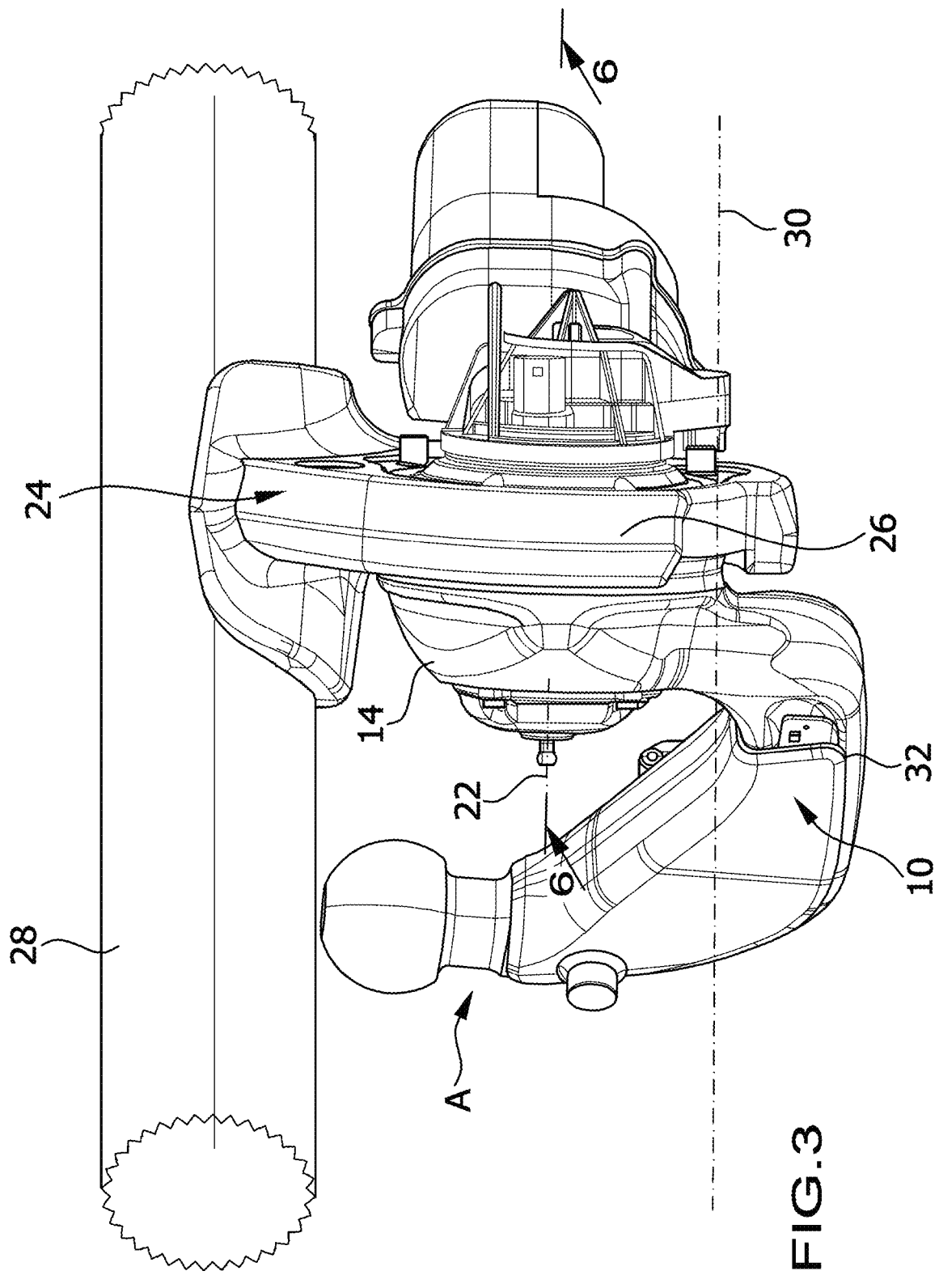
FIG. 3 shows a perspective view of the trailer coupling in FIG. 2, in the opposite direction to the direction of travel, and in the working position.
Figure 4:
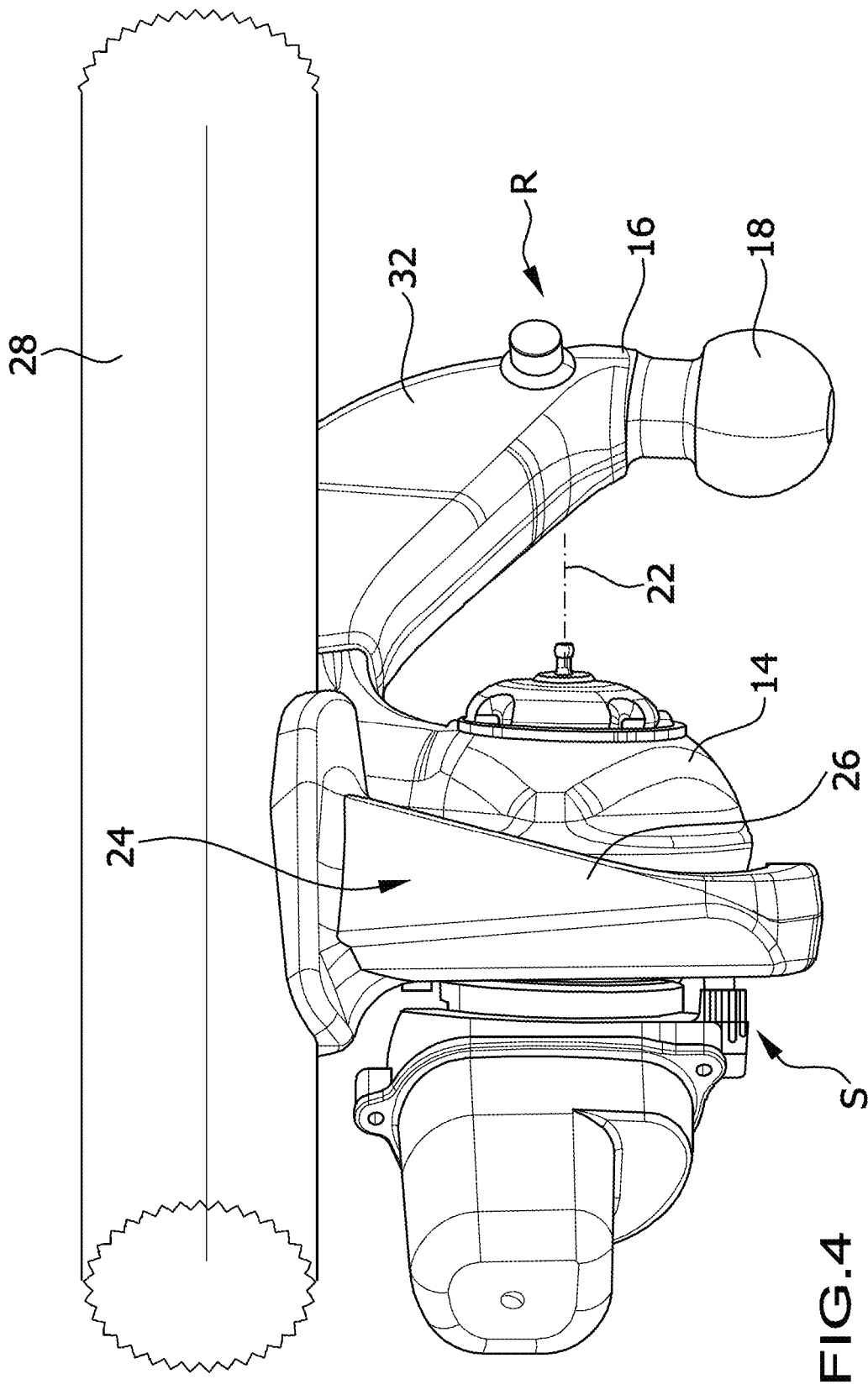
FIG. 4 shows a view corresponding to FIG. 2, of the trailer coupling in the rest position.
Figure 5:
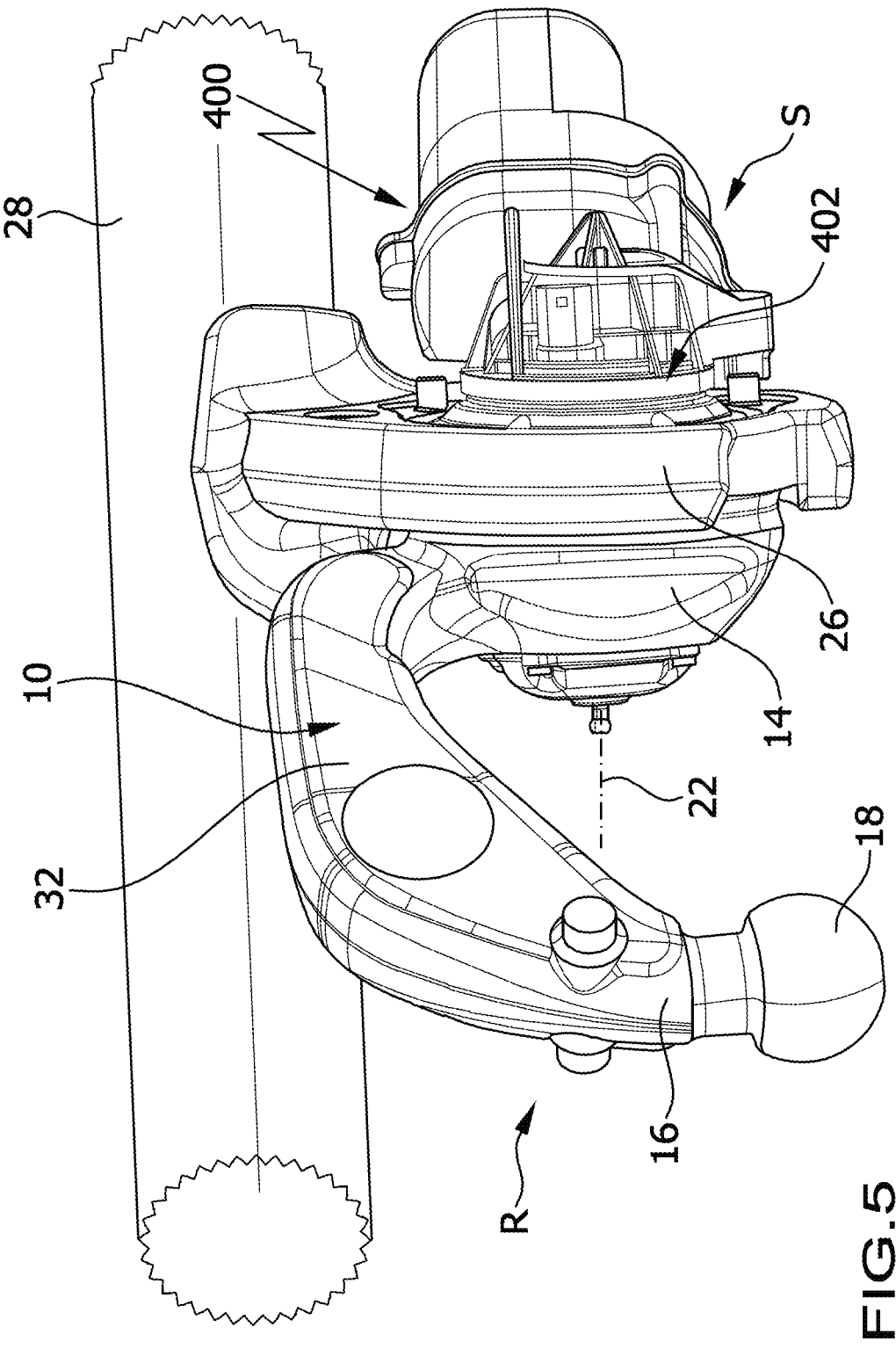
FIG. 5 shows a view of the trailer coupling corresponding to FIG. 3, in the rest position.

An exemplary embodiment of a trailer coupling AK according to the invention for a motor vehicle K, which is illustrated in a working position A in FIGS. 1 to 3 and in a rest position R in FIGS. 4 and 5, comprises a ball neck, which is designated 10 as a whole, is held at a first end 12 on a pivot bearing body 14, and carries at a second end 16 a coupling ball, designated 18, wherein a coupling ball receptacle of a trailer or a load carrier is configured to be fixed on the coupling ball.

The pivot bearing body 14 is mounted such that it is pivotal about a pivot axis 22 in relation to a carrier 24 fixed to the vehicle, by a pivot unit that is designated S as a whole, wherein the carrier 24 has for example a bearing plate 26, which holds the pivot unit S, preferably extends in a plane perpendicular to the pivot axis 22 and is held on a transverse carrier 28 that is fixed to the vehicle and is configured to be secured in known manner to a rear region H of a vehicle body F of the motor vehicle K such that the pivot unit S and the carrier 24 are located on a side of a lower edge 30 of a bumper unit that is remote from a road surface FO, and, as seen in the direction of travel of the motor vehicle K, from behind are covered by the bumper unit 36 such that, in the working position, only the ball neck 10 with the second end 16 and the coupling ball 18 is visible, while the entire carrier 24, in particular the transverse carrier 28, is hidden by the bumper unit 36.

In the working position A, which is illustrated in FIGS. 1 to 3, the ball neck 10 engages below the lower edge 30 of the bumper unit 36 by means of a portion 32 adjoining the first end 12, such that in the working position the second end 16 and the coupling ball 18, together with a plug socket 34, are accessible on a side of the rear bumper unit 36 remote from the vehicle body F.

If, by contrast, the ball neck 10 is pivoted into the rest position R, which is illustrated in FIGS. 4 and 5, the portion 32 of the ball neck 10 that adjoins the first end 12 is located higher above the road surface FO than the coupling ball 18, so the ball neck 10 as a whole is hidden from view from the back by the bumper unit 36, between the bumper unit 36 and the rear region H of the vehicle body F.

Moreover, in both the working position A and the rest position R, from behind as seen in the direction of travel of the motor vehicle K, the pivot unit S as a whole is always hidden by the rear bumper unit 36, between it and the rear region of the vehicle body F.

Figure 6:
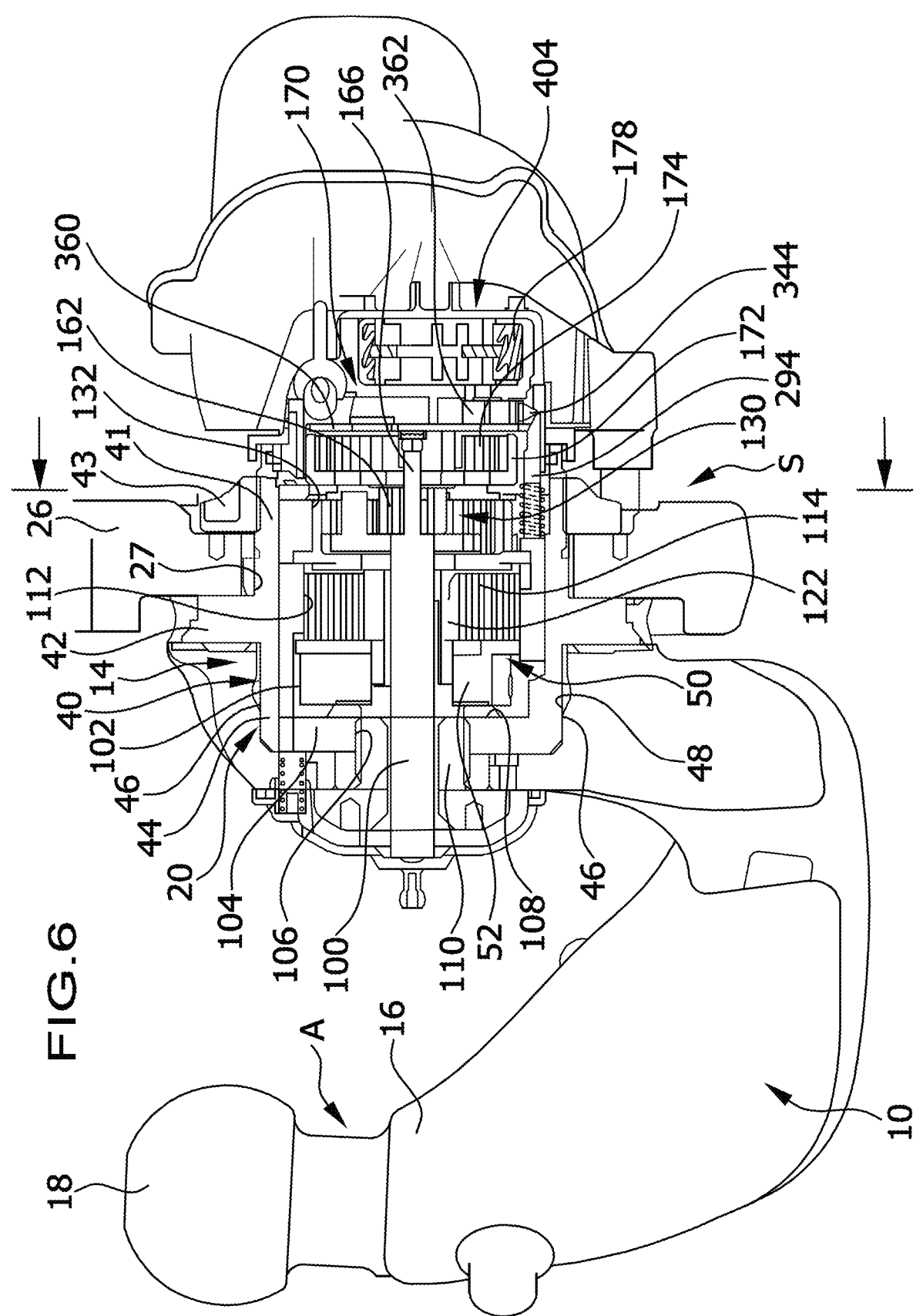
FIG. 6 shows an illustration of a section along the line 6-6 in FIG. 3, in the working position.
Figure 7:
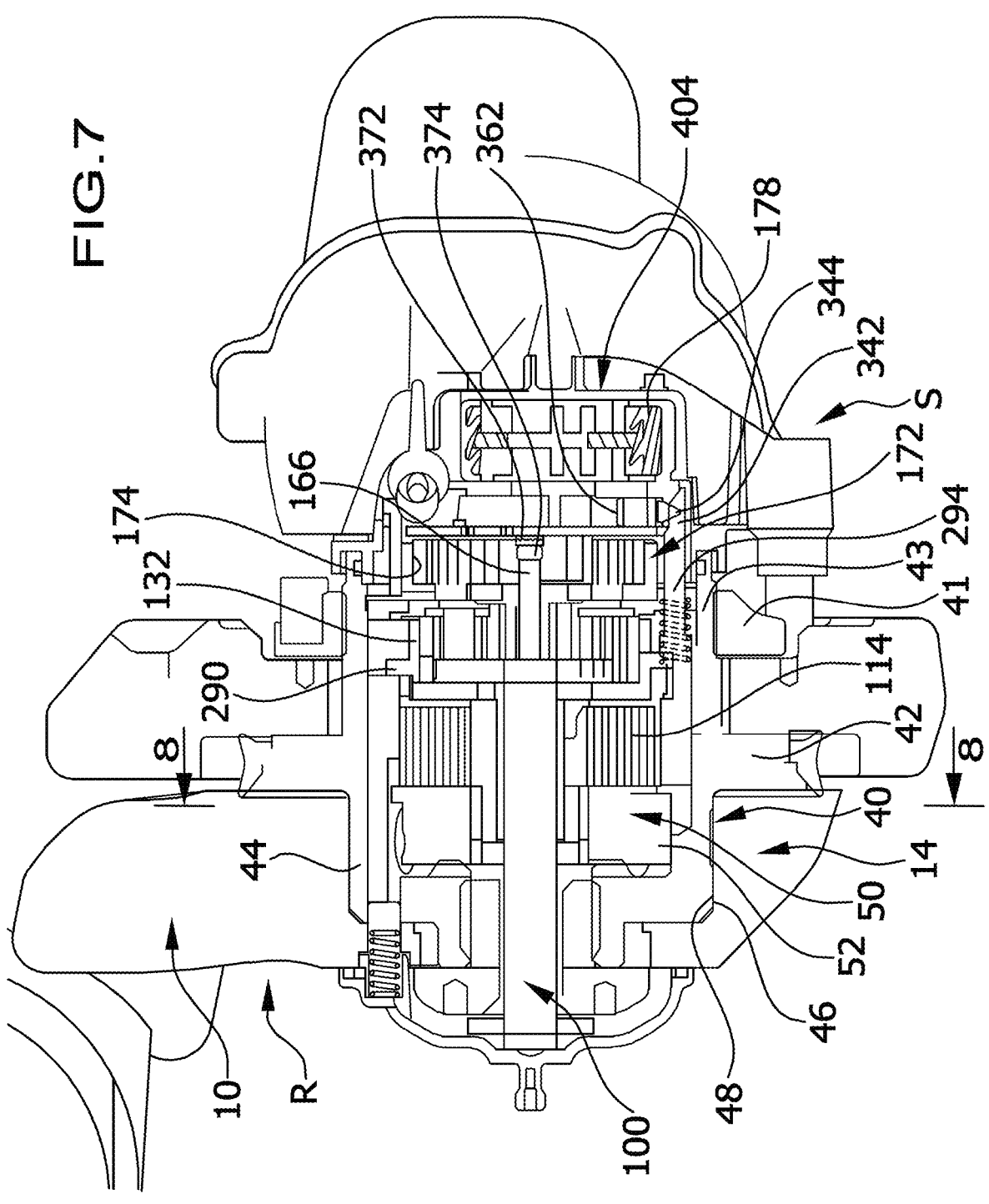
FIG. 7 shows an illustration of a section similar to FIG. 6, in the rest position.

As illustrated in FIGS. 6 and 7, the pivot unit S comprises a pivot bearing unit 20 having a guide body 40, which is fixedly connected to the bearing plate 26 by a flange 42, and a guide sleeve 44 that extends away from the bearing plate 26, starting from the flange 42, wherein the pivot bearing body 14 of the ball neck 10 is mounted on the guide sleeve 44 such that it is rotatable about the pivot axis 22.

For this purpose, the guide sleeve 44 comprises for example a cylinder outer face 46 against which the pivot bearing body 14 abuts by means of a cylindrical inner face 48 and hence undergoes rotary guidance about the pivot axis 22, with the result that the pivot bearing body 14 is mounted such that it is rotatable in relation to the guide body 40 in order to pivot the ball neck 10 from the working position A into the rest position R and vice versa.

The guide body 40 moreover comprises a prolonged portion 41 that extends through an aperture 27 in the bearing plate 26, extending as far as an opposite side of the aperture 27 to the flange 42, and carries a holding ring 43 that abuts against an opposite side of the bearing plate 26 to the flange 42, such that the bearing plate 26 as a whole is clamped between the flange 42 and the holding ring 43 and thus the guide body 40 is fixedly connected to the bearing plate 26 of the carrier 24 and so forms a rotational bearing that is fixed to the vehicle, for the pivot bearing body 14.

Figure 8:
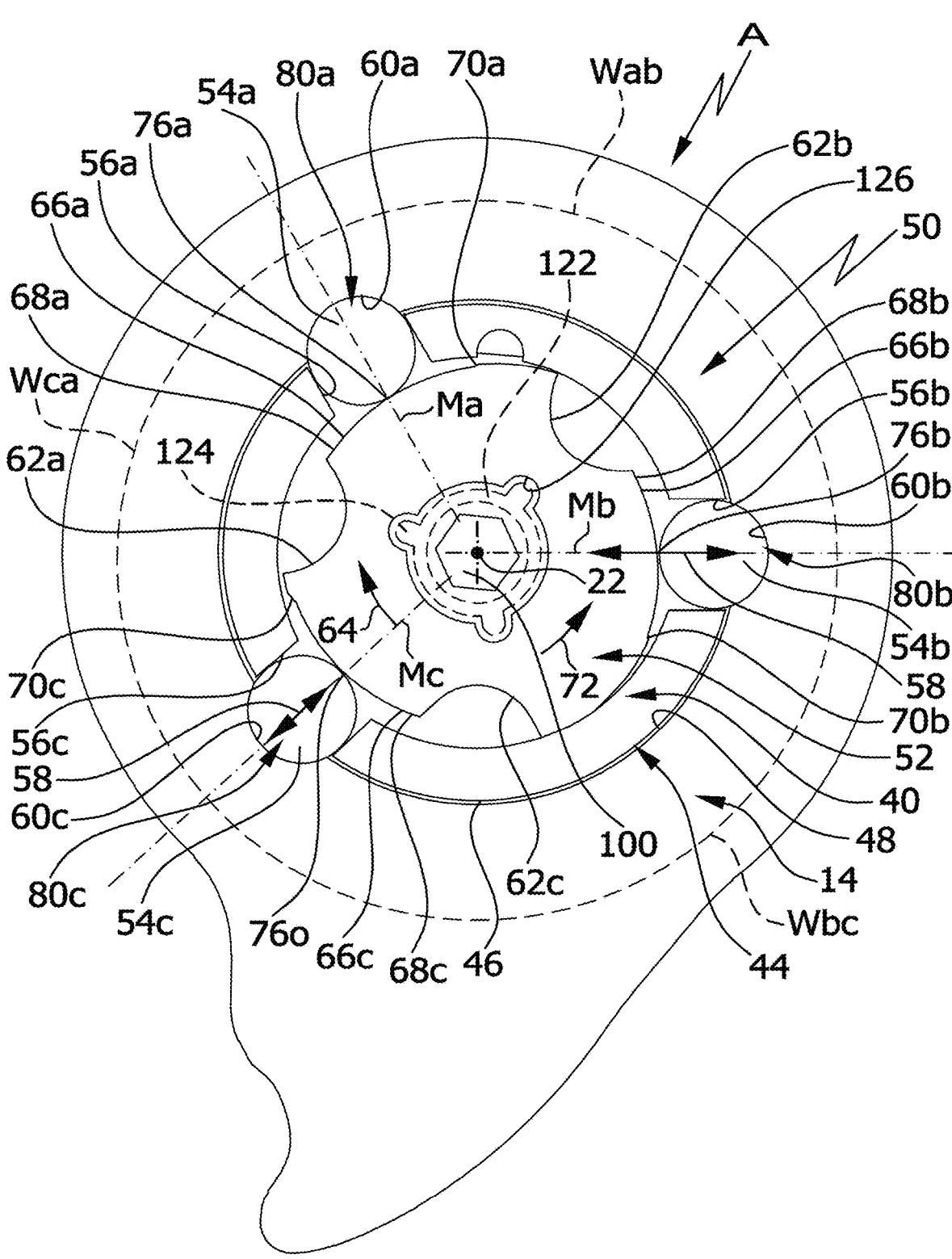
FIG. 8 shows a section along the line 8-8 in FIG. 7, in the working position.
Figure 9:
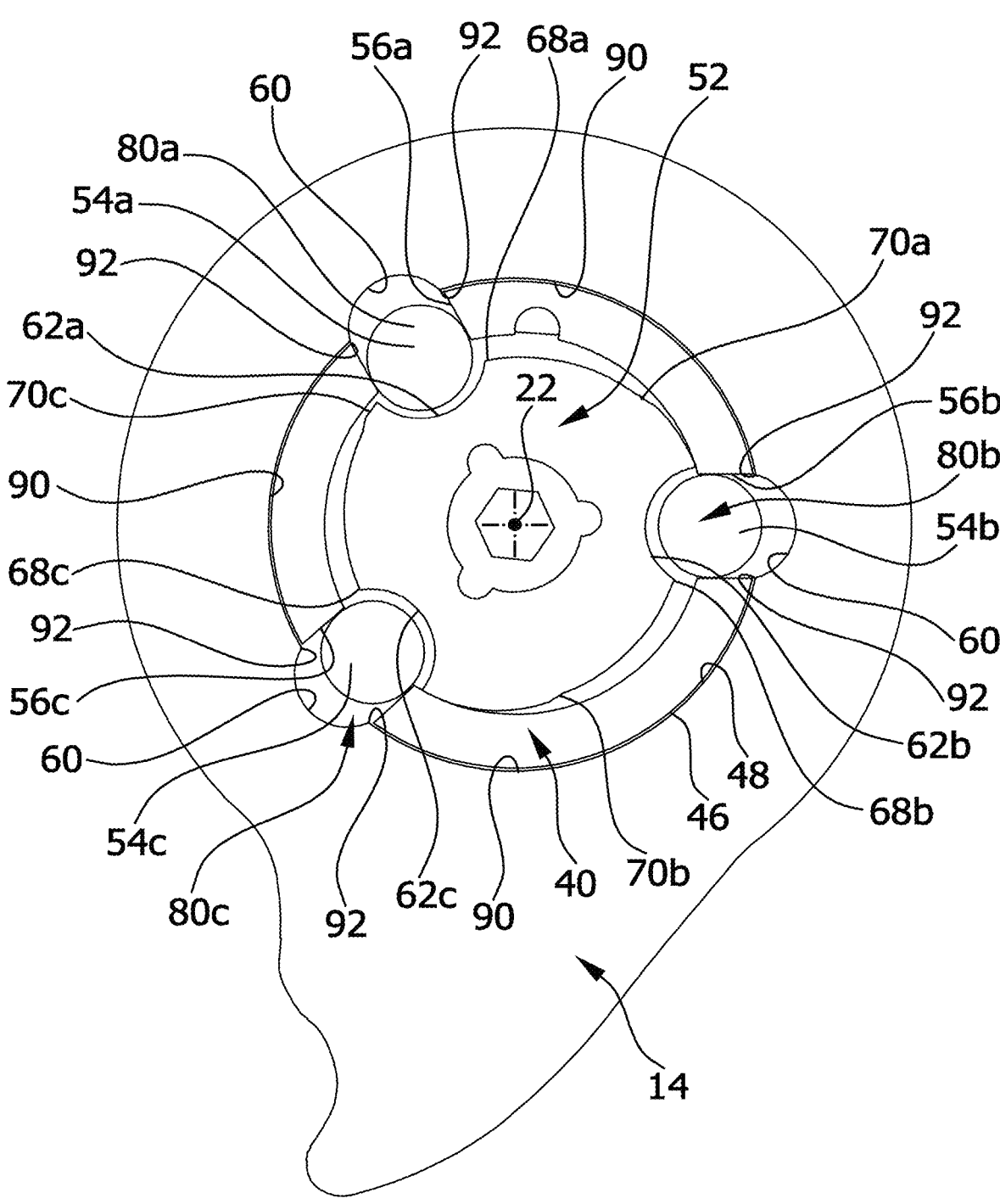
FIG. 9 shows an illustration of a section similar to FIG. 8, in the release position, with the actuation body rotated to the maximum extent.
Figure 10:
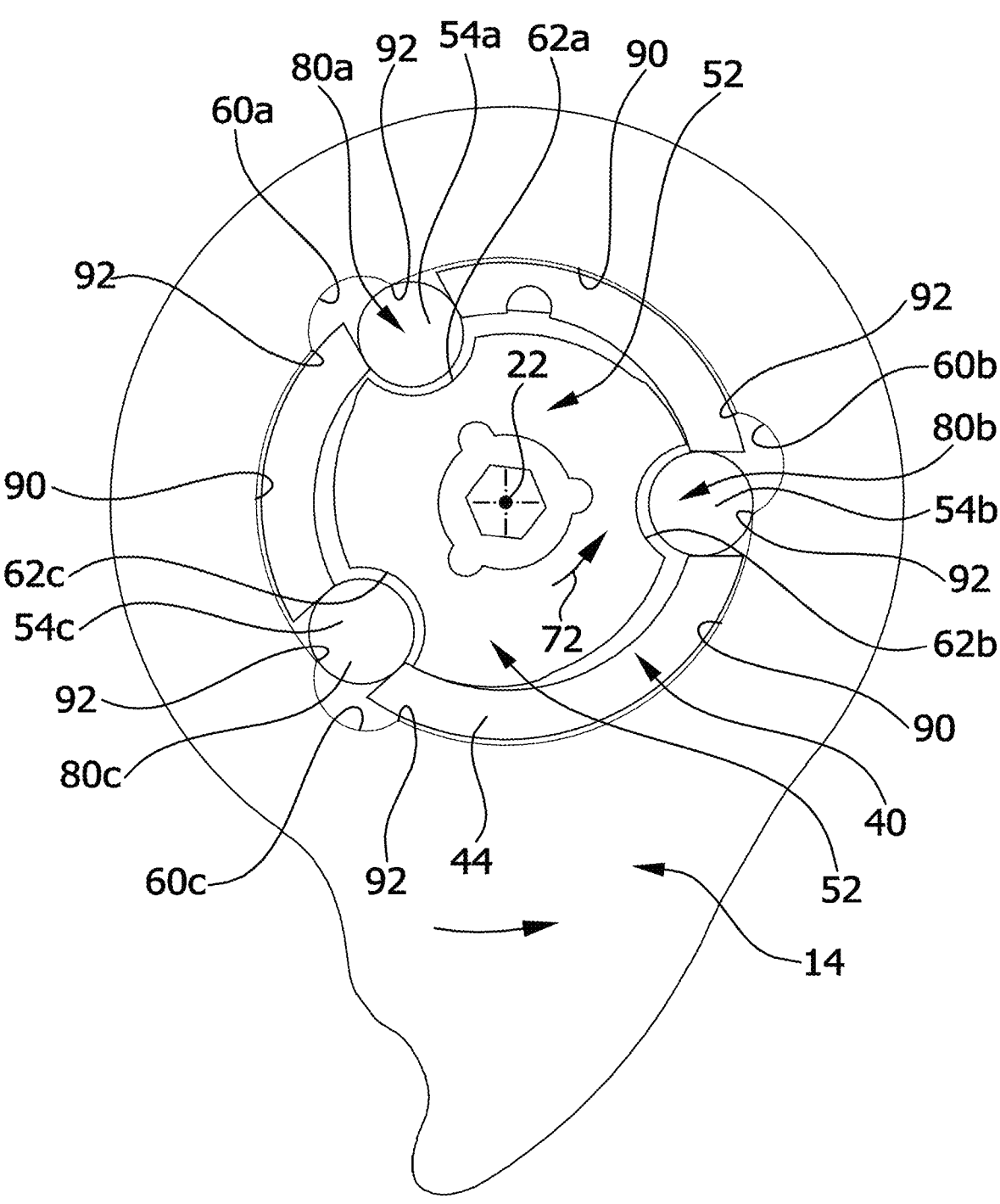
FIG. 10 shows an illustration similar to FIG. 9, with the pivot bearing body pivoted slightly out of the working position, with the actuation body rotated to the maximum extent.

In addition to the pivot bearing unit 20, the pivot unit S comprises a rotation-blocking device that is designated 50 as a whole and is for example integrated within the pivot bearing unit 20 but may also be arranged independently of the pivot bearing unit 20 and, as illustrated in FIGS. 8 to 10, in addition to the actuation body 52 has a plurality of rotation-blocking bodies 54 that are urged by the actuation body 52 and of which each is guided such that it is movable in a guide receptacle 56 of the guide sleeve 44 in a guide direction 58 that runs substantially radially in relation to the pivot axis 22.

For example, at least the rotation-blocking bodies 54 and the guide receptacles 56 are arranged symmetrically in relation to a geometric plane that runs perpendicular to the pivot axis 22, intersects the rotation-blocking bodies 54 and corresponds to the plane of the drawing in FIGS. 8 to 10.

Further, the rotation-blocking device 50 comprises receptacles 60 that extend in particular in the radial direction in relation to the pivot axis 22, starting from the inner face 48 of the pivot bearing body 14 and extending into it, wherein the rotation-blocking bodies 54 are configured to be brought into engagement with the receptacles 60 in the working position A, and wherein the receptacles 60 have wall faces that are at a smaller and smaller spacing from one another in the radial direction in relation to the pivot axis 22.

If for example the rotation-blocking device 50 comprises a set of three rotation-blocking bodies 54a, 54b and 54c, as illustrated in the first exemplary embodiment in conjunction with FIG. 8 to FIG. 10, then the guide sleeve 44 has a corresponding set of three guide receptacles 56a, 56b and 56c in which the rotation-blocking bodies 54a, 54b and 54c are displaceably guided in the guide direction 58, which runs substantially radially in relation to the pivot axis 22, and the pivot bearing body 14 is provided with a set of receptacles 60a, 60b and 60c with which the rotation-blocking bodies 54a, 54b and 54c are configured to be brought into engagement in the working position A.

For the purpose of suitably moving and positioning the rotation-blocking bodies 54 in the guide direction 58, the actuation body 52 is provided with a set, corresponding to the number of rotation-blocking bodies 54, of retraction receptacles 62a, 62b, 62c, for example three in total, and three pressure faces 66a, 66b and 66c that adjoin the retraction receptacles 62a, 62b, 62c in a circumferential direction 64 and take the form of wedge faces acting radially in relation to the pivot axis 22, wherein, in their release position, the rotation-blocking bodies 54 can penetrate far enough into the retraction receptacles 62a, 62b, 62c (FIG. 9) for them no longer to project beyond the cylinder outer face 46 of the guide sleeve 44, and wherein the pressure faces 66a, 66b, 66c each extend, from a radially inward starting region 68a, 68b and 68c that directly adjoins the respective retraction receptacles 62, increasingly radially outward in relation to the pivot axis 22 as their extent in the circumferential direction 64 increases, as far as a respective radially outward end region 70a, 70b and 70c and thus, when there is a rotary movement of the actuation body 52, act as wedge faces on the rotation-blocking bodies 54 in order to move them into their rotation-blocking position.

Preferably in this case, the pressure faces 66 extend in the manner of spiral or involute segments in relation to the pivot axis 22.

In order either to keep the rotation-blocking bodies 54 in their rotation-blocking position as a result of their being urged by the pressure faces 66 between the starting region 68 and the end region 70, or to allow them to penetrate into the retraction receptacles 62 in the release position, the actuation body 52 is likewise rotatable about the pivot axis 22, in particular coaxially thereto, such that either the set of retraction receptacles 62a, 62b and 62c faces the rotation-blocking bodies 54 and, as illustrated in FIG. 9, in its inactive position or release position allows these to penetrate into the retraction receptacles 62 in the radial direction toward the pivot axis 22 during transfer into the release position, in order to enable the respective rotation-blocking bodies 54 to come out of the receptacles 60 and, together with the pivot bearing body 14, to release them for rotation about the pivot axis 22 in relation to the guide body 40, such that the pivot bearing body 14, with the ball neck 10, is freely and unimpededly rotatable in relation to the guide sleeve 44, as illustrated in FIG. 9, in which case the rotation-blocking bodies 54 do not extend beyond the cylinder outer face 46 of the guide sleeve 44.

Rotating the actuation body 52 in a direction of rotation 72 in opposition to the circumferential direction 64 when the rotation-blocking bodies 54 are seated in the retraction receptacles 62 has the effect that the rotation-blocking bodies 54 are moved out of the retraction receptacles 62 and initially, in the active position or rotation-blocking position of the actuation body 52, lie on the starting regions 68 of the pressure faces 66 but in so doing penetrate for example into the receptacles 60 and hence, in their rotation-blocking position, prevent the pivot bearing body 14 from being able to rotate freely in relation to the guide body 40.

If the actuation body 52 is rotated further in the direction of rotation 72, in opposition to the circumferential direction 64, then regions of the pressure faces 66 that lie further and further radially outward in relation to the pivot axis 22 act on the rotation-blocking bodies 54, and thus, in the working position A of the ball neck 10, push the rotation-blocking bodies 54 further and further into the receptacles 60a, 60b and 60c (FIG. 8), in order in this way to achieve substantially play-free fixing of the pivot bearing body 14 in relation to the guide body 40, in this case in relation to the guide sleeve 44.

In the rotation-blocking position of the rotation-blocking bodies 54, the actuation body 52 is in its active position in such a way that, as illustrated in FIG. 8, the rotation-blocking bodies 54 lie approximately on central regions 76, located between the starting regions 68 and the end regions 70, of the pressure faces 66 and are urged thereby.

In order to enable the actuation body 52 to urge each of the three rotation-blocking bodies 54 respectively in optimum manner, in the active position it is provided for the actuation body 52 to undergo centring corresponding to the position of the rotation-blocking bodies 54. In particular, the actuation body 52 is mounted in the guide sleeve 44 such that, because of the radial play, the actuation body 52 can centre itself relatively within the guide body 40 in a manner corresponding to the position of the rotation-blocking bodies 54 that results from manufacturing tolerances, wherein the self-centring of the actuation body 52 may differ slightly from a coaxial arrangement in relation to the geometric pivot axis 22.

Because of the self-centring, the rotation-blocking bodies 54a, 54b and 54c act on the receptacles 60a, 60b and 60c in the respective guide direction 58a, 58b and 58c with forces of approximately equal size, with the result that the reaction forces acting on the actuation body 52 are also of approximately equal size.

Preferably, the rotation-blocking bodies 54 take the form of balls or rollers, which thus abut on one side against the actuation body 52 and on the other also against the receptacles 60.

Thus, the actuation body 52 is mounted in relation to the pivot axis 22 such that it is only rotatable with play, and this is primarily of relevance when the actuation body 52 keeps the rotation-blocking bodies 54 in a release position in which the rotation-blocking bodies 54 penetrate into the retraction receptacles 62 of the actuation body 52.

In order to cause the actuation body 52 always to move in the direction of rotation 72 in the absence of any external action, wherein the rotation-blocking bodies 54 move in the direction of the rotation-blocking position, the actuation body 52 is urged by a torsion spring 114 (FIGS. 6 and 7) that on the one hand acts on the actuation body 52 and on the other is supported radially outward against the guide body 40.

The torsion spring 114 also has the effect that the actuation body 52 pushes the rotation-blocking bodies 54 into the receptacles 60 in a manner urged by force, and in this way the pivot bearing body 14 is fixed without play, the absence of play being maintained even in the event of the geometry of the receptacles 60 changing under operational load as a result of a further rotation of the actuation body 52 in the direction of rotation 72.

The rotation-blocking device 50 may take a form such that, in the working position A and the rest position R, the ball neck 10 is fixed such that it cannot rotate, as described for example in EP 2 261 066 A, or such that the ball neck 10 is only fixed such that it cannot rotate in the working position A, as described for example in EP 3 141 405 A or EP 3 815 936 A.

By means of a portion that forms a receptacle 102 for the actuation body 52, the guide sleeve 44 preferably extends between the flange 42 and a flange 104 that terminates the guide sleeve 44, extends radially in relation to the pivot axis 22, and is preferably integrally formed in one piece with the guide sleeve 44 and delimits the receptacle 102 for the actuation body 52, with the result that the actuation body 52 is guided, radially in relation to the pivot axis 22, by the receptacle 102 in the guide sleeve 44 and is guided axially in the direction of the pivot axis 22 by abutting against an inner side 108 of the flange 104.

Further, the flange 104 also has a receptacle 106 that is coaxial in relation to the pivot axis 22 and into which there is inserted, in particular screwed, an insert 110 through which a pivotal drive shaft 100 passes, wherein the insert 110 is seated in the receptacle 106.

On an opposite side of the receptacle 102 for the actuation body 52 to the flange 104, the guide sleeve 44 forms, for example by means of a portion passing through the flange 42, a torsion spring receptacle 112 in which there is arranged, adjoining the actuation body 52, the torsion spring 114, which is fixed on the one hand by means of an outer end in the torsion spring receptacle 112 and is connected by means of an inner end to a drive sleeve 122, which is coupled to the actuation body 52 such that it cannot rotate in relation thereto.

Figure 11:
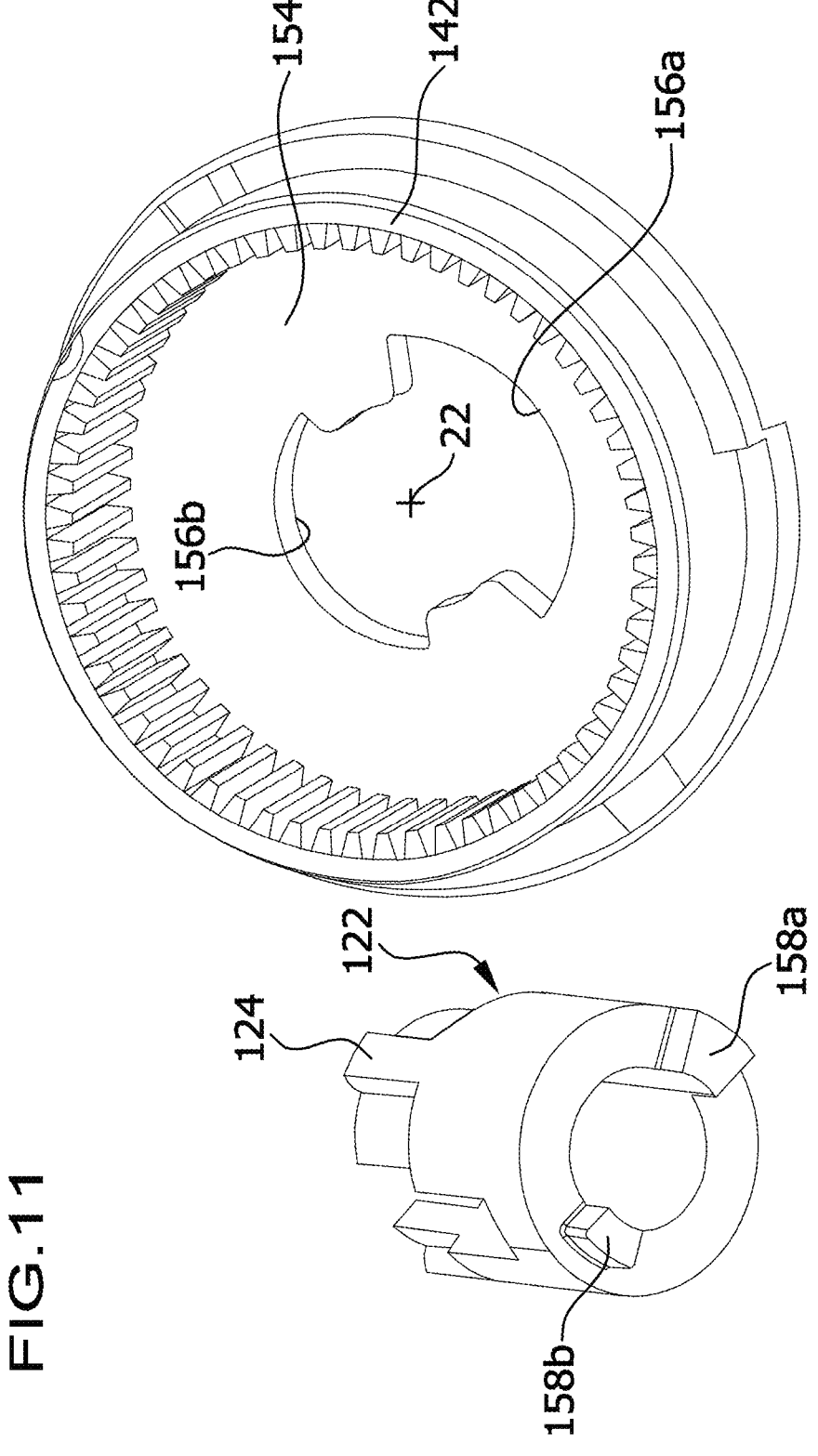
FIG. 11 shows a perspective illustration of a ring gear and a drive sleeve cooperating therewith.

For this purpose, and as illustrated in FIGS. 7, 8 and 11, the drive sleeve 122 is provided for example with prolonged portions 124 that engage in corresponding recesses 126 in the actuation body 52 for the purpose of making a positively engaging connection.

Because the torsion spring 114 acts on the drive sleeve 122, which is coupled to the actuation body 52 such that it cannot rotate in relation thereto, as a result of the torsion spring 114 acting on the drive sleeve 122 the actuation body 52 is driven in the direction of rotation 72, such that the actuation body 52, while the torsion spring 114 acts unimpededly on the drive sleeve 122, always urges the actuation body 52 in the direction of rotation 72, with the result that the actuation body 52 tends to move the rotation-blocking bodies 54 in a manner urged by force in the guide direction 58, radially outward away from the pivot axis 22, wherein this movement may be prevented for example by the blocking faces 90, where these take a suitable form, in all the pivotal positions of the pivot bearing body 14 that are provided with the exception of the working position A, as described for example in DE 10 2020 111 469 A, and consequently it is only in the working position A that the rotation-blocking bodies 54 are pushed into the receptacles 60 and thus the pivot bearing body 14 is fixed such that it cannot rotate in relation to the guide sleeve 44 and in particular is fixed without play.

In order that the rotation-blocking bodies 54 can move into the release position, action on the actuation body 52 in opposition to the direction of rotation 72 and thus also in opposition to the action of the torsion spring 114 is required.

For this purpose, the drive sleeve 122 is configured to be driven by means of a distribution gear 130 that is designated 130 as a whole, in particular a distribution gear or epicyclic gear (FIGS. 6, 7), and is arranged in a gear receptacle 132 in the guide sleeve 44, in particular coaxially in relation to the pivot axis 22, and is arranged for example partly within the aperture 27 in the bearing plate 26 and preferably extends away from the aperture 27 in the bearing plate 26 on an opposite side to the flange 42.

Figure 12:
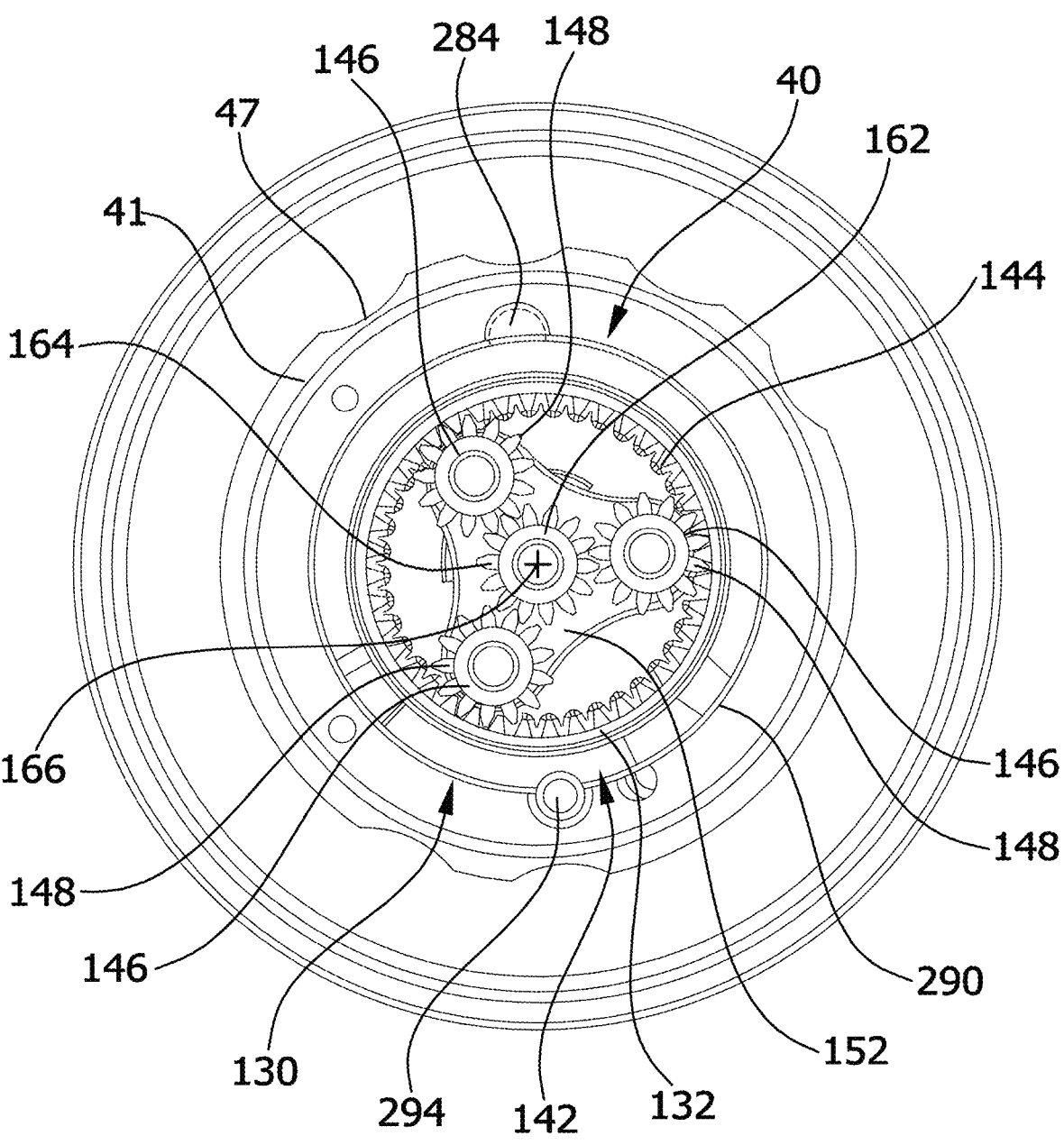
FIG. 12 shows a section along the line 12-12 in FIG. 6, with a view of a distribution gear comprising the ring gear, without the bearing plate or the holding ring.

The distribution gear 130 (FIG. 12) for its part comprises a ring gear 142 that is guided in the gear receptacle 132 and is provided with an internal toothing 144 with which planet wheels 146 engage by means of their external toothing 148.

Here, the planet wheels 146 are held rotatably on a planet wheel carrier 152 that for its part is connected to the pivotal drive shaft 100 such that it cannot rotate in relation thereto, with the result that the planet wheel carrier 152 forms an output drive of the distribution gear 130 for pivoting the ball neck 10.

Further, as illustrated in FIG. 11, the ring gear 142 comprises a flanged body 154 that is located between the planet wheel carrier 152 and the torsion spring 114 and likewise extends in the direction of the pivotal drive shaft 100 and surrounds it, albeit being rotatable in relation thereto, and represents an output drive of the distribution gear 130 for actuating the rotation-blocking device 50.

As illustrated in FIG. 11, the flanged body 154 has arcuate drive slots 156a, 156b, which are arranged peripherally around the pivot axis 22, cooperate with drive fingers 158a, 158b of the drive sleeve 122 that engage therein, and yet take a form such that the difference between the angular range around the pivot axis 22 over which the drive slots 156 extend and the angular range around the pivot axis 22 over which the drive fingers 158 extend makes it possible to free movement of the drive sleeve 122 from the ring gear 142 in a manner that is explained in detail below.

Further, the planet wheels 146 engage by means of their external toothing 148 with an external toothing 164 of a sun wheel 162 of the distribution gear 130, the sun wheel 162 being mounted on a shaft stub 166 of the pivotal drive shaft 100 such that it is freely rotatable in relation to the pivotal drive shaft 100 but coaxial therewith.

Figures 13, 14:
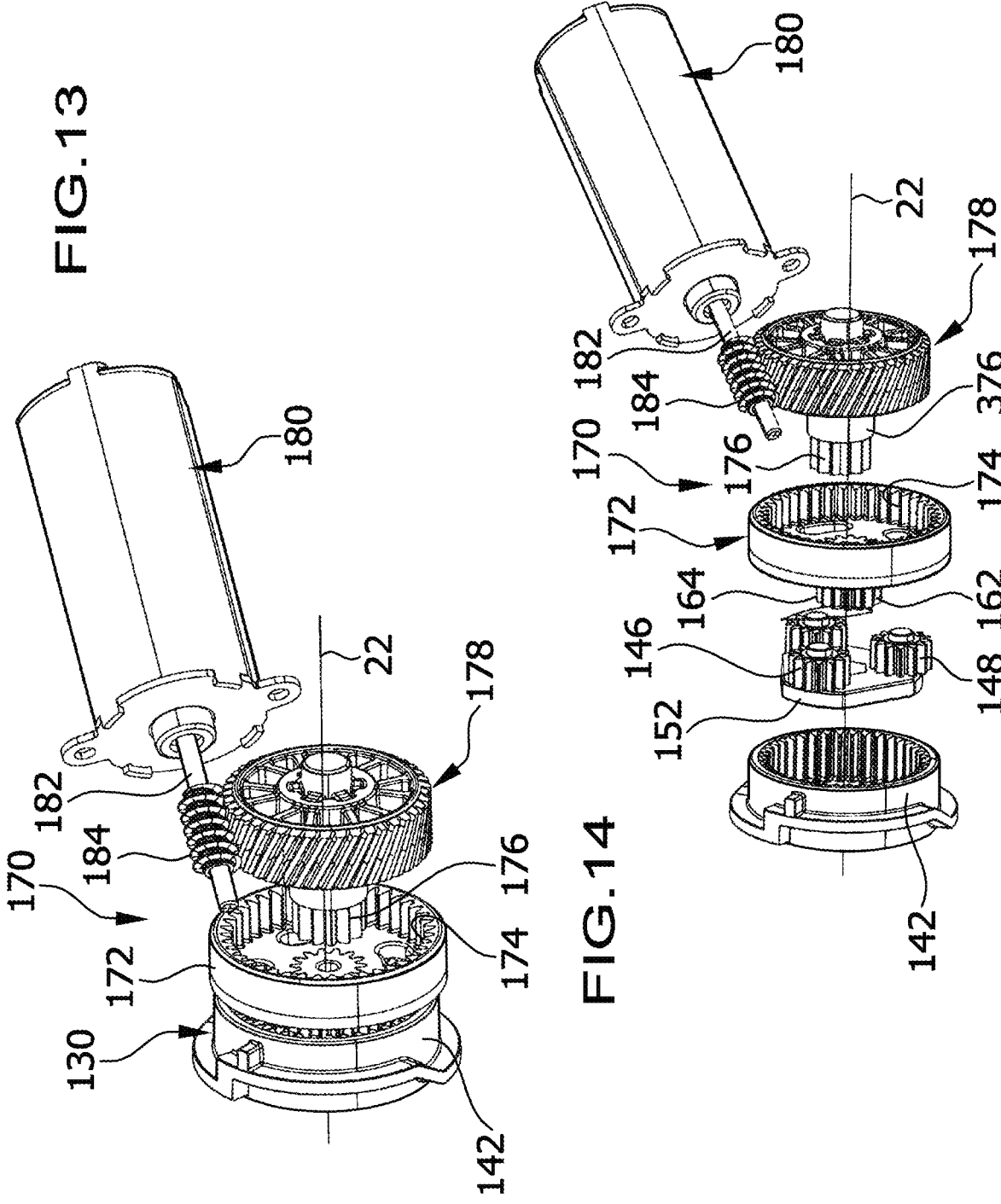
FIG. 13 shows a perspective illustration of the distribution gear with an upstream step-down gear.
FIG. 14 shows a perspective exploded illustration of the distribution gear and the step-down gear.

As illustrated in FIG. 13 and FIG. 14, the sun wheel 162 is driven by a step-down gear 170 that for its part has, on the output side, a ring gear 172, which is coupled to the sun wheel 162 such that it cannot rotate in relation thereto and which is provided with an internal toothing in which there engages a pinion 176 that is arranged eccentrically in relation to the pivot axis 22 and for its part is itself connected to a worm wheel 178 such that it cannot rotate in relation thereto, the worm wheel 178 being driven by a drive worm 184 arranged on an output shaft 182 of a drive motor 180, wherein the drive worm 184 represents the drive-side gear element of the step-down gear 170.

In this way, the distribution gear 130, the step-down gear 170 and the drive motor 180 make it possible to achieve actuation of the rotation-blocking device 50 and pivoting of the ball neck 10 by means of the drive motor 180.

Figure 15:
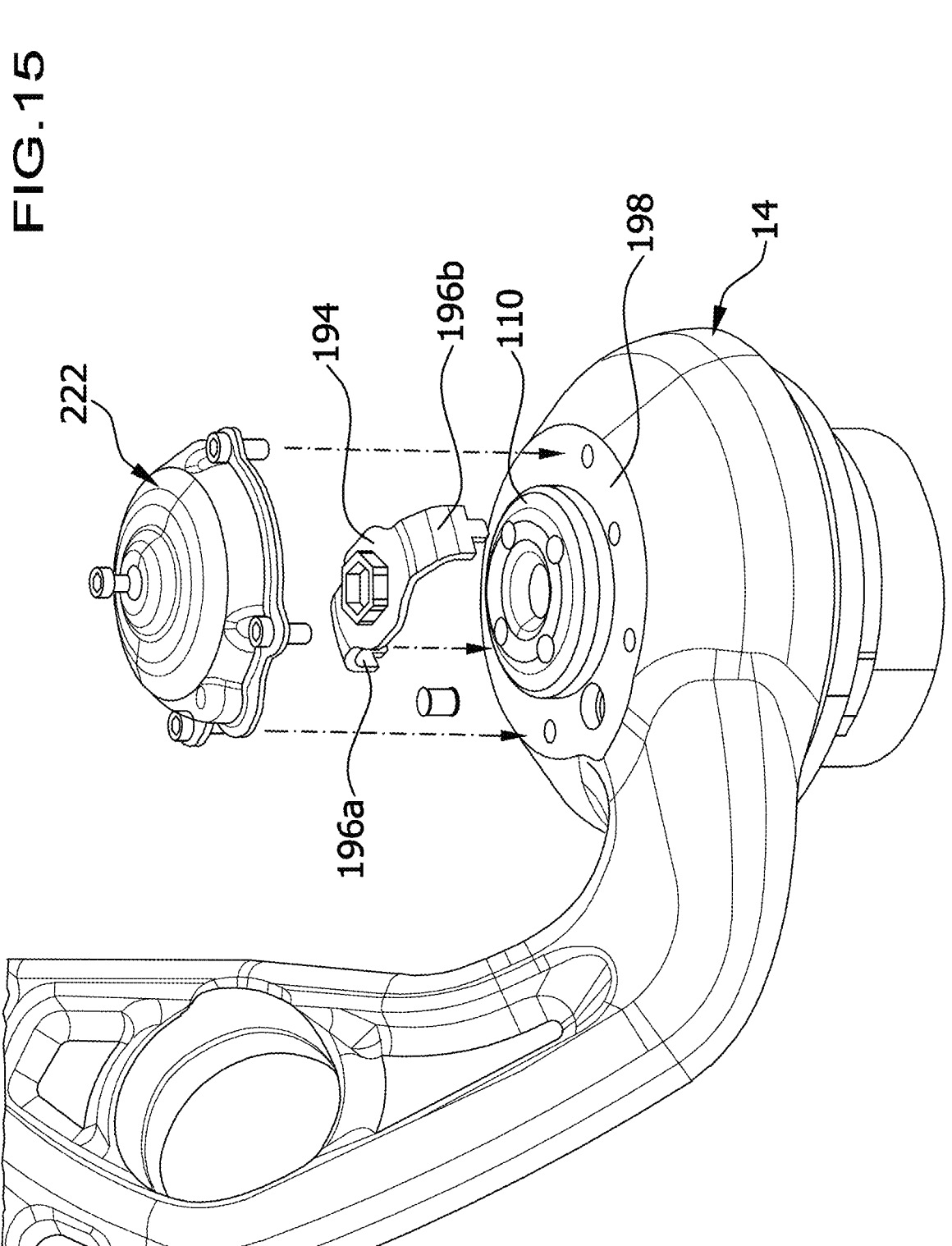
FIG. 15 shows a perspective exploded illustration of the pivot bearing body, with cover.

The pivotal drive shaft 100, which is coupled to the planet wheel carrier 152 such that it cannot rotate in relation thereto, passes through the flange 104 of the guide body 40, as described above, and is coupled to a drive body 194 such that it cannot rotate in relation thereto, at an end 192 projecting beyond the insert 110 (FIGS. 15 and 16), wherein the drive body 194 has two drive arms 196a and 196b that extend in the direction of an end flange 198 of the pivot bearing body 14, which engages over an external region 200 of the flange 104 of the guide body 14, and in so doing the drive arms 196a and 196b engage positively in recesses therein in order to make a connection between the drive body 194 and the pivot bearing body 14 such that they cannot rotate in relation to one another.

Here, the end flange 198 engages over the flange 104 of the guide body 40 in the external region 200 and extends as far as a guide attachment 202 of the flange 104, wherein the end flange 198 embraces, for example by means of a radially inner cylinder face 204, an outer cylinder face 206 of the guide attachment 202 and for example abuts against it and as a result is likewise additionally guided on the guide attachment 202, coaxially in relation to the pivot axis 22.

Moreover, extending in the receptacle 106 in the guide attachment 202 there is a thread 212 into which there is fixed, in particular screwed, the insert 110, which partially engages, by means of an outer flange 214, over the end flange 198 in a radially inner region, with the result that the end flange 198 of the pivot bearing body 14 is guided axially non-displaceably between the flange 104 and the outer flange 214 of the insert 110 and hence is guided such that it is axially non-displaceable in relation to the guide body 40.

Figure 17:
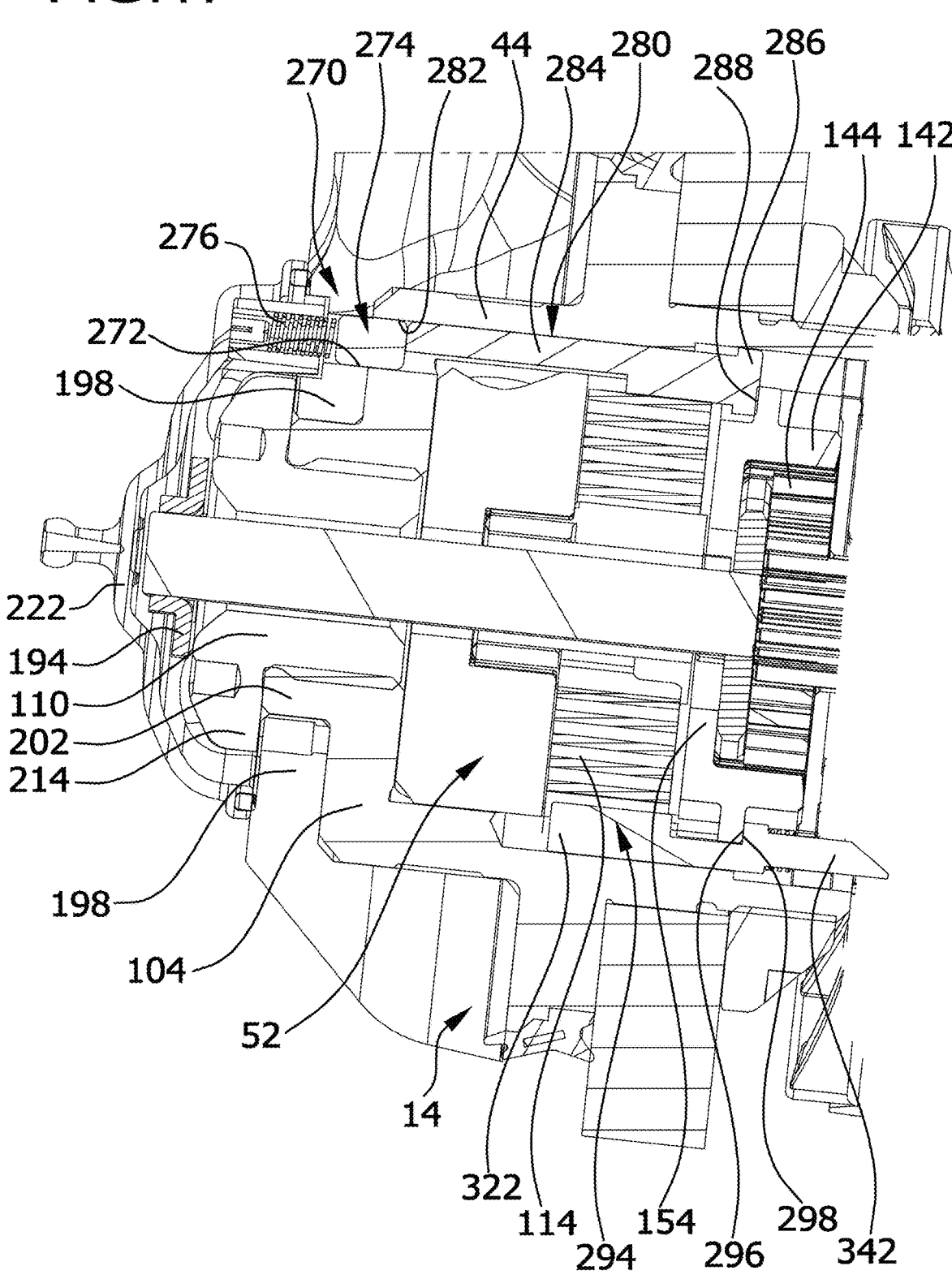
FIG. 17 shows an enlarged section, similar to FIG. 6, in the rest position.

Mounted on the end flange 198 such that it cannot rotate in relation thereto there is further a cover 222 that engages over the drive body 194 having the drive arms 196 and forms a bearing receptacle 224 for the end 192 of the guide shaft 100, with the result that the cover 222 forms with the pivot bearing body 14 a unit that is rotatable about the pivot axis 22 (FIG. 17).

Here, the cover 222 is seated on the end flange 198 and is fixed thereon such that it cannot rotate in relation thereto.

In the solution described above, only one set of receptacles 60 is provided for fixing the pivot bearing body 14 in the working position A such that it cannot rotate, whereas in the rest position R no fixing of the pivot bearing body 14 by the rotation-blocking device 50 is provided.

Figure 16:
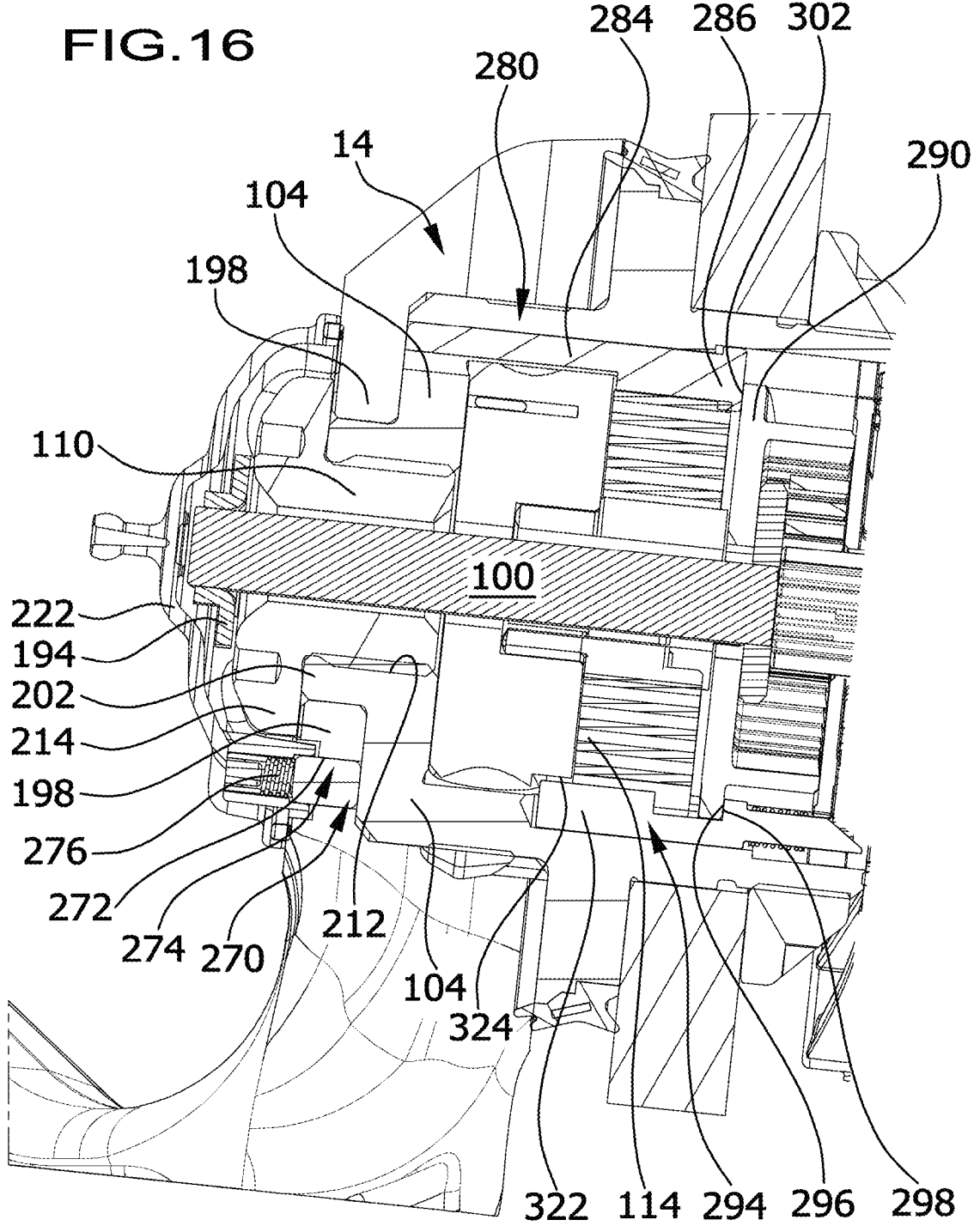
FIG. 16 shows an enlarged section from FIG. 6, in the working position.

Rather, for the purpose of fixing the pivot bearing body 14 in the rest position as illustrated in FIGS. 16 and 17, there is provided a rest position latching device 270, which has a latching body 274 that is provided in a bore 272 in the end flange 198 and is urged by the force of a spring element 276, arranged for example in the bore 272, in the direction of a latching direction parallel to the bore 272 and in the direction of the flange 104, wherein the latching body 274 abuts against the external region 200 of the flange 104 in all the rotary positions of the pivot bearing body 214 except the rest position R, wherein this external region 200 keeps the latching body 274 in its inactive position, and wherein the latching body 274 engages in a latching receptacle 282 taking the form of a latching bore in the flange 104 only when the pivot bearing body 14 is in the rest position (FIG. 17).

For this purpose, the spring element 276 urges the latching body 274 constantly in the direction of the flange side of the flange 104 that faces the end flange 198, and thus keeps it constantly in a latching-ready position, wherein engagement of the latching body 274 in the latching receptacle 282 and thus a transfer from the inactive position into the active latching position are only possible once the pivot bearing body 14 has reached the rotary position corresponding to the rest position R in relation to the guide body 40 of the pivot bearing unit 20.

In order to deactivate the rest position latching device 270—that is to say in order to move the latching body 274 out of the latching position—there is provided as a prolongation of the latching receptacle 282 in the guide sleeve 44 an actuation pin 284 that uses a sensor head 286 to scan a cam track 288 that is provided on the ring gear 142 and is arranged on a cam flange 290 running peripherally and radially outside of the internal toothing 144 on the ring gear 142, and thus forms a deactivation unit 280 for the rest position latching device 270.

FIGS. 18 to 24 show the cooperation of the rotary movement of the ring gear 142, starting from a rest position prevailing in the working position, on rotation in a direction of rotation 292, with the drive sleeve 122 for driving the actuation body 52 by means of the drive slots 156a and 156b, which are arranged in the flanged body 154 of the ring gear 142, with the drive fingers 158a, 158b engaging in these drive slots 156a, 156b, and with the sensor head 286 of the actuation pin 284 and a securing pin 294, which cooperates with a cam track 298, likewise formed by the cam flange 290, and scans this cam track 298 by means of a scanning surface 296 (FIG. 17), as explained in detail below.

Figures 18, 18A, 18B, 18C:
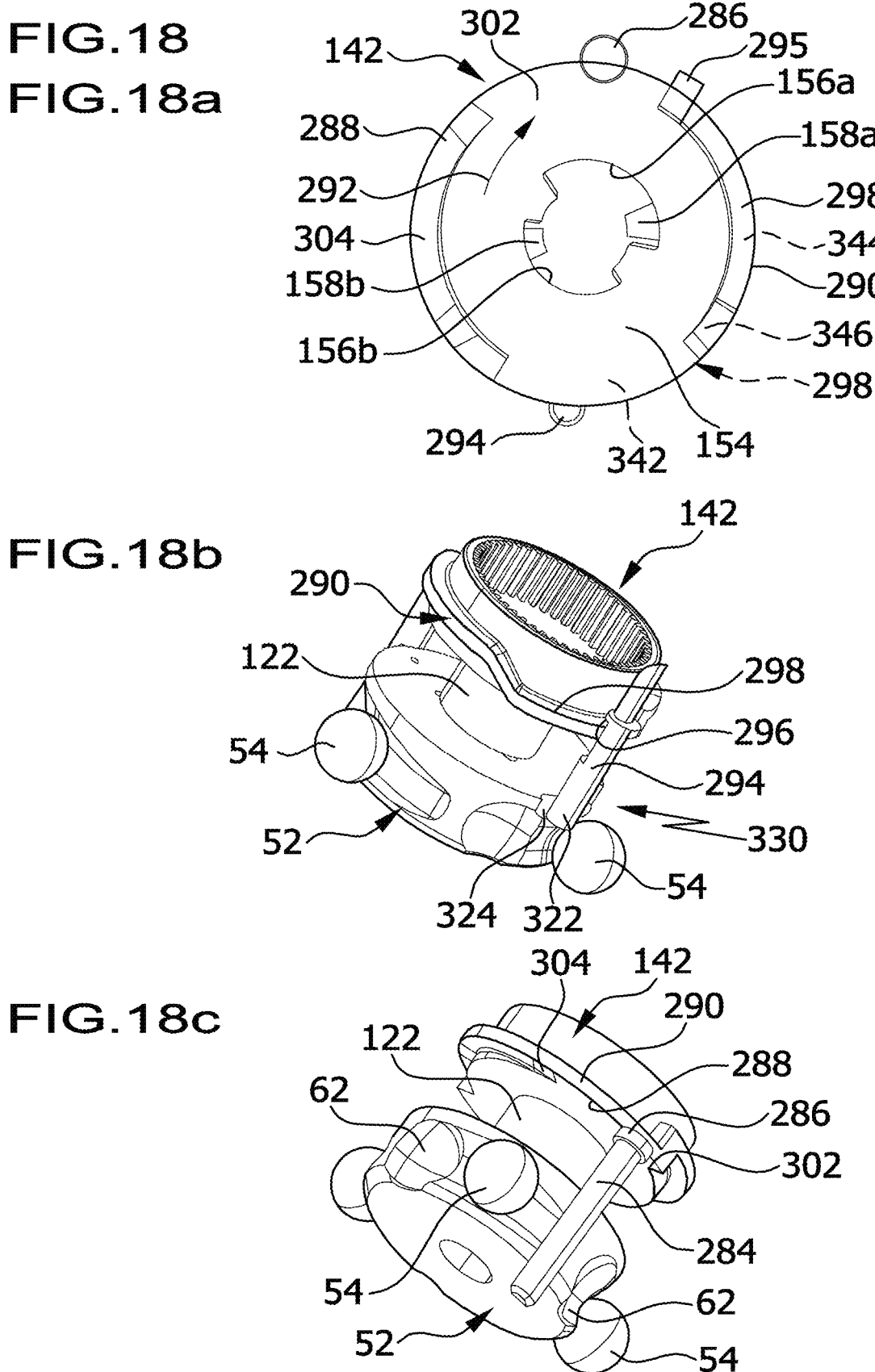
FIG. 18 shows the following in the starting position.
FIG. 18*a* shows a plan view of the ring gear of the distribution gear, from the drive sleeve side.
FIG. 18*b* shows a perspective illustration of cooperation of the ring gear in the position of FIG. 18*a* with the deactivation unit for the rest position latching device and with the rotation-blocking device.
FIG. 18*c* shows a perspective illustration of cooperation of the ring gear in the position of FIG. 18*a* with a securing device and with the rotation-blocking device.

In the starting position illustrated in FIG. 18, the sensor head 286 is located on a track portion 302 of the cam track, as a result of which the actuation pin 284 is in a position, as illustrated in FIG. 16, in which it would bring about release of the latching body 274 of the rest position latching device 270 if the pivot bearing body 14 were in the rest position. Since the pivot bearing body 14 is in the working position in FIG. 18, however, the actuation pin 284 has no effect.

Figures 19, 19A, 19B, 19C:
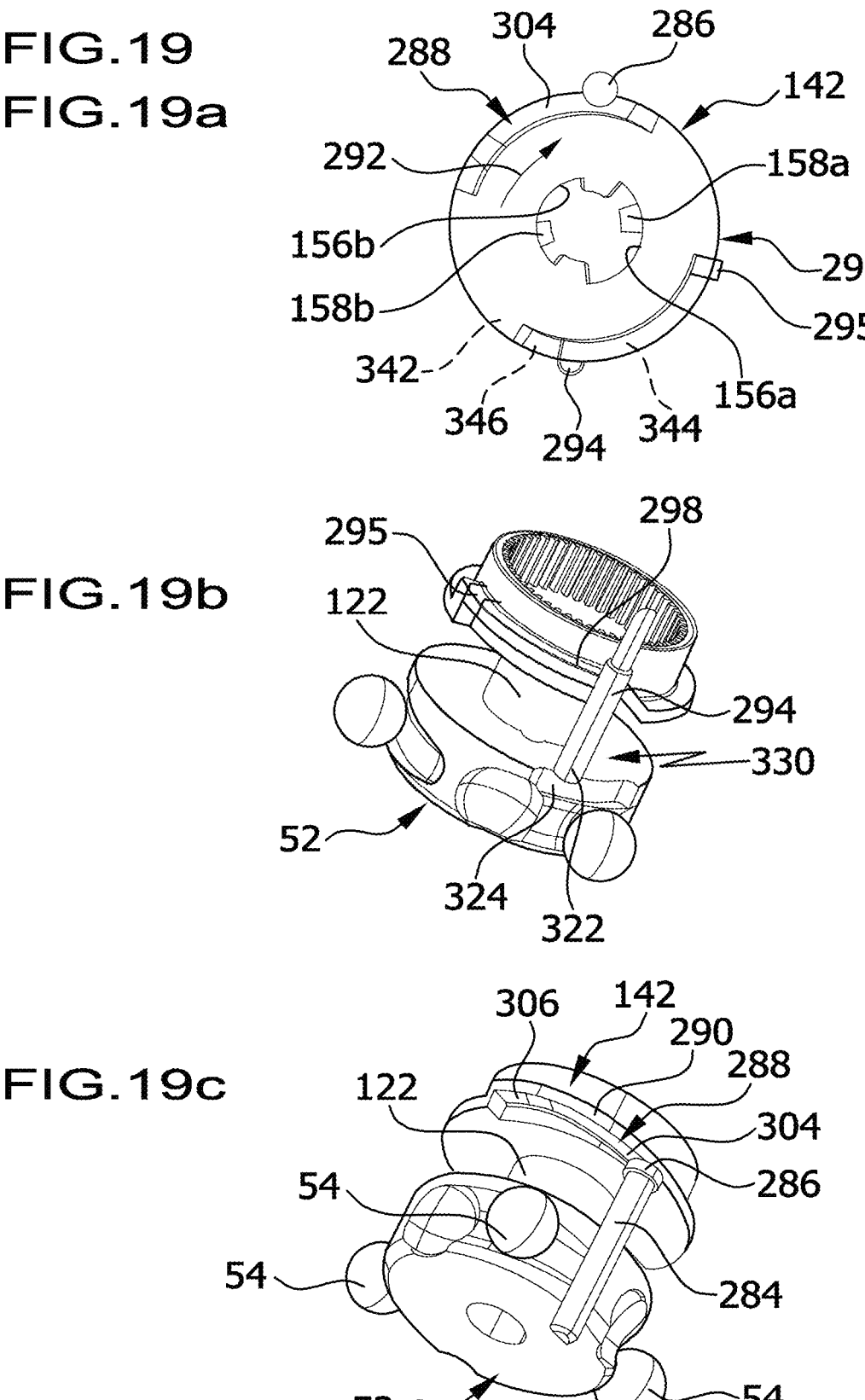
FIG. 19 shows the following, in the first position of the ring gear as it is rotated in relation to the starting position, for releasing the securing device and without action on the rotation-blocking device.
FIG. 19*a* shows a plan view of the ring gear of the distribution gear, from the drive sleeve side.
FIG. 19*b* shows a perspective illustration of cooperation of the ring gear in the position of FIG. 19*a* with the deactivation unit for the rest position latching device and with the rotation-blocking device.
FIG. 19*c* shows a perspective illustration of cooperation of the ring gear in the position of FIG. 19*a* with a securing device and with the rotation-blocking device.

If the ring gear 142 is now driven by means of the distribution gear 130, then the ring gear 142 rotates in the direction of rotation 292, and the sensor head 286 moves on a region 304 of the cam track 288 that is recessed in relation to the region 302 in the direction parallel to the pivot axis, with the result that it permits the actuation pin 284 to move if this actuation pin 284 is urged by the latching body 274, but this is not the case, with the result that the actuation pin 284 can also remain in the position predetermined by the region 302 of the cam track 288 (FIG. 19).

As can further be seen from FIG. 19a, rotation of the ring gear 142 with the cam flange 290 is initially performed without driving the drive sleeve 122, since the drive slots 156a, 156b permit relative rotation of this kind by the ring gear in relation to the drive fingers 158a, 158b without entraining them.

Figures 20, 20A, 20B, 20C:
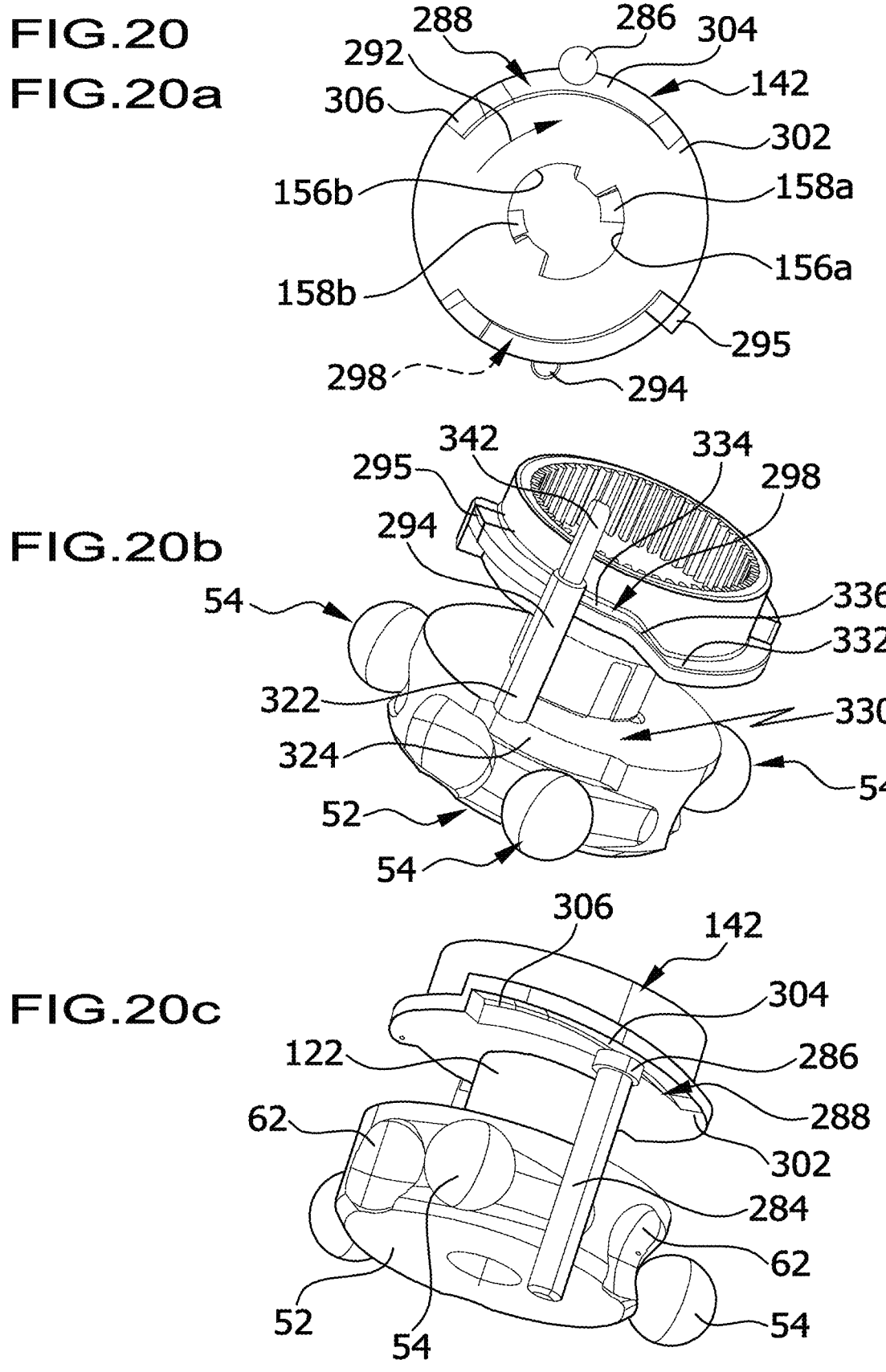
FIG. 20 shows the following, in a position of the ring gear that is rotated to the maximum extent in relation to the starting position, without action on the rotation-blocking device.
FIG. 20*a* shows a plan view of the ring gear of the distribution gear, from the drive sleeve side.
FIG. 20*b* shows a perspective illustration of cooperation of the ring gear in the position of FIG. 20*a* with the deactivation unit for the rest position latching device and with the rotation-blocking device.
FIG. 20*c* shows a perspective illustration of cooperation of the ring gear in the position of FIG. 20*a* with a securing device and with the rotation-blocking device.

Here, the ring gear 142 can be further rotated until the drive slots 156a, 156b abut against the drive fingers 158a, 158b in the direction of rotation 292 (FIG. 20), wherein the sensor head 286 of the actuation pin 284 moves further in relation to the cam track 288, over the region 304 thereof, wherein the region 304 runs such that it is increasingly recessed in relation to the region 302. The fact that the drive sleeve 122 is entrained by entrainment of the drive fingers 158a, 158b about the pivot axis now also results in rotation of the actuation body 52 in addition until, as illustrated in FIG. 20, the rotation-blocking bodies 54 can penetrate into the retraction receptacles 62 associated therewith and thus reach the release position (FIG. 21), in which they lie in the retraction receptacles 62, with the result that the rotation-blocking device 50 is now in its release position and enables the rotary movement of the pivot bearing body 14, with the result that this can pivot out of the working position.

When the release position is reached, further rotary movement of the ring gear 142 in this direction is prevented by an abutment element 295 that comes into abutment against the securing pin 294, and, by enabling the pivotal movement of the pivot bearing body 14, there results pivoting thereof.

Figures 21, 21A, 21B, 21C:
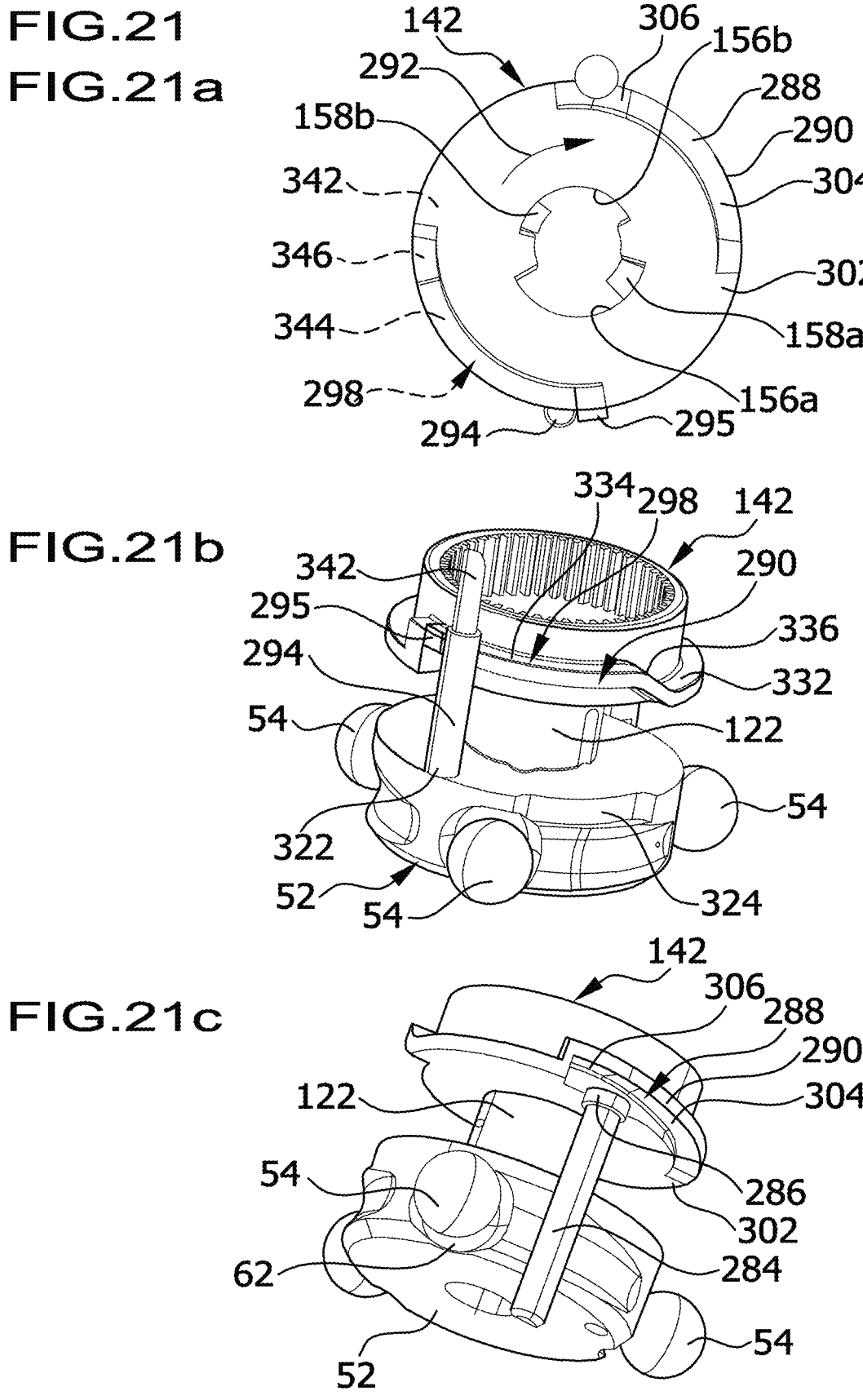
FIG. 21 shows the following, in a position of the ring gear as it is rotated in relation to the starting position, on reaching the release position of the rotation-blocking device.
FIG. 21*a* shows a plan view of the ring gear of the distribution gear, from the drive sleeve side.
FIG. 21*b* shows a perspective illustration of cooperation of the ring gear in the position of FIG. 21*a* with the deactivation unit for the rest position latching device and with the rotation-blocking device.
FIG. 21*c* shows a perspective illustration of cooperation of the ring gear in the position of FIG. 21*a* with a securing device and with the rotation-blocking device.

Coming out of the working position A causes the actuation body 52 to be blocked in the release position, as described above, by at least one rotation-blocking body 54 that abuts against the blocking faces 90, and moreover the rotary position of the drive sleeve 122 and thus also of its drive fingers 158a and 158b is also fixed in the rotary position that corresponds to the release position of the actuation body 52 and that likewise corresponds, according to FIG. 21, to the rotary position of the ring gear 142.

If the drive of the distribution gear 130 continues running in order to pivot the pivot bearing body 14 from the working position A into the rest position R, then the actuation body 52 is rotated into the release position to the maximum extent by the ring gear 142 such that the rotation-blocking bodies 54 can penetrate into the retraction receptacles 62 to the maximum depth, with the result that the rotation-blocking bodies 54 are located with play between the retraction receptacles and the blocking face 90, as illustrated in FIG. 9.

Depending on the counter-torque, which occurs when the pivot element 14 pivots, in relation to the torque of the torsion spring 114, during pivoting of the pivot bearing body 14 with the ball neck 10 from the working position A into the rest position R, the rotation-blocking body 52 remains in the release position, rotated to the maximum extent, or the torque of the torsion spring 114 rotates the actuation body 52 in the direction of rotation 72, with the result that, by means of the concave root faces running obliquely in relation to the respective guide direction 58, the retraction receptacles 62 act on the rotation-blocking bodies 54 and bring at least one of them into abutment against one of the blocking faces 90 until the rest position R is reached.

In any case, the ring gear 142 has no effect when the rest position R is reached, with the result that at the latest at this stage the torsion spring 114 rotates the actuation body 52 far enough in the direction of rotation 72 for the retraction receptacles 62 to act on the rotation-blocking bodies 54 and for the rotation-blocking bodies 54 that are in front of one of the blocking faces 90 to be brought into abutment against the blocking faces 90.

In this rotary position of the ring gear 142, the actuation pin 284 is able to move far enough for the latching body 274 of the rest position latching device 270 to penetrate into the latching receptacle 282 and to be able to fix the pivot bearing body 14 in the rest position. However, this only happens once the pivot bearing body 214 has reached the rest position R.

Figures 22, 22A, 22B, 22C:
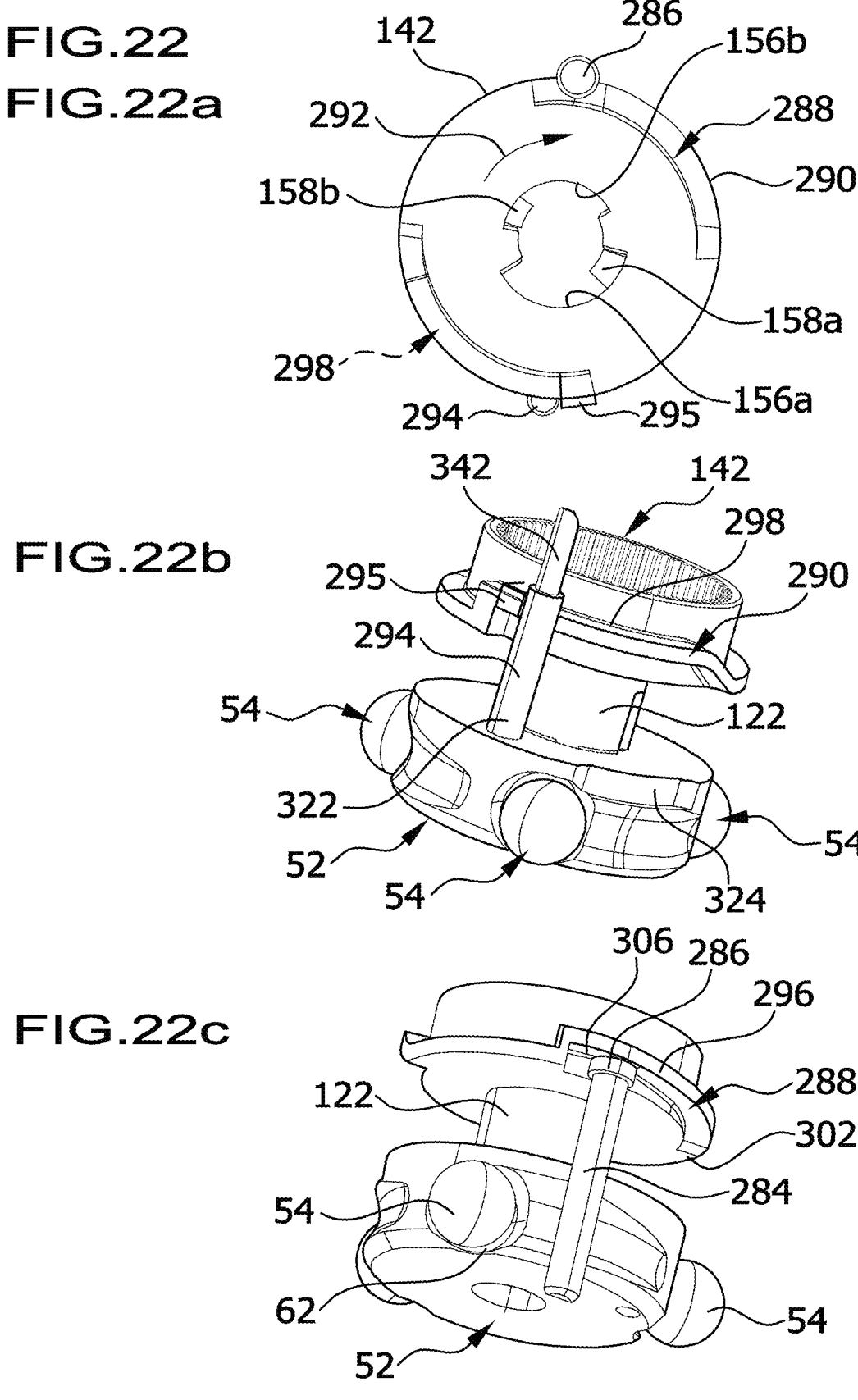
FIG. 22 shows the following, in a position of the ring gear as it is rotated in relation to the starting position, on reaching the rest position of the pivot bearing body.
FIG. 22*a* shows a plan view of the ring gear of the distribution gear, from the drive sleeve side.
FIG. 22*b* shows a perspective illustration of cooperation of the ring gear in the position of FIG. 22*a* with the deactivation unit for the rest position latching device and with the rotation-blocking device.
FIG. 22*c* shows a perspective illustration of cooperation of the ring gear in the position of FIG. 22*a* with a securing device and with the rotation-blocking device.

This position is illustrated in FIG. 22, and is achieved by the ring gear 142, starting from the position in FIG. 21, rotating further in the direction of rotation 292.

In this position, the actuation pin 284 is urged by the latching body 274, with the result that the sensor head 286 is moved far enough for it to abut against the region 306 of the cam track 288, enabling the actuation pin 284 to cause the latching body 274 to engage in the latching receptacle 282.

Once the rest position of the pivot bearing body 14 has been reached, the drive motor 180 for the distribution gear 130 is also switched off, with the result that the ring gear 142 remains in the position illustrated in FIG. 22, and thus also, as a result of the sensor head 286 lying on the region 306 of the cam track 288, the actuation pin 284 maintains the rest position of the pivot bearing body 214 because the latching body 274 remains in the latching receptacle as a result of the action of the spring element 276 without the actuation pin 284 acting in opposition thereto.

Figures 23, 23A, 23B, 23C:
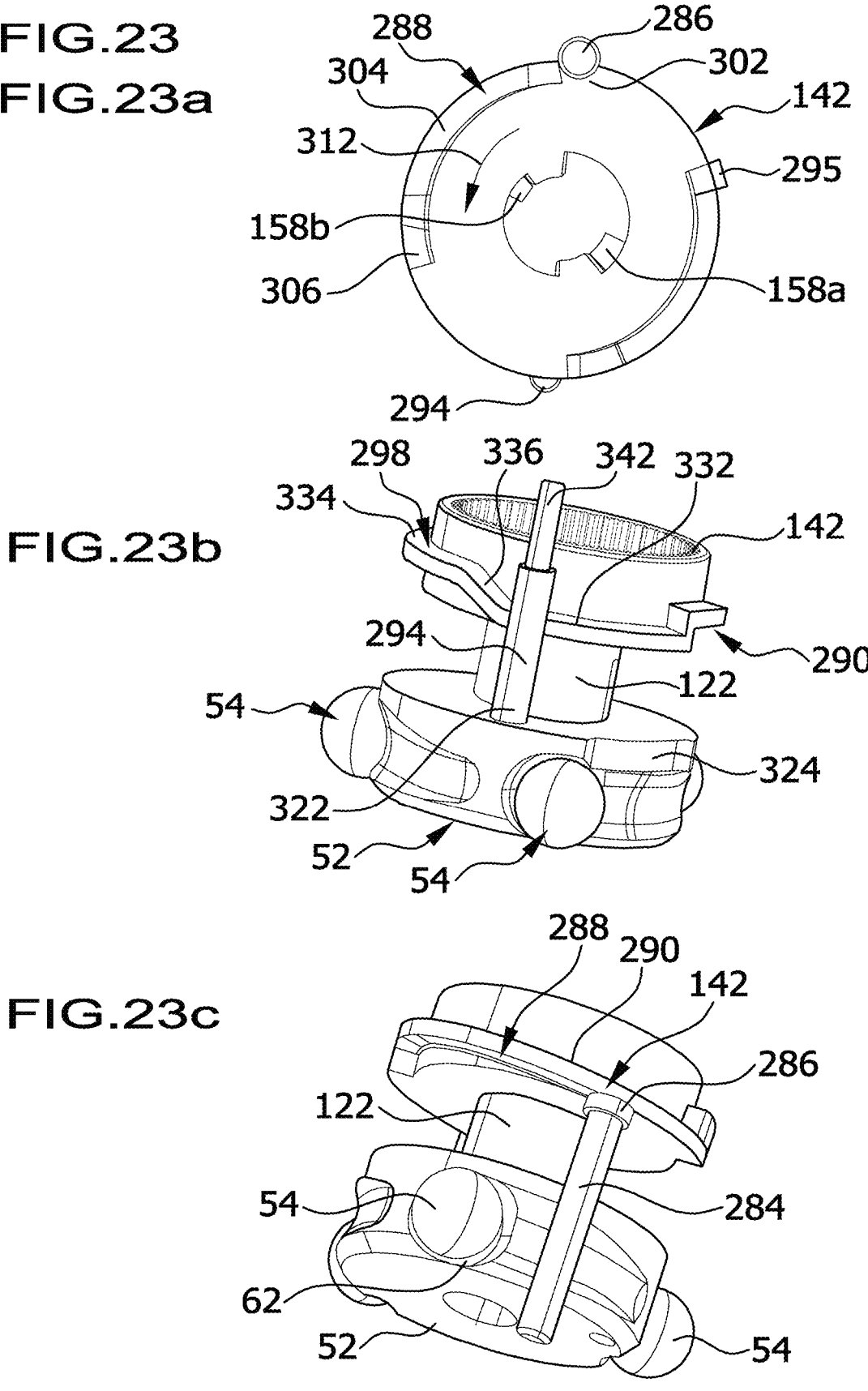
FIG. 23 shows the following, in a position of the ring gear as it is rotated in relation to the starting position, and with deactivation of the rest position latching device.
FIG. 23*a* shows a plan view of the ring gear of the distribution gear, from the drive sleeve side.
FIG. 23*b* shows a perspective illustration of cooperation of the ring gear in the position of FIG. 23*a* with the deactivation unit for the rest position latching device and with the rotation-blocking device.
FIG. 23*c* shows a perspective illustration of cooperation of the ring gear in the position of FIG. 23*a* with a securing device and with the rotation-blocking device.

If the pivot bearing body 214 is to be transferred from the rest position back into the working position, then once again the distribution gear 130 is driven, but now in the opposite direction, such that the ring gear 242 also rotates in the opposite direction of rotation—in this case in the direction of rotation 312 (FIG. 23).

As a result, the cam track 288 moves in relation to sensor head 286 of the actuation pin 284, and the sensor head 286 shifts along the cam track 288 and into the region 302, which has the result that, because the region 304 is inclined upward from the region 306, the actuation pin 284 is displaced in the direction of the end flange 198 and thus the latching body 274 is pushed out of the latching receptacle 282, with the result that the rest position latching device 270 is transferred into its released position and so the pivot bearing body 214 is no longer latched in the rest position.

In this case, however, the actuation body 52 of the rotation-blocking device 50 continues to be fixed in its release position, wherein release of blocking of the rotation-blocking body 52 in the release position, depending on the rotary position of the pivot bearing body 14, does not occur until the working position A is reached, as described.

Once the actuation body 52 has been moved out of its blocked position in the working position, the actuation body 52 performs a rotary movement as a result of the action of the torsion spring 114, such that the actuation body 52, together with the drive sleeve 122, likewise begins to rotate in the direction of rotation 312, and rotates in relation to the ring gear 142 as a result of the fact that the drive fingers 158 are movable in relation to the drive slots 156, as illustrated in FIG. 23, such that the drive fingers 158a, 158b begin to move in the direction of rotation 312 relative to the drive slots 156a and 156b, in order then to arrive back in the rotary position illustrated in FIG. 18, in the working position.

As also illustrated in FIGS. 18 to 24, the cam flange 290 of the ring gear 142 carries not only the cam track 288 for actuating the actuation pin 284 but also the securing cam track 298 for actuating the securing pin 294, illustrated in FIGS. 16 and 17 and in FIGS. 18 to 24.

Here, the securing pin 294 has a securing body 322, which, for the purpose of securing the rotary position of the actuation body 52 in the rotation-blocking position, engages in a securing recess 324 that is formed such that the actuation body 52 is unable to come out of the rotation-blocking position, and thus the rotation-blocking position is secured in the working position—that is to say that locking of the pivot bearing body 214 in the working position is also secured.

The securing pin 294, which is movable by the securing cam track 298, forms, together with the securing body 322 and the securing recess 324, a securing device 330.

The securing cam track 298 is preferably arranged opposite the cam track 288 on the cam flange 290, and is shaped such that, from the securing position of the securing pin 294 (FIG. 18), in which the securing body 322 engages in the securing recess 324 (FIG. 18c), after the initial rotation of the ring gear 142 from the starting position in the direction of rotation 292, the securing cam track 298 already displaces the securing pin 294 far enough for the securing body 322 to come out of the securing recess 324 of the actuation body 52 (FIG. 19c) in order to enable the succeeding rotary movement of the actuation body 52.

For this purpose, the securing cam track 298 is provided with a securing region 332, which enables securing of the rotation-blocking position of the actuation body 52, and a non-securing region 334, which releases securing of the movement of the rotation-blocking body 52, wherein these are connected to one another by a transition region 336.

Moreover, the securing pin 294 is also provided with a prolonged portion 342, which depending on the position of the securing pin 294 actuates or does not actuate a sensing device 344, wherein for example the sensing device 344 is arranged such that in the unsecured position of the securing pin 294 it is actuated (FIG. 7) and in the securing position of the securing pin 294 it is not actuated (FIG. 6), it also being possible for actuation of the sensing device 344 to be performed in the reverse order.

The trailer coupling according to the invention operates as follows.

Starting from the working position A, illustrated in FIGS. 1, 2, 3 and 6, in which rotation of the pivot bearing body 14 relative to the guide body 40 is blocked in respect of a rotary movement about the pivot axis 22 by the rotation-blocking device, in particular in that the actuation body 52 has moved the rotation-blocking bodies 54 in the guide direction 58 radially outward far enough away from the pivot axis 22 for them to engage in the receptacles 60 and hence to fix the pivot bearing body 14 such that rotation thereof relative to the guide body 40 is blocked, switching on of the drive motor 180 has the effect that the step-down gear 170 drives the sun wheel 162 (FIG. 18).

This, for its part, drives the planet wheels 146, but because the pivot bearing body 14 is blocked in respect of a rotary movement about the pivot axis 22 by the rotation-blocking device 50, the planet wheels 146 are likewise blocked, with the result that the drive arms 196 of the drive body 194 cannot turn in relation to the abutment bodies 226 and 228, and consequently a rotary movement of the guide shaft 100, to which the planet wheel carrier 152 is connected such that it cannot rotate in relation thereto, cannot take place either.

As a result, the ring gear 142 is driven such that it rotates in the direction of rotation 292, according to FIG. 18. Initially, this rotation of the ring gear 142 has the effect of actuating the securing device 330, wherein displacement of the securing pin 294 causes the securing body 322 to come out of the securing recess 324 of the actuation body 52 and to be transferred from the securing position into the unsecured position (FIG. 19). Further rotation of the ring gear 142 has the result that the cam track 288 no longer acts on the sensor head 286 and so permits movement thereof in the direction away from the flange 104, as illustrated in FIG. 19 and FIG. 20, with the result that the rest position latching device 270 is activated without rotation of the actuation body 52 of the rotation-blocking device 50 already taking place.

Then, as illustrated in FIGS. 21 to 22, the drive sleeve 122, which is connected to the actuation body 52 by the prolonged portions 124 such that it cannot rotate in relation thereto, is rotated by way of the drive slots 156 and the drive fingers 158.

As a result, the ring gear 142 rotates the actuation body 52 in the direction of its release position, far enough out of the rotation-blocking position for the release position to be reached.

Since, when the release position of the actuation body 52 is reached, rotary movement of the pivot bearing body 14 is possible and moreover the rotary movement of the actuation body 52 in the direction of rotation 72 is prevented by the action of the ring gear 142, the ring gear 142 of the distribution gear 130 is stationary while the planet wheel carrier 146 now rotates, wherein the planet wheel carrier 146 is able to pivot the pivot bearing body 14 about the pivot axis 22 in the direction of the rest position R by way of the pivotal drive shaft 100 and the drive body 194 with the drive arms 196.

When the rest position R is reached, the rest position latching device 270 becomes active, in particular because the latching body 274 is able to engage in the latching bore 282 and to displace the sensor body 254 in the direction of the cam track 288 by means of the actuation pin 294.

As a result, the pivot bearing body 14 is latched in the rotary position corresponding to the rest position R of the ball neck 10 by the rest position latching device 270.

In this rest position, the drive unit is now switched off.

If the ball neck 10 is to be pivoted back from the rest position R to the working position A, the drive unit is operated in the opposite direction of rotation.

Since it is not possible to pivot the pivot bearing body 214, because the rest position latching device 270 is active, the distribution gear 130 drives the ring gear 142 in the direction of rotation 312, wherein as illustrated in FIG. 23 the ring gear 142 acts on the actuation pin 294 by means of the cam track 288 such that the actuation pin 294 deactivates the rest position latching device 270.

Since it is not possible to turn the actuation body 52, because the blocking faces 90 are active, the distribution gear 130 brings about a rotary movement of the planet wheel carrier 152, which drives the drive body 194 having the drive arms 196 by way of the pivotal drive shaft 100, and brings about pivoting of the pivot bearing body 14 with pivoting of the ball neck 10 in the direction of the working position A.

Figures 24, 24A, 24B, 24C:
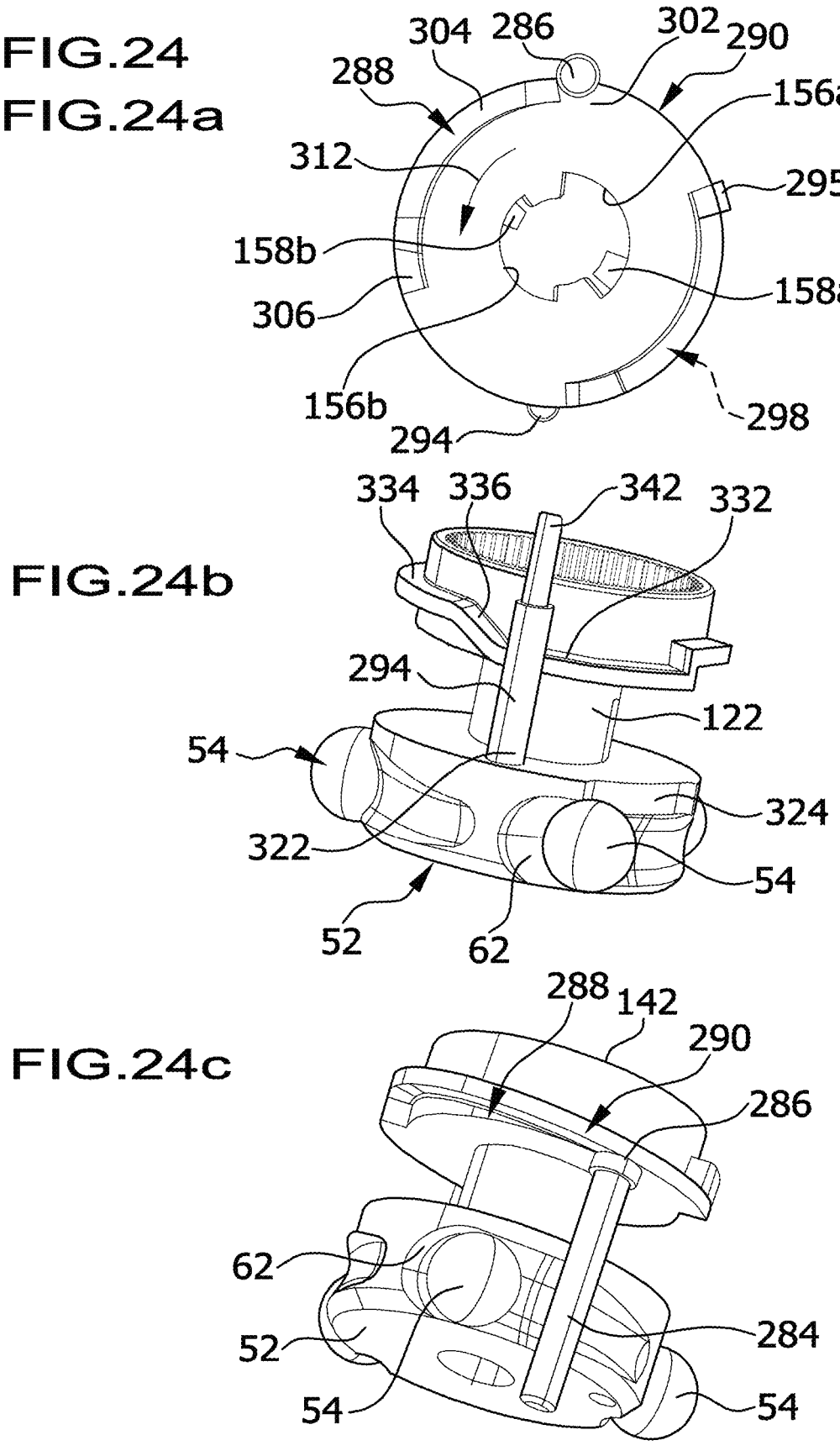
FIG. 24 shows the following, in a position of the ring gear as it is rotated in relation to the starting position in FIG. 18, during transfer of the rotation-blocking device into the rotation-blocking position.
FIG. 24*a* shows a plan view of the ring gear of the distribution gear, from the drive sleeve side.
FIG. 24*b* shows a perspective illustration of cooperation of the ring gear in the position of FIG. 24*a* with the deactivation unit for the rest position latching device and with the rotation-blocking device.
FIG. 24*c* shows a perspective illustration of cooperation of the ring gear in the position of FIG. 24*a* with a securing device and with the rotation-blocking device.

When the working position A is reached, blocking of the actuation body 52, for the purpose of moving in the direction of rotation 72 under the action of the torsion spring 114 in the direction of the rotation-blocking position, is removed, in the manner described and as illustrated for example in FIG. 20, wherein the rotation-blocking bodies 54 are pushed outward into the receptacles 60 by the actuation body 52, radially in relation to the pivot axis 22, and thus in turn result in a blocking of rotation of the pivot bearing body 14 in relation to the guide body 40 (FIG. 24).

In this locked position of the pivot bearing body 14 in relation to the guide body 40, a rotary movement of the planet wheel carrier 152 is for its part blocked, with the result that the ring gear 142 is rotated further, into the starting position illustrated in FIG. 18, in which the actuation body 52 can perform a further rotary movement in the direction of rotation 72 under the action of the torsion spring 114, with the result that the ring gear 142 in the working position A does not impede later adjustment by rotating the actuation body 52 further in the direction of rotation 72 under the action of the torsion spring 114.

Further, once the actuation body 52 has been transferred into the rotation-blocking position, the securing device 330 becomes active, with the result that the securing pin 294 engages by means of the securing body 322 in the securing recess 324 of the actuation body 52 and prevents it from being transferred into the release position.

The sensing device 344 that is actuable by the prolonged portion 342 of the securing pin 294 is part of a mechanical or electronic sensing switch 362 that is arranged on a sensor carrier 360.

Figure 25:
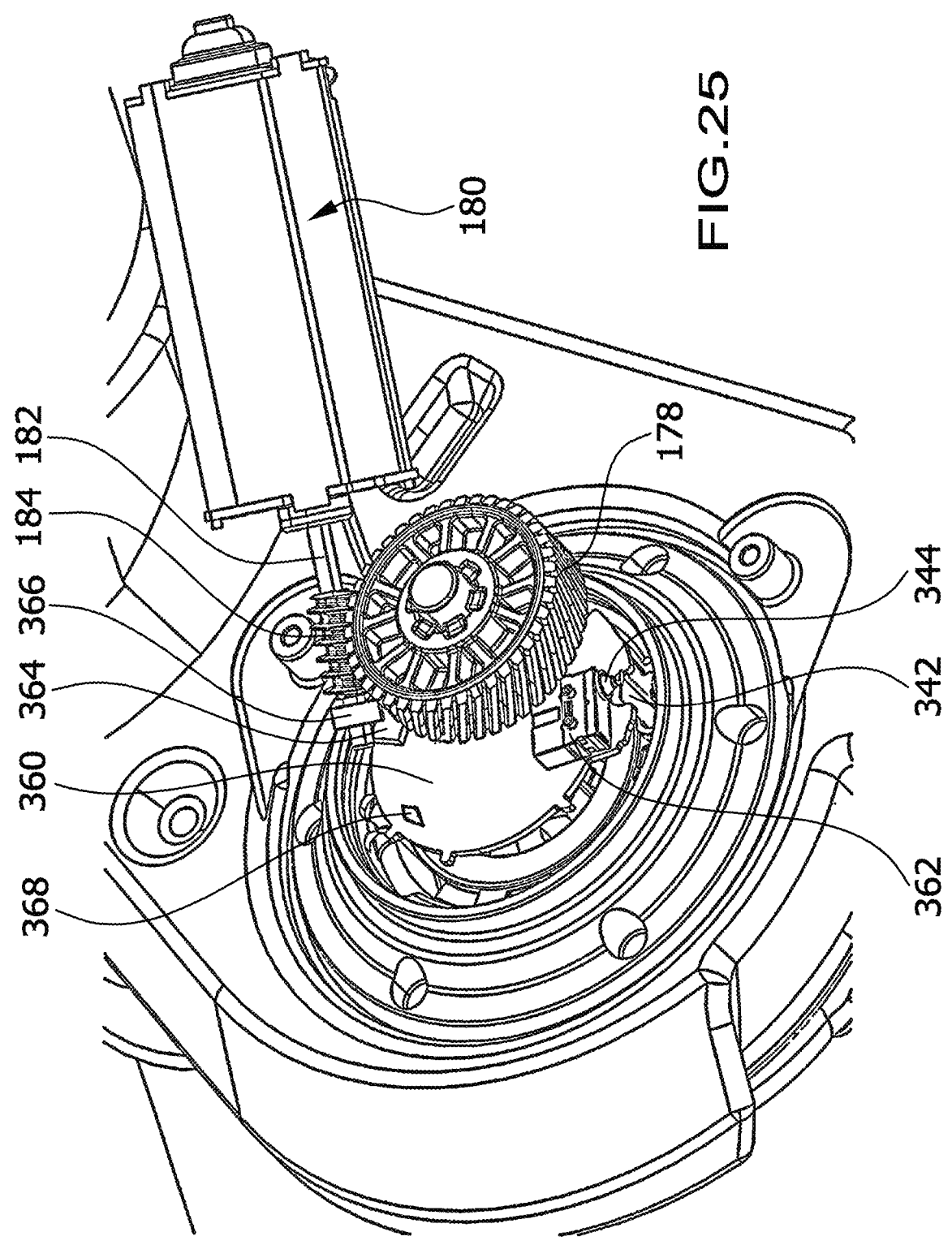
FIG. 25 shows a perspective illustration of a drive-side part of the step-down gear, with a sensor carrier that carries sensors.
Figure 26:
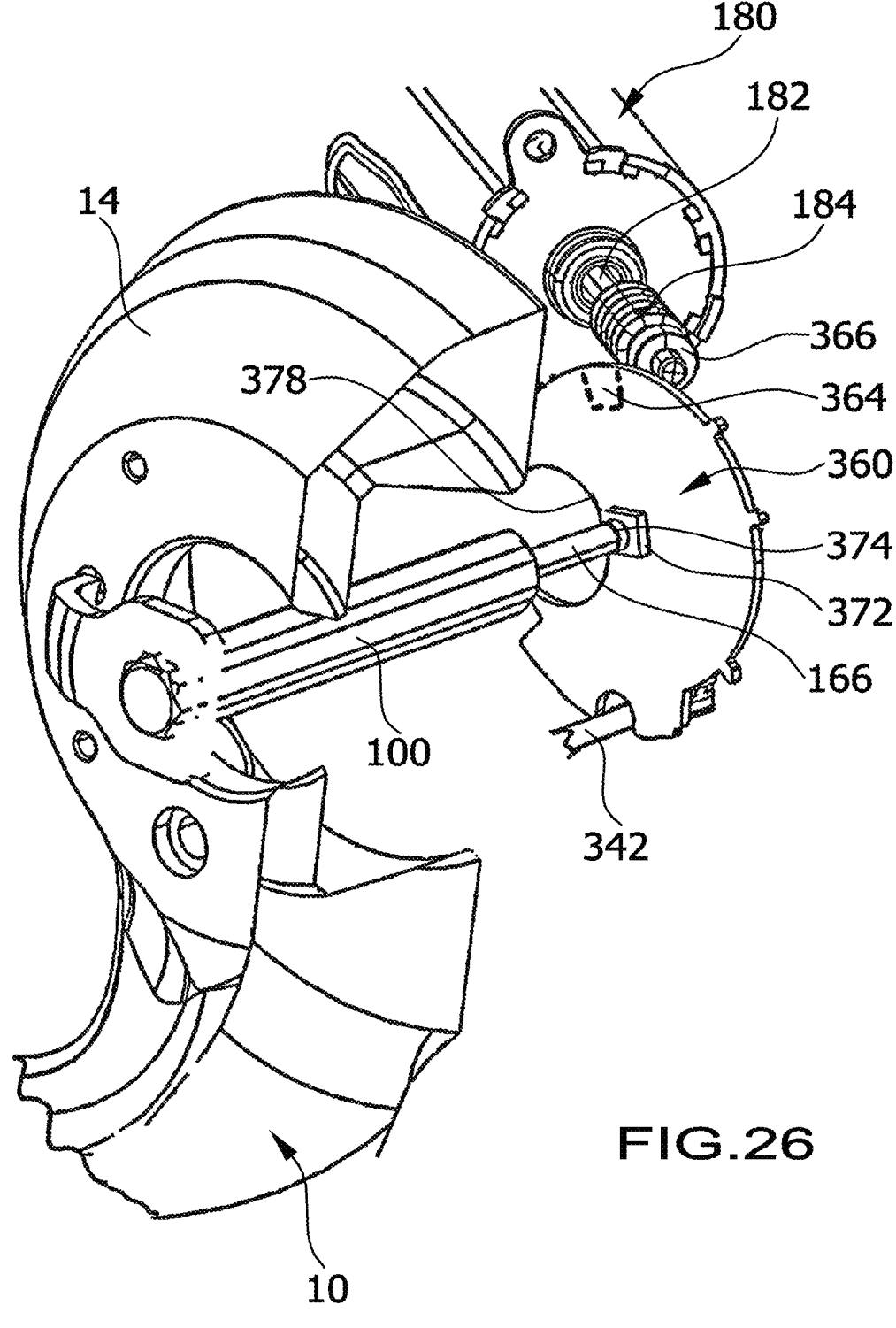
FIG. 26 shows a perspective illustration, in a partial section of the sensor carrier, with the sensors and their actuation.
Figure 27:
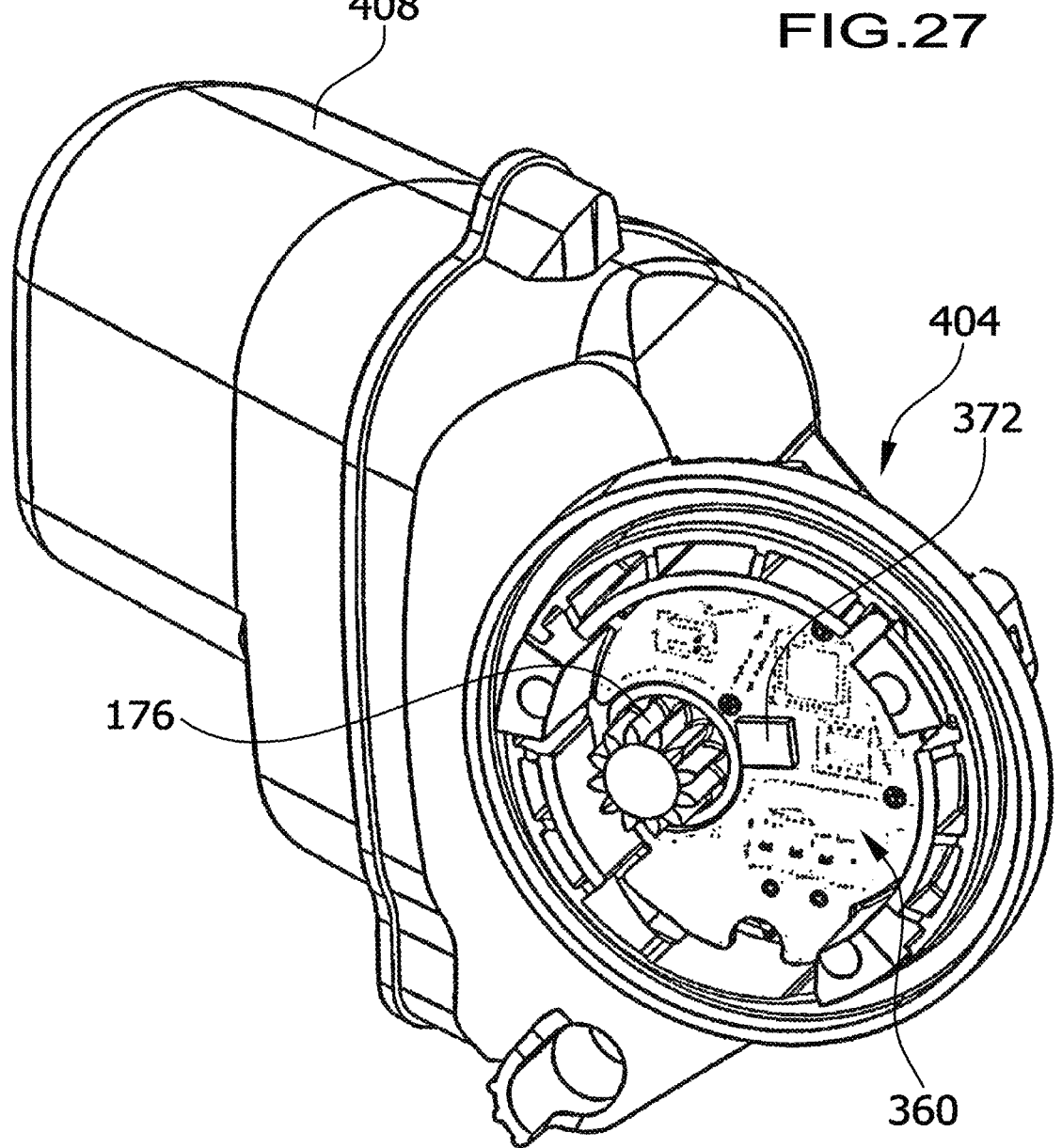
FIG. 27 shows a perspective illustration of a carrier body and a motor casing portion held by it.

Further, and as illustrated in FIGS. 25 and 26, there is also arranged on the sensor carrier 360 a speed sensor 364, which detects a rotational speed of a magnet 366 arranged on the output shaft 182 of the drive motor 180 in order in this way to directly detect the speed of the output shaft 182 of the drive motor 180.

Additionally provided on the sensor carrier 360 is a temperature sensor 368 for detecting the temperature in the pivot unit S.

Moreover, and as illustrated in FIG. 26, the sensor carrier 360 also serves to receive a pivotal movement sensor 372, which detects a rotary position of the pivotal drive shaft 100 and hence of the pivot bearing body 14 directly connected to the ball neck 10, in that a magnet 374 is arranged on the end of the shaft stub 166 of the pivotal drive shaft 100. Thus, overall there are arranged on the sensor carrier 360 not only the sensing switch 362 with the sensing device 344 but also the speed sensor 364 and the pivotal movement sensor 372.

As illustrated in FIGS. 6 and 7, in this arrangement the sensor carrier 360 is located between the ring gear 172 and the worm wheel 178 of the step-down gear 170, wherein a connection piece 376 that directly connects the worm wheel 178 to the pinion 176 passes through an aperture 378 in the sensor carrier 360.

Because the sensor carrier 360 is arranged such that it is integrated within the step-down gear 170, it is possible to arrange both the sensing switch 362 and also the speed sensor 364, the pivotal movement sensor 372 and the temperature sensor 368 on a single sensor carrier 360 and thus for the sensors on this sensor carrier 360 to detect, in a simple manner, functioning of the rotation-blocking device 50, the speed of the drive motor 180 and the pivotal position of the ball neck 10 about the pivot axis 22, and to forward the values delivered by the sensors, the function sensor 362, the speed sensor 364 and the pivotal movement sensor 372 in a simple manner to a controller 380 for the functions of the pivot unit S.

In this case, it is particularly advantageous that the sensor carrier 360 extends transversely, in particular perpendicularly, to the pivot axis 22 and in so doing can be integrated in a manner saving on space within the pivot unit S, in particular the step-down gear 170, such that the data from all the sensors can already be detected on the drive side of the distribution gear 130 and on the output side of the drive motor 180.

As regards the arrangement of the pivot control unit 380, the solution according to the invention provides the most diverse possibilities.

In principle, it would be conceivable to arrange the pivot control unit 380 in a separate housing.

However, an advantageous solution provides for the pivot control unit 380 to be integrated within an overall housing 400 of the pivot unit.

In this case, and as illustrated in FIGS. 6 and 7, the overall housing 400 encloses the pivot bearing unit 20, the rotation-blocking unit 50 and the distribution gear 130 and step-down gear 170, which are arranged in a pivotal-operation housing portion 402 that is formed in particular in part by the guide body 40, which is fixedly connected to the bearing plate 26 that is fixed to the vehicle.

In this arrangement, the guide body 40 is on the one hand engaged over and covered on the side of the pivot bearing body 14 that is provided with the flange 104, and moreover is partly covered on its opposite side to the flange 104 by a carrier body 404 that likewise forms part of the pivotal-operation housing portion 402, wherein, as illustrated in FIGS. 6 and 7, the carrier body 404 receives and carries the step-down gear 170 with the sensor carrier 360 and moreover forms a receptacle 406 for the drive motor 180.

Figure 28:
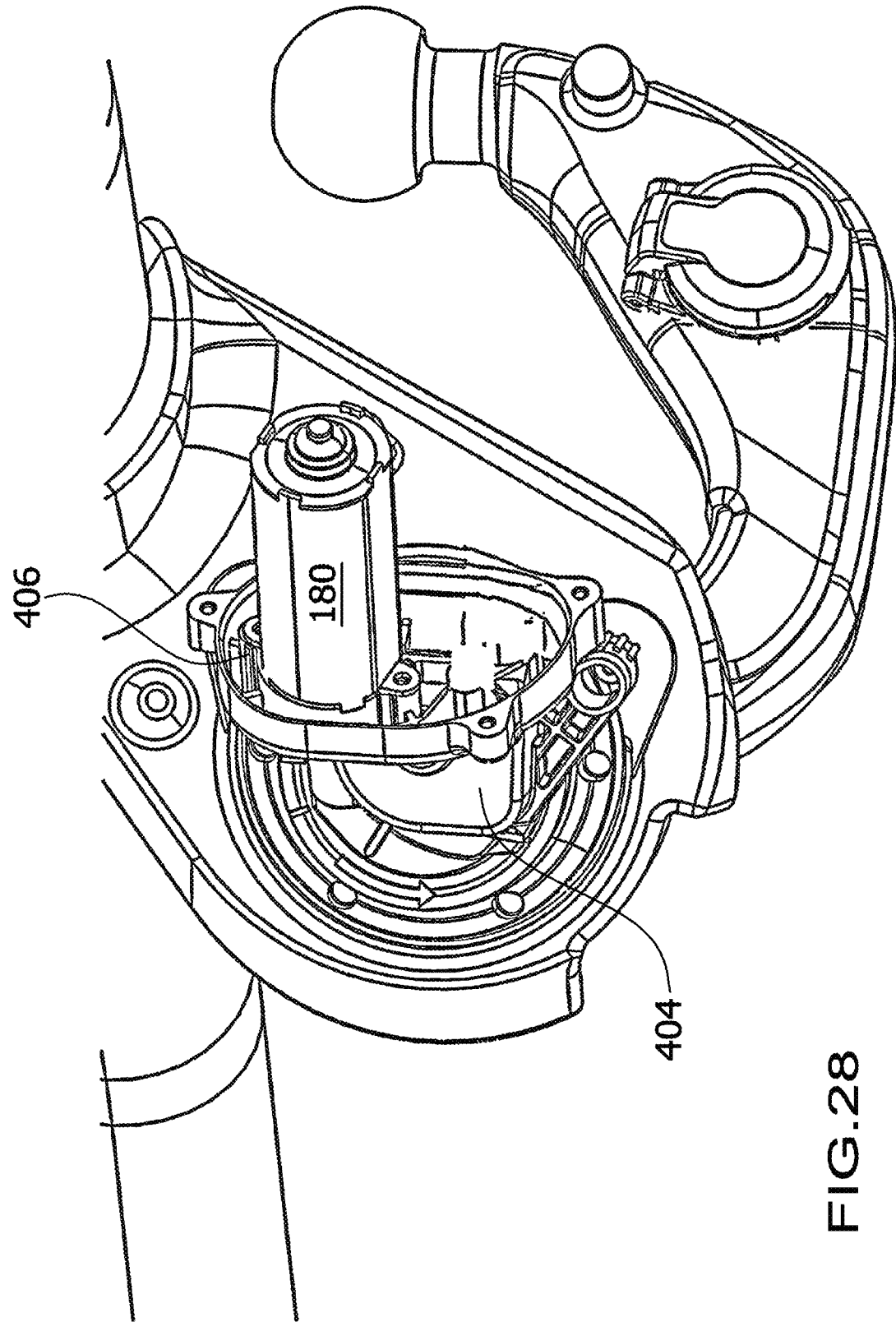
FIG. 28 shows a further perspective illustration of the carrier body with the motor casing portion removed.
Figure 29:
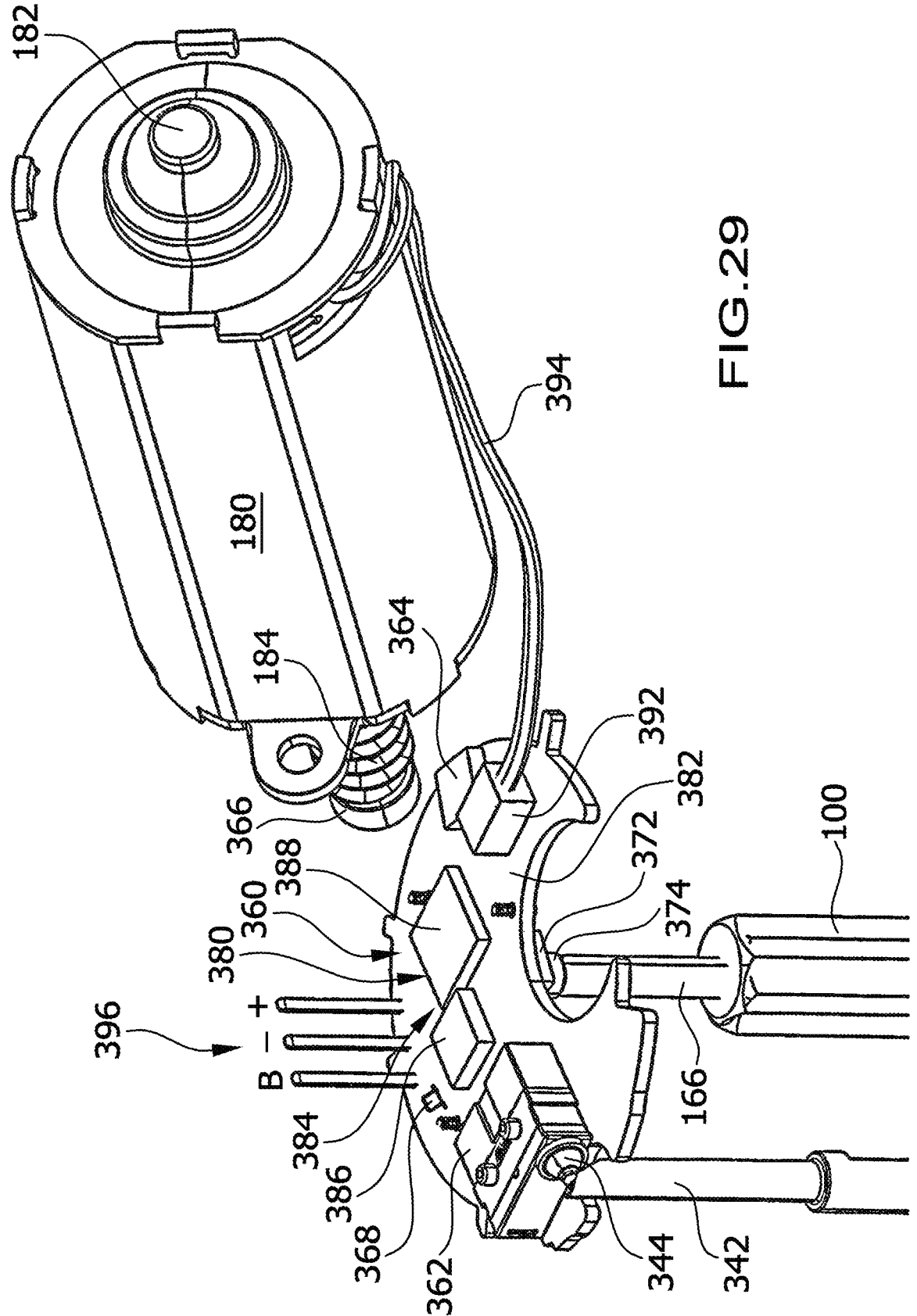
FIG. 29 shows a perspective illustration of the sensor carrier with a control circuit that is also arranged thereon.

Further, the carrier body 404, as is also visible in FIG. 28, forms a receptacle for a motor casing portion 408 of the overall housing 400.

In a first variant of an embodiment of the pivot unit S according to the invention, the pivot control unit 380 is arranged such that it is integrated on the sensor carrier 360, with the result that for example the sensor carrier 360 at the same time forms a circuit board 382 for a control circuit 384 that, for example as a data processing unit, carries a processor 386 and a motor drive circuit 388.

In this case, the drive motor 180 is connected for example via a connector 392 to its connector line 394.

Moreover, in this case the circuit board 382 carries in total three push-in contact pins 396, wherein two of the push-in contact pins 396 are provided for the purpose of delivering the supply voltage +, − and one of the push-in contact pins 396 is for a connector to a bus system of the vehicle.

In this way, all of the functions of the overall pivot unit S can be controlled by way of the bus connector B, wherein the overall pivot control unit 380 is integrated within the pivotal-operation housing portion 402 and is arranged in particular on the drive side of the distribution gear 130, preferably integrated within the step-down gear 170.

Figure 30:
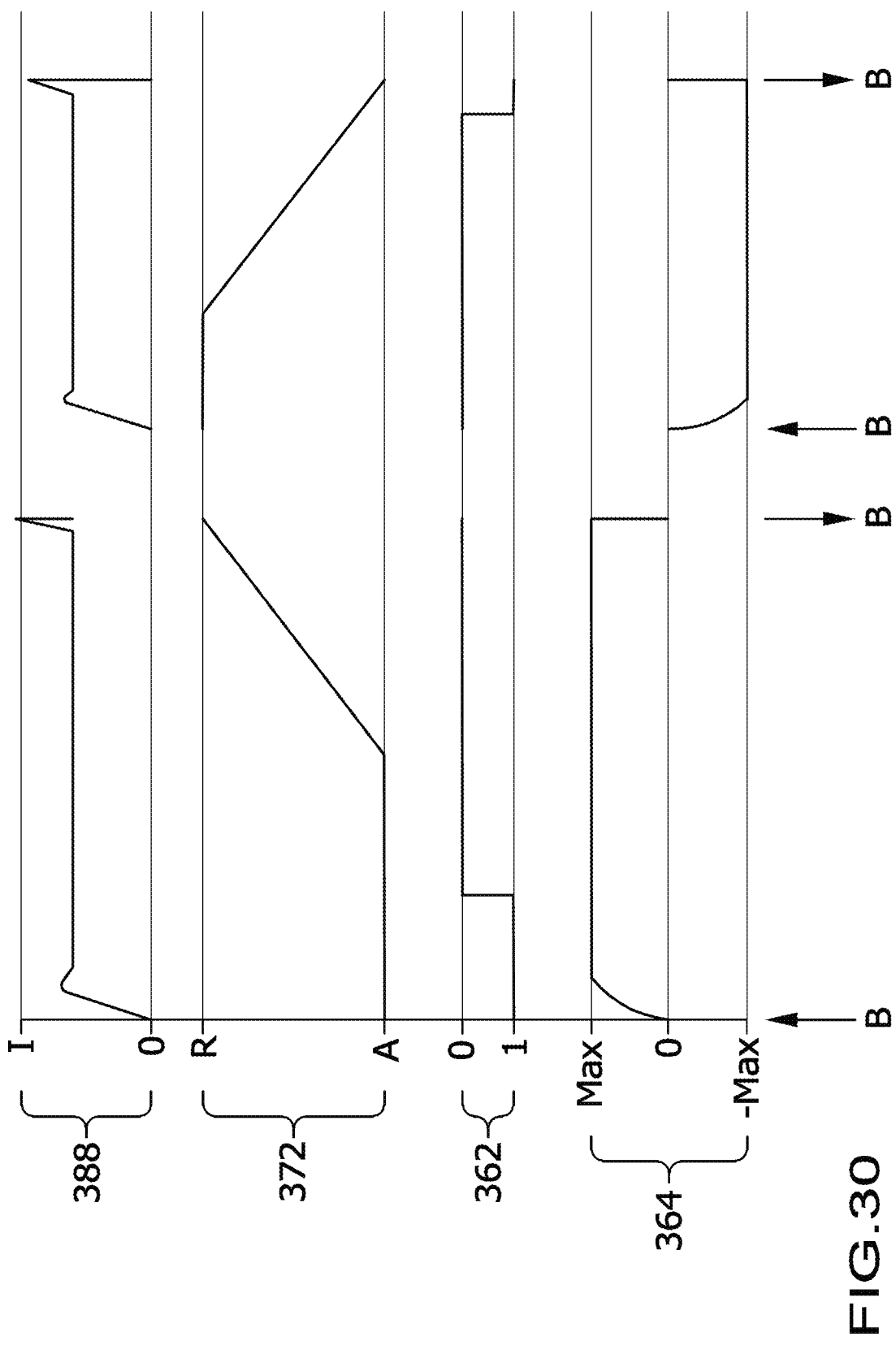
FIG. 30 shows a schematic illustration of the functions of the control circuit.

The pivot control unit 380 according to the invention operates for example as illustrated schematically in FIG. 30.

If a signal to start the pivotal movement of the ball neck 10 from the working position A to the rest position R arrives via the bus connector B on the bus system side, then, from the pivot control unit 380 and by the processor 386 and the motor drive circuit 388, the drive motor 180 is switched on and begins to drive the output shaft 182 with the worm 184.

Initially, this does not result in any movement of the pivot bearing body 14, since rotation thereof is blocked by the rotation-blocking device 50, since, as illustrated in FIG. 18, the actuation body 52 has moved the rotation-blocking bodies 54 radially outward in the guide direction 58 far enough for them to engage in the receptacles 60.

However, the worm 184 drives the step-down gear 170, and this drives the sun wheel 162.

During this, with the aid of the speed sensor 364, the processor 386 identifies a signal representing the speed of the drive motor 180.

The sun wheel 162 drives the planet wheels 146, which do not however themselves rotate about the pivot axis 22 because rotary movement of the pivot bearing body 14 continues to be blocked, with the result that the ring gear 142 is driven, and this then rotates—as indicated in FIG. 18 by the direction of rotation 292—and actuates the securing device 330, as a result of which the securing pin 294 is displaced as illustrated in FIGS. 19 and 20.

Consequently, securing of the actuation body 52 to prevent rotation is released, and by moving the securing pin 294 the sensing body 344 is actuated, a fact which is identified by way of the sensing switch 362, as a result of which this delivers a zero signal corresponding to release of the securing device 330.

Once the securing device 330 has been released, then the drive slots 156 and the drive fingers 158, as illustrated in FIGS. 21 and 22, bring about rotation of the drive sleeve 122, which is connected to the actuation body 52 by the prolonged portions 124, and thus rotation of the actuation body 52, driven by the ring gear 142 of the distribution gear 130, such that the actuation body 52 moves out of the rotation-blocking position and, as illustrated in FIG. 21, it is now possible when the release position is reached for the rotation-blocking bodies 54 to enable rotation blocking of the pivot bearing body 14.

In the release position of the actuation body 52, its rotary movement is blocked, with the result that the ring gear 142 of the distribution gear 130 comes to a stop, and the distribution gear 130 now starts to turn the planet wheel carrier 146 and hence the pivotal drive shaft 100, and so the pivot bearing body also begins to rotate, wherein this rotary movement of the pivot bearing body 14 is detected by the pivotal movement sensor 372, which then detects the course of the pivotal movement of the ball neck 10 from the working position A into the rest position R, as illustrated in FIG. 30.

In this context, the fact that the rest position R has been reached can be detected by the control circuit 384 in the most diverse ways.

It is possible either to use the signal received by the pivotal movement sensor 372 to detect the rest position R, or, by way of the motor drive circuit 388, to detect the pronounced increase in current I for supplying the drive motor 180 when the rest position is reached and the rest position latching device 270 becomes active, and to take this as the prompt to switch off the drive motor 180.

In this way, the processor 386 can identify the fact that the rest position has been reached.

In order to report back to the bus system via the connector B that the ball neck has reached the rest position R, the processor 386 makes use for example of the increase in current that was detected by way of the motor drive circuit 388, and/or the signal of the pivotal movement sensor 372 that reports that the rest position R has been reached.

As an alternative, it is also possible to allocate to the rest position latching device 270 a sensor that detects the fact that the rest position latching device 270 has become active.

When the ball neck 10 pivots back from the rest position R to the working position A, in turn started by a starting signal arriving via the bus system at the connector B, the control circuit 384 initially identifies with the aid of the pivotal movement sensor 372 that the ball neck 10 is in the rest position R.

In this case too, however, the drive motor 182 is started in the opposite direction of rotation.

Because it is not possible to pivot the pivot bearing body 14, because the rest position latching device 270 is active, the distribution gear 130 drives the ring gear 142 in the opposite direction of rotation 312, as illustrated in FIGS. 23 and 24.

This has the result that initially the rest position latching device 270 is deactivated without a rotary movement of the ball neck 10, by rotating the ring gear 142, which carries the cam track 288.

Further, rotation of the actuation body 52 is also blocked, for example because the blocking faces 90 are active, with the result that once the rest position latching device 270 is released the distribution gear 130 brings about a rotary movement of the planet wheel carrier 152 by way of the pivotal drive shaft 100, and thus also of the ball neck 10 in the direction of the working position A.

As illustrated in FIG. 24, just before the working position A is reached, blocking of the actuation body 52 is removed, with the result that, acted upon by the torsion spring 114, it is transferred into the rotation-blocking position and, as likewise illustrated in FIG. 24, also just before the working position A is reached the securing device 330 itself moves over into the position that, in the working position A, secures the actuation body 52 in the rotation-blocking position, a fact which is likewise detected by the sensing switch 362.

In the working position A, in the same way as in the rest position R, it is now possible for the drive motor 180 to be switched off at the control circuit 384 in that, by way of the motor drive circuit 388, the processor 386 detects the current for the drive motor 180 and, as a result of the increase, identifies the fact that the working position has been reached.

However, it is also possible, by means of the processor 386, to interrogate the pivotal movement sensor 372 and identify the rotary position that corresponds to the working position A and to take this as the prompt to switch off the drive motor 180.

In order now to communicate to the bus system, via the connector B, the message that the ball neck 10 has securely reached the working position A, the information from the pivotal movement sensor 372 and/or the signal from the sensing switch 362 are for example made use of, and so where appropriate is the increase in current that is detected by the motor drive circuit 388 when the working position A is reached.

However, it is also possible for further functions to be performed in the control circuit 384 according to the invention.

For example, the control circuit 384 may identify a fault in the pivotal movement of the ball neck 10 by way of the pivotal movement sensor 372, and in particular, where appropriate by comparison with the signal from the sensing switch 362 and/or also in conjunction with the current consumption, which is detected by way of the motor drive circuit 388, may identify the fact that the ball neck 10 has already pivoted, and whether where applicable the ball neck 10 has struck against a resistance—that is to say an object.

In this case, the processor 386 is for example programmed such that it reverses the current supply to the drive motor 180 and moves the ball neck in the opposite direction, in particular back into the starting position—that is to say either into the working position A or into the rest position R.

Moreover, when taking into account the position of the ball neck 10 in relation to the working position A or the rest position R that has been detected by the pivotal movement sensor 372, it is also possible to predetermine the course of the pivotal movement of the ball neck 10 itself, for example by an increase in the angular velocity directly after the beginning of the pivotal movement, a constant angular velocity in the movement phases between the working position A and the rest position R, and a decrease in the angular velocity just before the working position or the rest position is reached, with the result that when the working position or the rest position is reached the mechanical load and also for example the noise load can be reduced.

Figure 31:
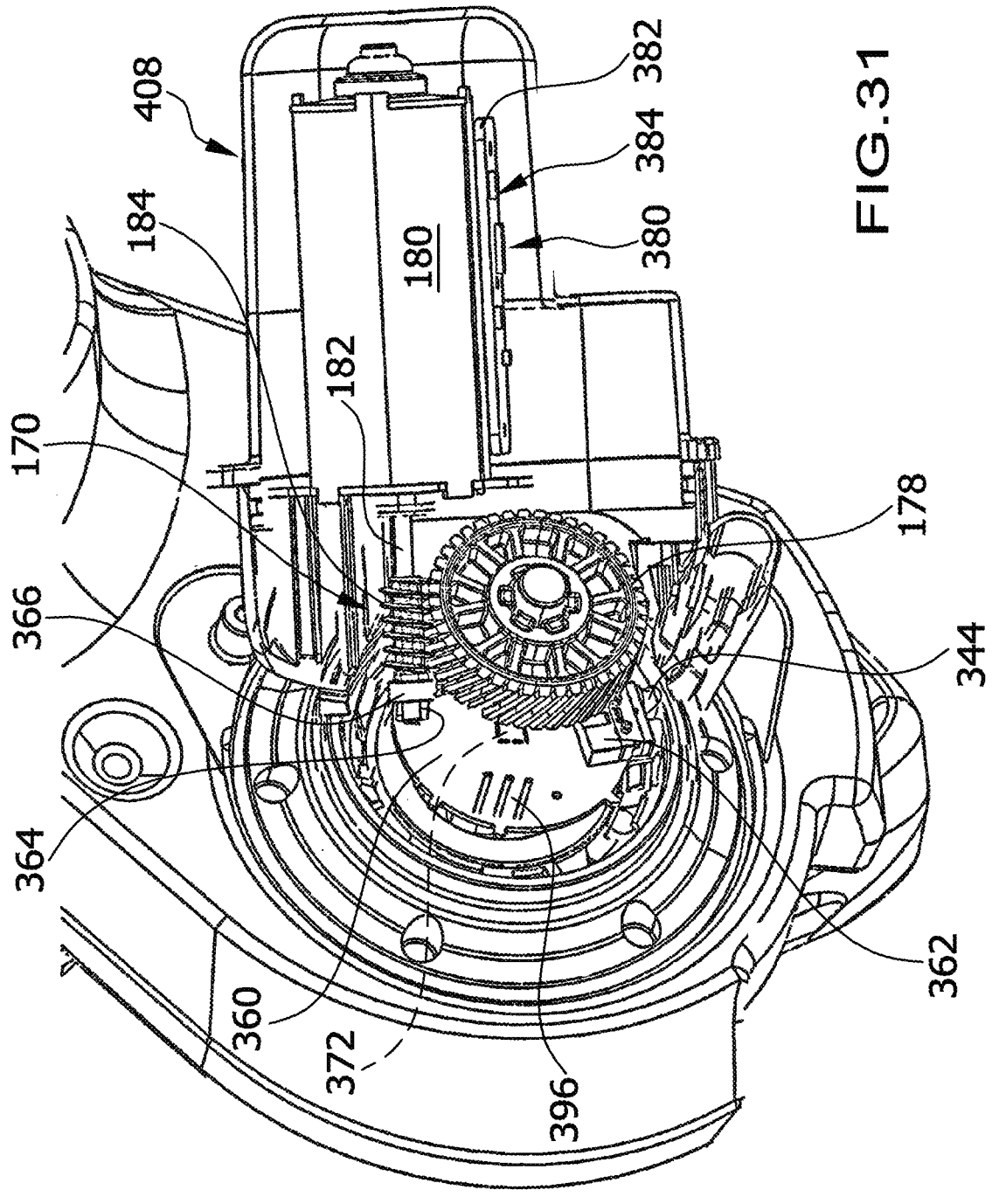
FIG. 31 shows a perspective illustration, similar to FIG. 25, of a second exemplary embodiment.

In a second variant of an embodiment of the pivot unit S according to the invention, illustrated in FIG. 31, it is provided for the sensor carrier 360 as such to be operated as in the first exemplary embodiment, to remain arranged in the region of the step-down gear 170 and in particular to carry the sensing switch 362, the speed sensor 364 and the pivotal movement sensor 372.

In this case, the pivot control unit 380, comprising the circuit board 382 that is provided with the control circuit 384, is arranged in a motor casing portion 408 of the overall housing 400 and held for example directly on the drive motor 180.

In this case, connection to the sensor carrier 360 and the sensing switch 362 the speed sensor 364 and the pivotal movement sensor 372 arranged thereon, is made by means of a line 412.

In this case, the functions of the pivot control unit 380 are the same as those described in the context of the first embodiment variant.

Figure 32:
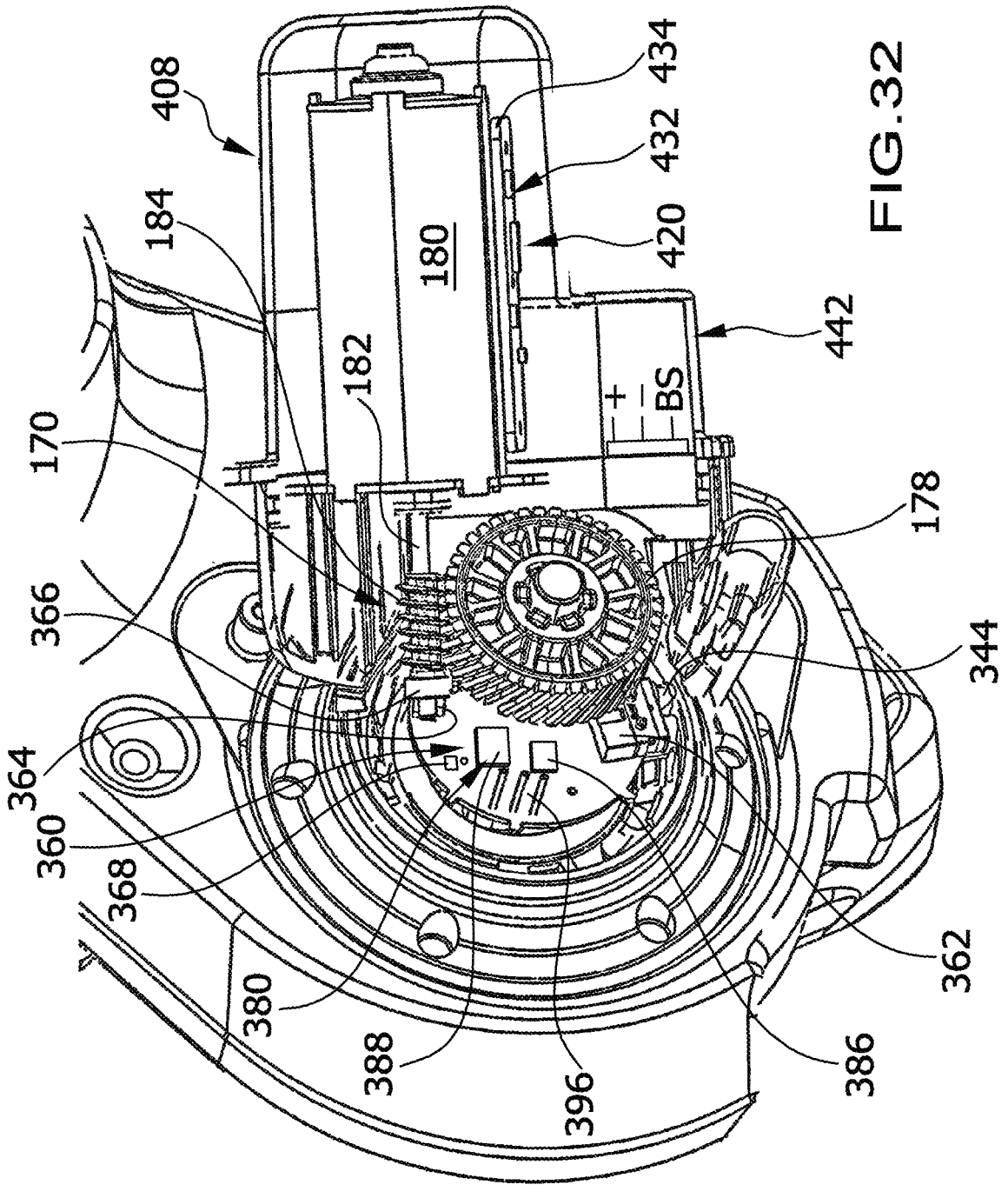
FIG. 32 shows a perspective illustration, similar to FIG. 25, of a third exemplary embodiment.

In a third variant of an embodiment, illustrated in FIG. 32, the pivot control unit 380 is arranged on the sensor carrier 360 in the same way as in the first embodiment variant, wherein there is in addition also arranged in the motor casing portion 408, for example held by the carrier body 404, a plug socket control unit 420 that serves to actuate the individual contacts 422 of the plug socket 34 arranged on the ball neck.

The individual contacts 422 of a conventional plug socket 34 for a trailer, or for a carrier unit to be secured to the ball neck 10, comprise for example light contacts 424 for left/right light, left/right indicator, rear fog lamp, brake light and reversing light, and at least one earth connector for all the light units.

In addition, the contacts 422 also comprise load contacts 426, such as steady plus, a charging cable for a battery and additional earth contacts for loads of this kind.

Figure 33:
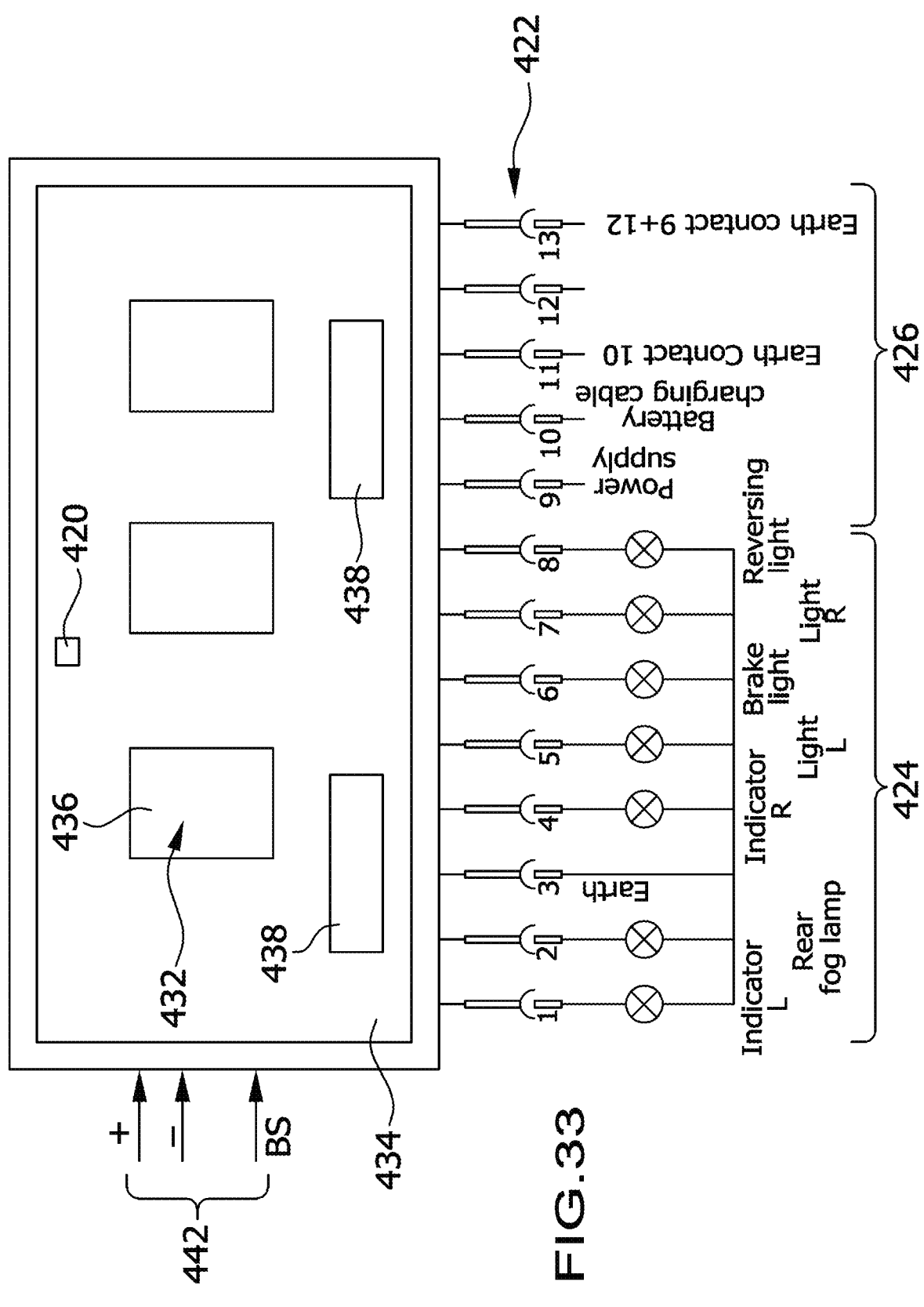
FIG. 33 shows a schematic illustration of a first embodiment of a plug socket control unit.

Th plug socket control unit 420 comprises a plug socket control circuit 432 arranged on a plug socket control circuit board 434, which comprises at least one processor 436 and one or more contact control switches 438 (FIG. 33).

Further, the plug socket control circuit 432 is provided with connectors 442, comprising two supply connectors+, − and a bus connector BS through which function signals transmitted over a bus system are input.

Depending on the function signals input to the bus connector BS, the processor 436 of the plug socket control circuit 432 operates as follows.

As soon as a function signal input to the bus connector reports an operating condition of the vehicle, the processor 436 continuously monitors, with the aid of the contact control circuits 438, the light contacts 424 by checking the resistance between the different light contacts 424 and the earth of the lamps connected thereto.

If, during continuous monitoring of the lamps, the processor 436 establishes that one or some have an "on" resistance outside the usual operating parameters, then the processor 436 generates a report back to the connector BS for the bus system.

If, according to the input function signals, individual lamps are to be actuated, for example left or right indicator or left or right light, etc., then the processor 436 causes these lamps to be supplied with current by way of the contact control circuit 438, but at the same time monitors the current consumption of these lamps in order for example to identify a short circuit.

If the processor 436 establishes that operation of the lamps is fault-free, the processor 436 generates a corresponding report back to the bus system at the bus connector BS.

In the same way, the processor monitors the load contacts 436 for whether a load is in fact connected, and then to what extent the load is functional, and generates a corresponding report back for the bus system at the bus connector BS.

In principle, the plug socket control unit 420 according to the invention and the pivot control unit 380 according to the invention may communicate with a bus system of the vehicle, for example a CAN bus, in common over one bus connector, for example the bus connector BS of the pivotal plug socket control unit 420.

Figure 34:
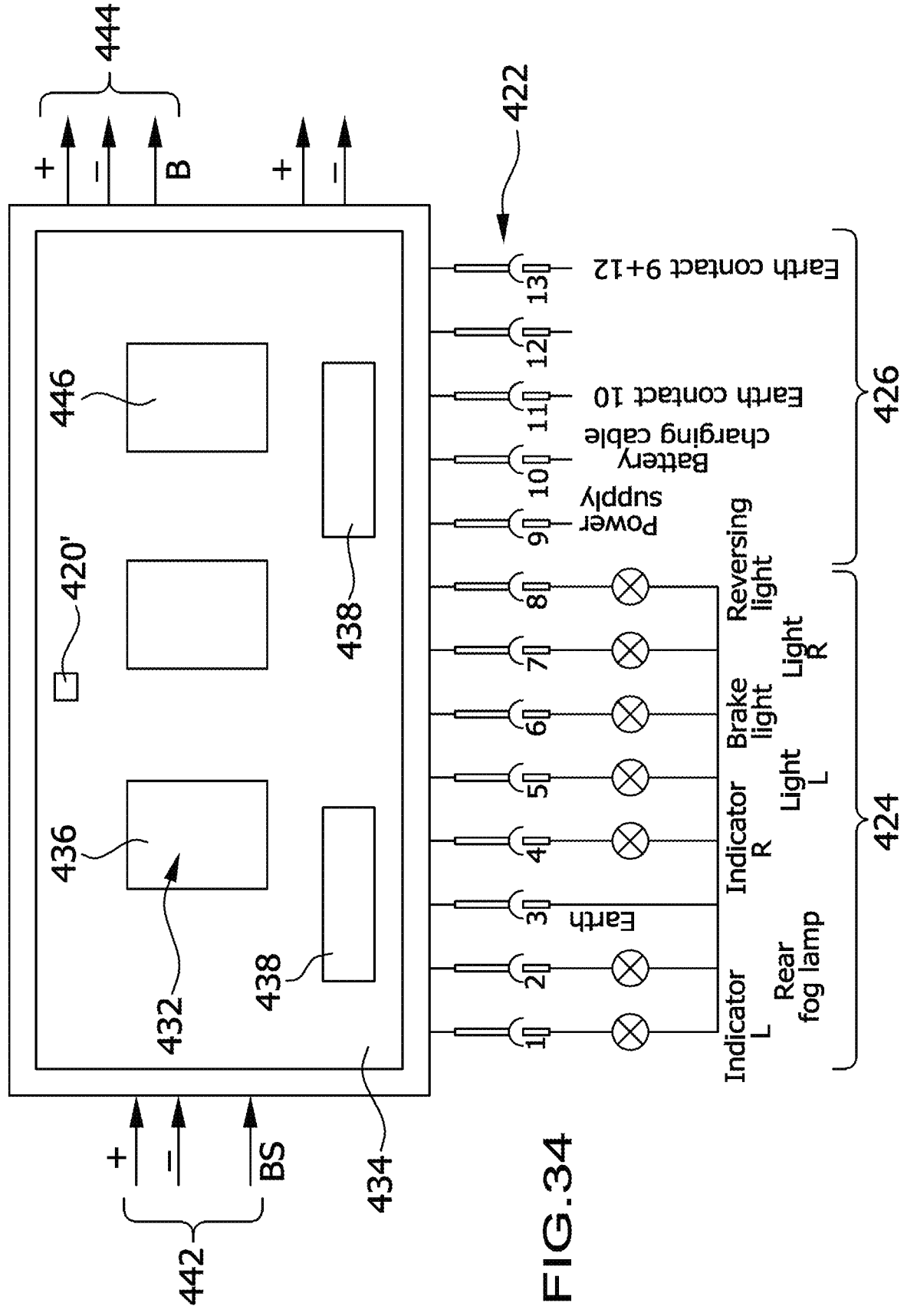
FIG. 34 shows an illustration of a second embodiment of the plug socket control unit according to the invention.

As an alternative, however, it is also possible, as illustrated in the case of a fourth variant of an embodiment according to FIG. 34, for the plug socket control unit 420' to communicate with the vehicle bus via the bus connector BS, for example the CAN bus of the vehicle, and for the pivot control unit 380 as illustrated in FIG. 34 to communicate with the pivot control unit 380 via separate connectors 444, likewise comprising supply connectors + and – and a bus connector B, in order to control the pivotal movements.

In this case, for example the plug socket control unit 420' is connected by way of the bus connector BS to the CAN bus of the vehicle, while the plug socket control unit 420' via the connectors 444, comprising supply connectors +, – and the bus connector B, which communicates with the bus connector B to the pivot control unit 380 by way of a LIN bus, wherein the connectors 444 are connected to the connectors 396 of the pivot control unit 380.

In this case, the plug socket control unit 420 functions in the same way as described in the third embodiment variant but also has a processor 446 for communicating with the pivot control unit 380 by way of the LIN bus system.

In this arrangement, the processor 446 transmits the signals that are transmitted at the bus connector BS, in particular from the CAN bus system, to the pivot control unit 380, and also transfers the reports back from the pivot control unit 380 by way of the LIN bus to the bus connector BS of the CAN bus system.

Otherwise, this fourth embodiment variant functions in the same way as that described in the context of the preceding exemplary embodiments, so reference may be made in full to the statements relating to these preceding exemplary embodiments.

Figure 35:
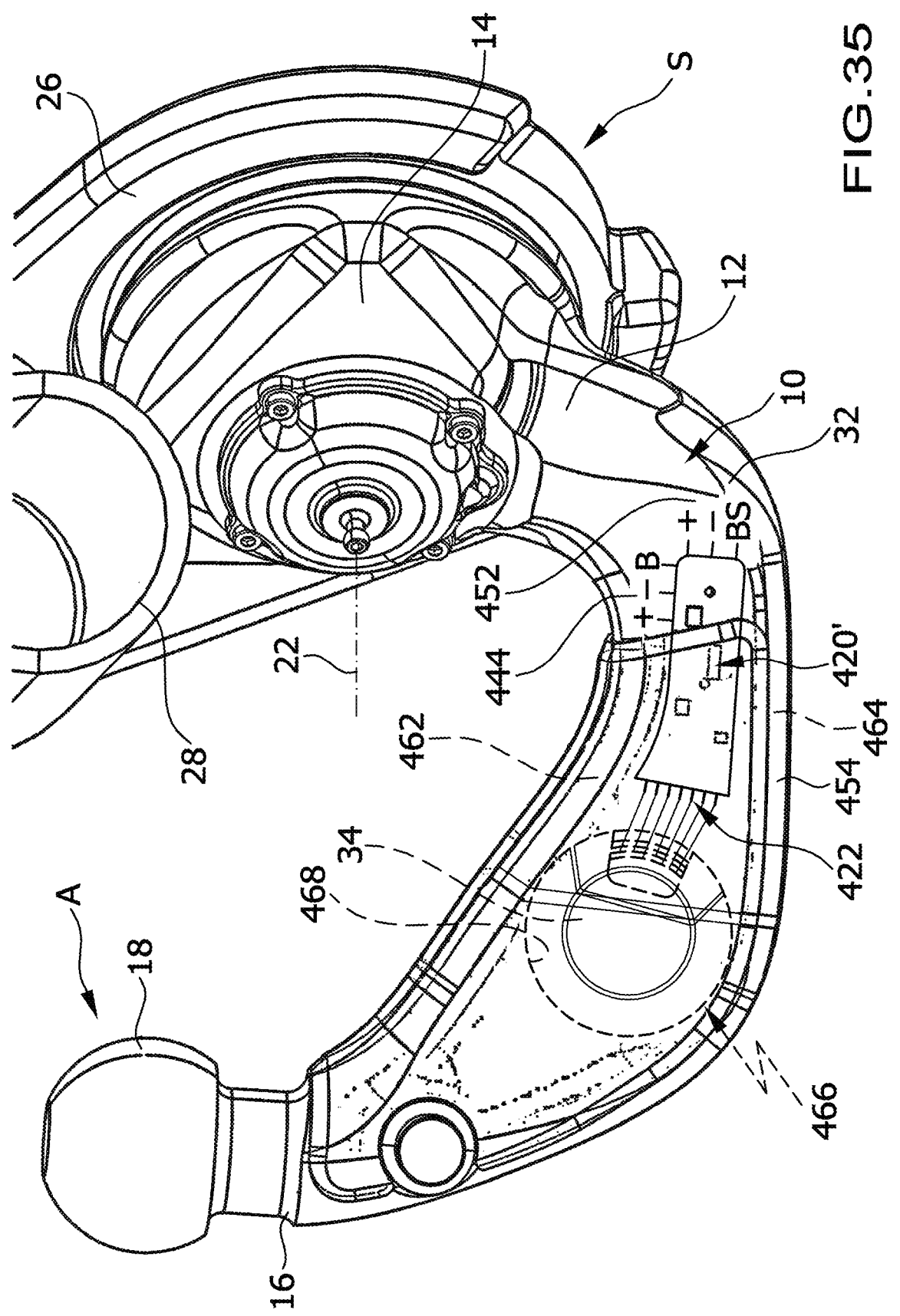
FIG. 35 shows an illustration of the ball neck with the second embodiment of the plug socket control unit according to the invention provided thereon.

In a fifth variant of an embodiment, illustrated in FIG. 35, the pivot unit S takes the same form as that described in the context of the preceding exemplary embodiments.

In particular, the pivot control unit 380 is also arranged in the same way in the pivot unit S as that described in the context of the preceding embodiment variants, and also operates in the same way.

In contrast to the preceding embodiment variants, the plug socket control unit 420' is not arranged in the motor casing portion 408 but on the ball neck 10, in the region of the portion 32 of the ball neck 10 that adjoins the first end 12, between the first end 12 and the plug socket 34 (FIG. 35).

In particular, provided in the ball neck 10 for this purpose is a recess 452 that receives the plug socket control unit 420' such that the plug socket control unit 420' is arranged in the recess 452 next to the plug socket 34, in particular in a manner protected from external influences on the ball neck 10.

For example, the recess 452 is provided in that the ball neck 10 is formed by a bearing structure 466 having an upper longitudinal strut 462 and a lower longitudinal strut 464, between which is the recess 452.

Moreover, the bearing structure 466 preferably also forms a plug socket receptacle 468 in which the plug socket 34 is inserted.

In this way, in particular the contact connectors 422 for the light contacts 424 and the load contacts 426 may be connected to the corresponding contacts arranged in the plug socket 34 in a simple manner.

Further, the plug socket control unit 420' is connected to the vehicle bus system by way of the bus connector BS and also by way of the supply contacts +, –.

Moreover, a connection is made with the pivot control unit 380 by way of the connectors 444, as explained in the context of the fourth exemplary embodiment.

Here, all the functions of the plug socket control unit 420' correspond to the functions of the plug socket control unit 420' that are described in conjunction with the third and the fourth exemplary embodiment.

Preferably, in this exemplary embodiment, for the purpose of particular protection of the plug socket control unit 420' the ball neck 10 is also provided with a cover 454, which at least partly, preferably entirely, engages over the recess 452 and thus also offers an additional protection for the plug socket control unit 420' in the recess 452, in particular also an additional protection for the connection between the contacts of the plug socket 34 and the contact connectors 422 of the plug socket control unit 420'.

The invention claimed is:

1. A trailer coupling, comprising a ball neck, which is movable between a working position and a rest position and has a pivot bearing body arranged at a first end and a coupling ball arranged at a second end, a pivot unit, which is arranged fixed to a vehicle and by way of which the pivot bearing body is pivotal for the purpose of performing a pivotal movement about a pivot axis between a working position and a rest position, wherein the pivot unit comprises a pivot bearing unit fixed to the vehicle and a rotation-blocking device for blocking a pivotal movement of the pivot bearing body about the pivot axis, at least in the working position, wherein a pivot control unit is integrated within the pivot unit.

2. The trailer coupling according to claim 1, wherein the pivot unit has an overall housing in which the pivot bearing unit, the rotation-blocking device and a drive motor are arranged, and the pivot control unit is arranged in the overall housing.

3. The trailer coupling according to claim 1, wherein the pivot control unit detects the pivotal movements of the ball neck about the pivot axis by way of a pivotal movement sensor.

4. The trailer coupling according to claim 3, wherein the pivotal movement sensor detects pivotal movements of the pivot bearing body about the pivot axis.

5. The trailer coupling according to claim 4, wherein the pivot bearing body cooperates with the pivotal movement sensor by way of a coupling element.

6. The trailer coupling according to claim 3, wherein the pivotal movement sensor is arranged on a sensor carrier.

7. The trailer coupling according claim 1, wherein the pivot control unit detects functions of the rotation-blocking device by way of a function sensor.

8. The trailer coupling according to claim 7, wherein the pivot control unit detects, by way of the function sensor, at least one position of the rotation-blocking device.

9. The trailer coupling according to claim 8, wherein the pivot control unit detects the position of the rotation-blocking device by scanning an element thereof by way of the function sensor.

10. The trailer coupling according to claim 7, wherein the function sensor is arranged on a sensor carrier.

11. The trailer coupling according to claim 1, wherein the pivot control unit detects a speed of the drive motor by way of a speed sensor.

12. The trailer coupling according to claim 11, wherein the speed sensor is associated with an output shaft of the drive motor.

13. The trailer coupling according to claim 11, wherein the speed sensor is arranged on a sensor carrier.

14. The trailer coupling according to claim 1, wherein the pivot control unit detects a temperature in the pivot unit by way of a temperature sensor.

15. The trailer coupling according to claim 14, wherein the temperature sensor is arranged on a sensor carrier.

16. The trailer coupling according to claim 1, wherein the sensor carriers are provided with push-in contact elements.

17. The trailer coupling according to claim 1, wherein the overall housing has a pivotal-operation housing portion that receives the pivot bearing unit, the rotation-blocking unit and at least one gear unit, and the sensor carriers are associated with the pivotal-operation housing portion.

18. The trailer coupling according to claim 17, wherein the sensor carriers are arranged in the pivotal-operation housing portion.

19. The trailer coupling according to claim 17, wherein the gear unit has a distribution gear that, on the output side, drives on the one hand the pivot bearing body and on the other the rotation-blocking device, and in particular at least one of the sensor carriers is arranged on the drive side of the distribution gear.

20. The trailer coupling according to claim 19, wherein the distribution gear is driven by a step-down gear, and at least one of the sensor carriers is associated with the step-down gear.

21. The trailer coupling according to claim 20, wherein the step-down gear has a drive-side gear element and an output-side gear element, and at least one of the sensor carriers is arranged between the drive-side gear element and the output-side gear element.

22. The trailer coupling according to claim 1, wherein the pivotal movement sensor, the function sensor and the speed sensor are arranged on a common sensor carrier.

23. The trailer coupling according to claim 1, wherein the overall housing has a pivotal-operation housing portion that receives the pivot bearing unit and at least one gear unit, and the pivot control unit is associated with the pivotal-operation housing portion.

24. The trailer coupling according to claim 23, wherein the pivot control unit is arranged in the pivotal-operation housing portion.

25. The trailer coupling according to claim 23, wherein the gear unit has a distribution gear that, on the output side, drives on the one hand the pivot bearing body and on the other the rotation-blocking device, and the pivot control unit is arranged on the drive side of the distribution gear.

26. The trailer coupling according to claim 25, wherein the distribution gear is driven by a step-down gear, and the pivot control unit is associated with the step-down gear.

27. The trailer coupling according to claim 26, wherein the step-down gear has a drive-side gear element and an output-side gear element, and the pivot control unit is arranged between the drive-side gear element and the output-side gear element.

28. The trailer coupling according to claim 1, wherein the overall housing has a motor casing portion that has the drive motor, and the pivot control unit is associated with the motor casing portion.

29. The trailer coupling according to claim 28, wherein the pivot control unit is arranged in the motor casing portion.

30. The trailer coupling according to claim 1, wherein the pivot unit has an overall housing in which there are arranged the pivot bearing unit and a drive motor, and a control circuit of the pivot control unit, arranged on a circuit board, is arranged in the overall housing.

31. The trailer coupling according to claim 1, wherein the overall housing has a pivotal-operation housing portion that receives the pivot bearing unit and at least one gear unit, and the control circuit of the pivot control unit, arranged on a circuit board, is associated with the pivotal-operation housing portion.

32. The trailer coupling according to claim 31, wherein the control circuit of the pivot control unit, arranged on a circuit board, is arranged in the pivotal-operation housing portion.

33. The trailer coupling according to claim 30, wherein the gear unit has a distribution gear that, on the output side, drives on the one hand the pivot bearing body and on the other the rotation-blocking device, and the control circuit of the pivot control unit, arranged on a circuit board, is arranged on the drive side of the distribution gear.

34. The trailer coupling according to claim 33, wherein the distribution gear is driven by a step-down gear, and the control circuit of the pivot control unit, arranged on a circuit board, is associated with the step-down gear.

35. The trailer coupling according to claim 34, wherein the step-down gear has a drive-side gear element and an output-side gear element, and the control circuit of the pivot control unit, arranged on a circuit board, is arranged between the drive-side gear element and the output-side gear element.

36. The trailer coupling according to claim 1, wherein the overall housing has a motor casing portion that has the drive motor, and the control circuit of the pivot control unit, arranged on a circuit board, is associated with the motor casing portion.

37. The trailer coupling according to claim 36, wherein the control circuit of the pivot control unit, arranged on a circuit board, is arranged in the motor casing portion.

38. The trailer coupling according to claim 1, wherein the pivot control unit has a control circuit which, with the aid of a data processing unit, on the one hand communicates with a bus system on the vehicle and on the other controls the pivot unit in accordance with a predetermined program code.

39. The trailer coupling according to claim 1, wherein the pivot control unit has a control circuit which, with the aid of a data processing unit and a motor drive circuit for the drive motor, controls the drive motor for the purpose of pivoting the ball neck between the working position and the rest position.

40. The trailer coupling according to claim 1, wherein the data processing unit detects, with the aid of the pivotal movement sensor, whether the ball neck is in the working position or the rest position.

41. The trailer coupling according to claim 40, wherein the data processing unit detects, with the aid of the pivotal movement sensor, intermediate positions of the ball neck, between the working position and the rest position of the ball neck.

42. The trailer coupling according to claim 1, wherein the data processing unit detects, with the aid of the function sensor, whether the rotation-blocking device is in a rotation-blocking position or a release position.

43. The trailer coupling according to claim 1, wherein the data processing unit, after the drive motor has started, compares a value of the speed sensor and a value of the pivotal movement sensor with one another.

44. The trailer coupling according to claim 1, wherein the data processing unit, as a result of a starting signal transmitted to it by way of a bus connector, starts the drive motor.

45. The trailer coupling according to claim 44, wherein the data processing unit only starts the drive motor as a result of the starting signal if the ball neck is in the rest position or the working position.

46. The trailer coupling according to claim 1, wherein the data processing unit monitors the pivotal movement of the ball neck with the aid of the pivotal movement sensor while the drive motor is operating.

47. The trailer coupling according to claim 46, wherein the data processing unit identifies reaching of the working position or the rest position with the aid of the pivotal movement sensor.

48. The trailer coupling according to claim 1, wherein the data processing unit monitors current consumption by the drive motor with the aid of the motor drive circuit, and stops the drive motor if a predetermined current threshold is exceeded.

49. The trailer coupling according to claim 1, wherein, when with the aid of the pivotal movement sensor the data processing unit detects that at least one of a) the working position or the rest position of the ball neck has been reached and b) the current consumption of the drive motor exceeds the predetermined current threshold, the data processing unit generates an "OK" signal and outputs it at the bus connector.

50. The trailer coupling according to claim 1, wherein, if the current consumption of the drive motor exceeds the predetermined current threshold away from the working position or the rest position of the ball neck, the data processing unit generates a "not OK" signal and outputs it at the bus connector.

51. The trailer coupling according to claim 1, wherein the data processing unit compares the value of the speed sensor and the value of the pivotal movement sensor, at least during a phase needed for release of securing devices, and, if the value of the pivotal movement sensor does not increase after this phase, which lasts for a predetermined period, outputs a "not OK" signal at the bus connector.

52. The trailer coupling according to claim 1, wherein the data processing unit detects, with the function sensor, a condition of the rotation-blocking device and, if the rotation-blocking position applies, in the working position outputs an "OK" signal at the bus connector and, if the rotation-blocking position does not apply, in the working position outputs a "not OK" signal at the bus connector.

\* \* \* \* \*